(12) United States Patent
Insalaco

(10) Patent No.: US 6,736,428 B1
(45) Date of Patent: May 18, 2004

(54) PROCESS MANAGEMENT SYSTEM

(76) Inventor: Anthony F. Insalaco, 43 Brushy Neck La. Unit #6, Westhampton, NY (US) 11977

( * ) Notice: Subject to any disclaimer, the term of this patent is extended or adjusted under 35 U.S.C. 154(b) by 178 days.

(21) Appl. No.: 10/038,286

(22) Filed: Jan. 2, 2002

Related U.S. Application Data

(63) Continuation-in-part of application No. 09/427,599, filed on Oct. 27, 1999, now abandoned, which is a continuation-in-part of application No. 08/996,449, filed on Dec. 22, 1997, now Pat. No. 5,975,580.

(51) Int. Cl.[7] .............................................. B42D 15/00
(52) U.S. Cl. .......................... 283/67; 283/70; 283/36; 283/38; 402/79; 281/38
(58) Field of Search ..................... 283/29, 36, 37, 283/38, 67, 70; 402/79, 80 R; 281/15.1, 19.1, 38

(56) References Cited

U.S. PATENT DOCUMENTS

| | | | | |
|---|---|---|---|---|
| 4,240,761 A | * | 12/1980 | Jacobson | 402/76 |
| 4,330,951 A | * | 5/1982 | Hauer | 40/124.2 |
| 4,375,925 A | * | 3/1983 | Grummich | 402/8 |
| 4,832,374 A | * | 5/1989 | Prest, Jr. | 283/38 |
| 4,962,951 A | * | 10/1990 | Mechesney | 283/114 |
| 5,338,126 A | * | 8/1994 | Mullin et al. | 402/8 |
| 5,503,435 A | * | 4/1996 | Kline | 283/67 |
| 5,674,021 A | * | 10/1997 | Hutnick | 281/15.1 |
| 5,695,219 A | * | 12/1997 | Crawford | 283/36 |
| 5,791,690 A | * | 8/1998 | Ong | 281/47 |
| 5,975,580 A | * | 11/1999 | Insalaco | 283/67 |
| 5,988,925 A | * | 11/1999 | Baggett | 402/8 |
| 6,089,777 A | * | 7/2000 | Wong | 283/36 |
| 6,099,189 A | * | 8/2000 | Owen et al. | 283/36 |
| 6,364,362 B1 | * | 4/2002 | Severin | 283/17 |

* cited by examiner

Primary Examiner—Willmon Fridie, Jr.
(74) Attorney, Agent, or Firm—Nolte, Nolte & Hunter; Christopher B. Garvey

(57) ABSTRACT

A method of systematizing a process for a user, in which the process has steps. Each step has a corresponding tab. The user sequentially performs the steps of the process in a sequence defined by an order of tabs. One step is linked to a subsequent step. Performing the step will affect the subsequent step.

35 Claims, 64 Drawing Sheets

1) Two related Processes & their respective linked Steps
2) How the labeling of such linked processes intrinsically establishes a flowchart for those processes:

One process may be blocked while another is revealed for processing -- by the use of a 'magnetized blocker'

Two linked steps may reside 'WITHIN' a divider construct, such that they are mechanically attached -- when one is pushed in toward the left, the other will move out toward the right

One process may be blocked while another is revealed for processing -- by the use of a 'Clip-on' Blocker

3D-02

Extruded Part is:

1. Not translucent so that any writing on the polyethylene sheet is not visible when covered by this piece.

2. Only as thick as needed to make it rigid, so it doesn't come away from the poly sheet.

A step of Process-1 in Binder-1 may actually be a pointer into a 2nd Binder where a 2nd Process is performed -- thereby allowing for the interleaving of any number of Binders & Processes, each having any number of Steps that are interrelated across multiple binders.

1) tabs of process steps may reside along multiple edges of a divider-set;
2) a process may include linked & non-linked steps;
3) a step of a process may direct a user to an underlying process with its own linked step(s).

1) The Steps of a Process may be located next to the Steps of another Process &
2) An implementation of the invention may include non-process tabs and Process tabs Under logic control the resulting action of a Decision in a Step of a Process may be that the documents contained within the Step are placed back into the Step itself, thereby defining Step to be recursive.

The Flowcharts for two linked processes may reside on opposite sides of a piece of material and may be fashioned to include a blocker that masks the underlying Steps of the oppositely-visible Process.

The Flowchart governing a Process may be altered or replaced by a new Flowchart that is derived from executing a Step of an original Process, according to some governing logic Instead of actual documents within and transferred among the steps of a process, one may utilize symbolic representations of such documents -- in the form of removable pre-gummed labels, for example.

As opposed to Fig. 8C, the actual Flowchart for two linked processes may reside on an underlying leaf and a half-windowed blocker provided to mask the underlying Steps of the oppositely-visible Process.

REVERSIBLE DIVIDERS
9A-02
a Standard set of 8 Dividers
9A-04
Manufacture only 4 of desired set of 8 -- with left and right-side hole-punches
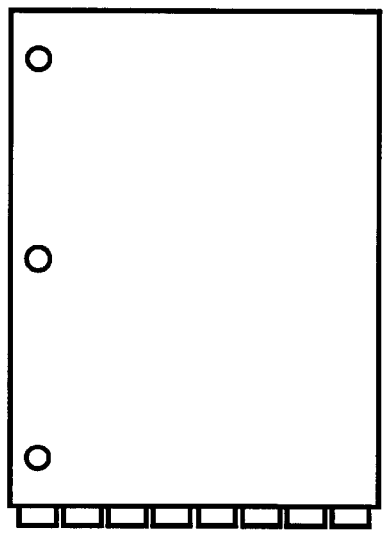
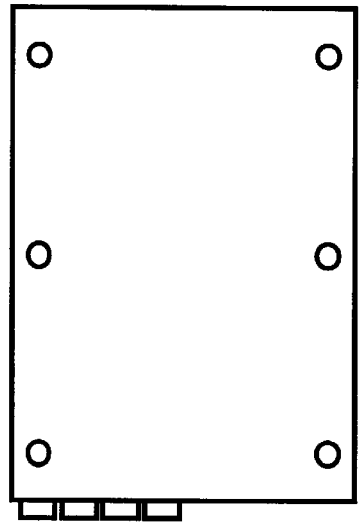
Set of 4        Set of 4 rotated 180°        when combined
9A-06        +        =
FIGURE-9A

REVERSIBLE DIVIDERS - illustrating flexibility
9B-02
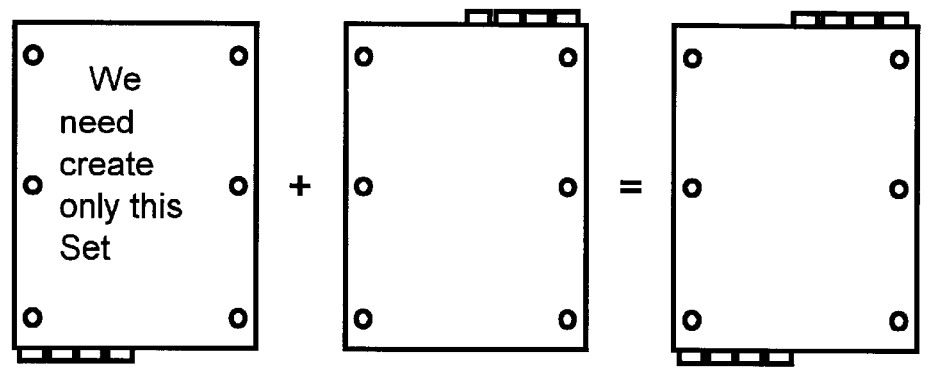
9B-04
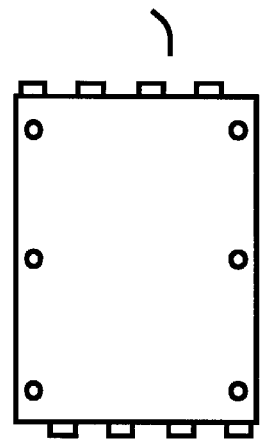
FIGURE-9B REVERSIBLE DIVIDERS - left & right-edge Tabs
9C-02
Right-edge Tabs:
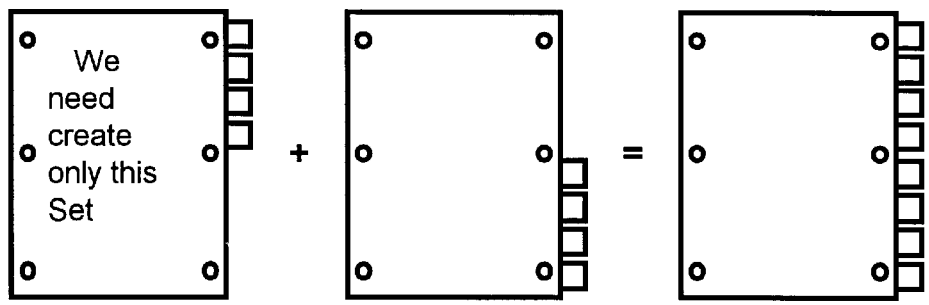
9C-04
Left-edge Tabs:
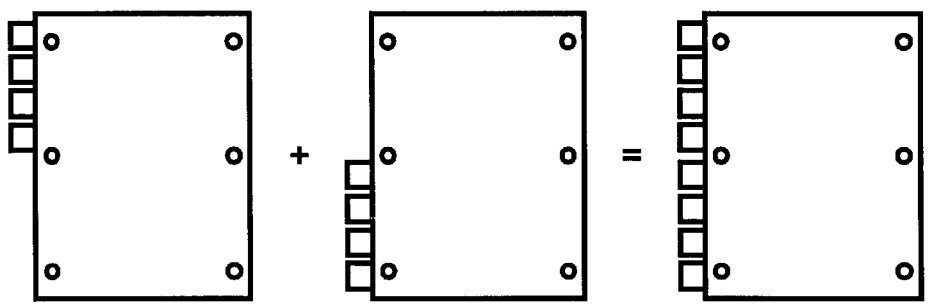
FIGURE-9C

REVERSIBLE DIVIDERS:
left & right-edge Tabs
9D-02
2 Sets are manufactured .....
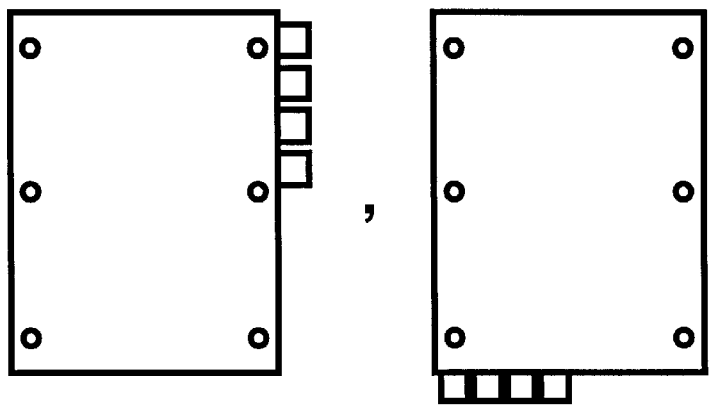
9D-04
..... in order to generate the following super-Set:
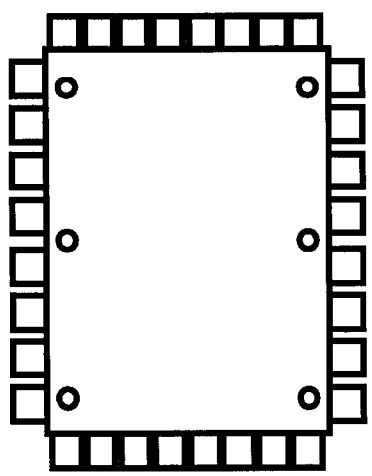
FIGURE-9D

SQUARE 'TABBED DIVIDER SET'
9E-02
One set of square dividers:
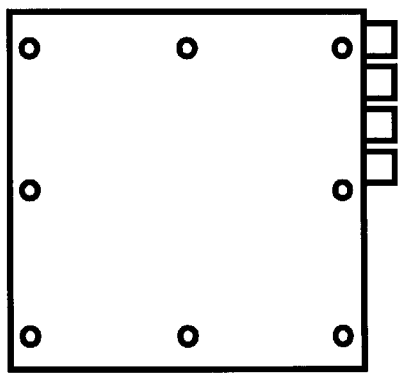
9E-04
….. in order to produce the following super-Set:
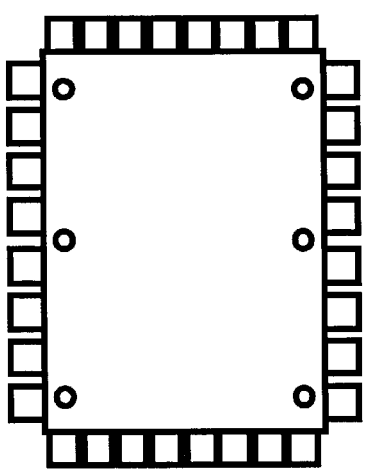
FIGURE-9E

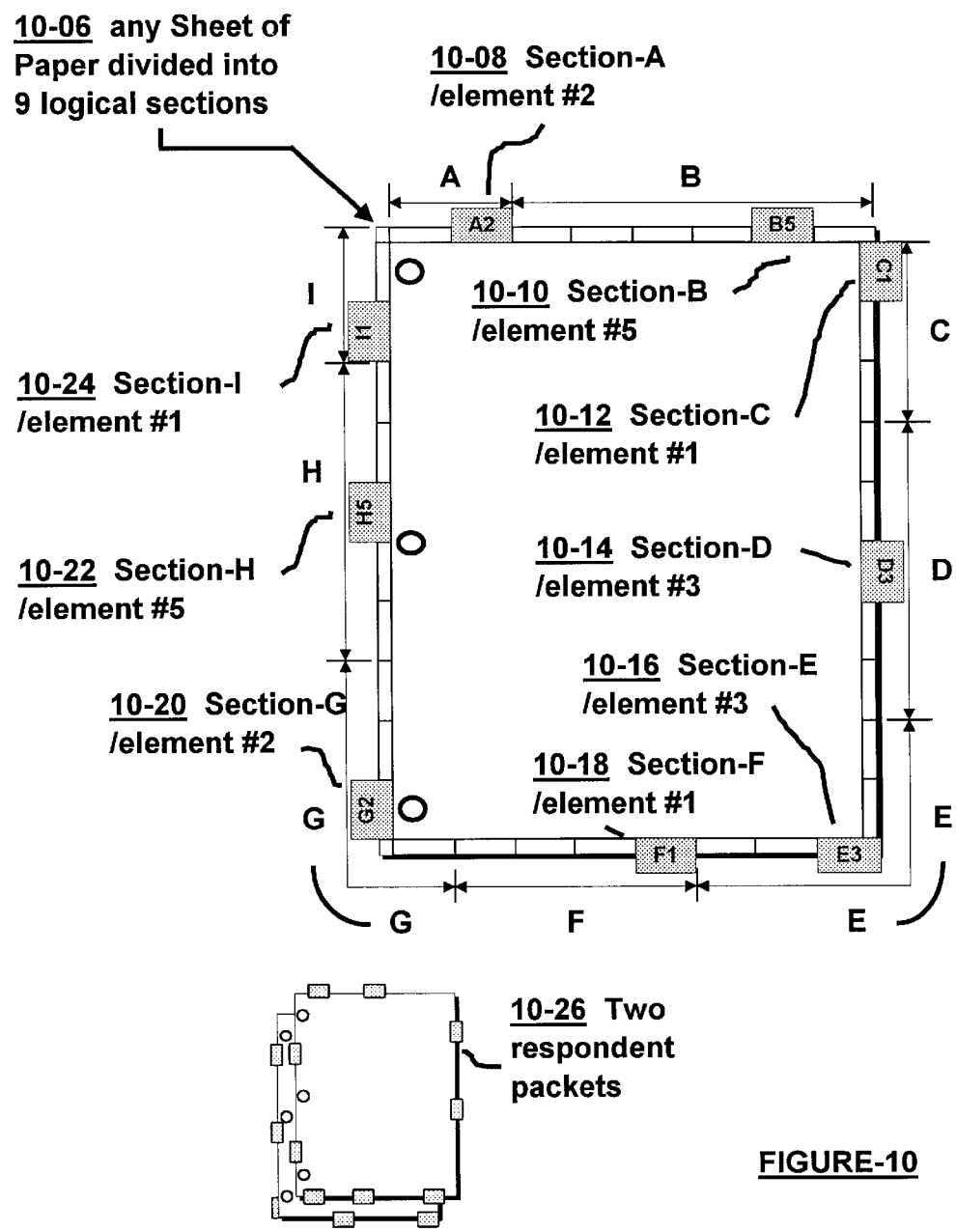

A PAPER DATABASE IS DEVELOPED BY APPLYING MULTIPLE TABS TO A SINGLE SHEET IN ORDER TO CREATE MULTIPLE VIEWS TO THE SHEET

10-06 any Sheet of Paper divided into 9 logical sections

10-08 Section-A /element #2

10-10 Section-B /element #5

10-12 Section-C /element #1

10-14 Section-D /element #3

10-16 Section-E /element #3

10-18 Section-F /element #1

10-20 Section-G /element #2

10-22 Section-H /element #5

10-24 Section-I /element #1

10-26 Two respondent packets

FIGURE-10

A SLIPCASE
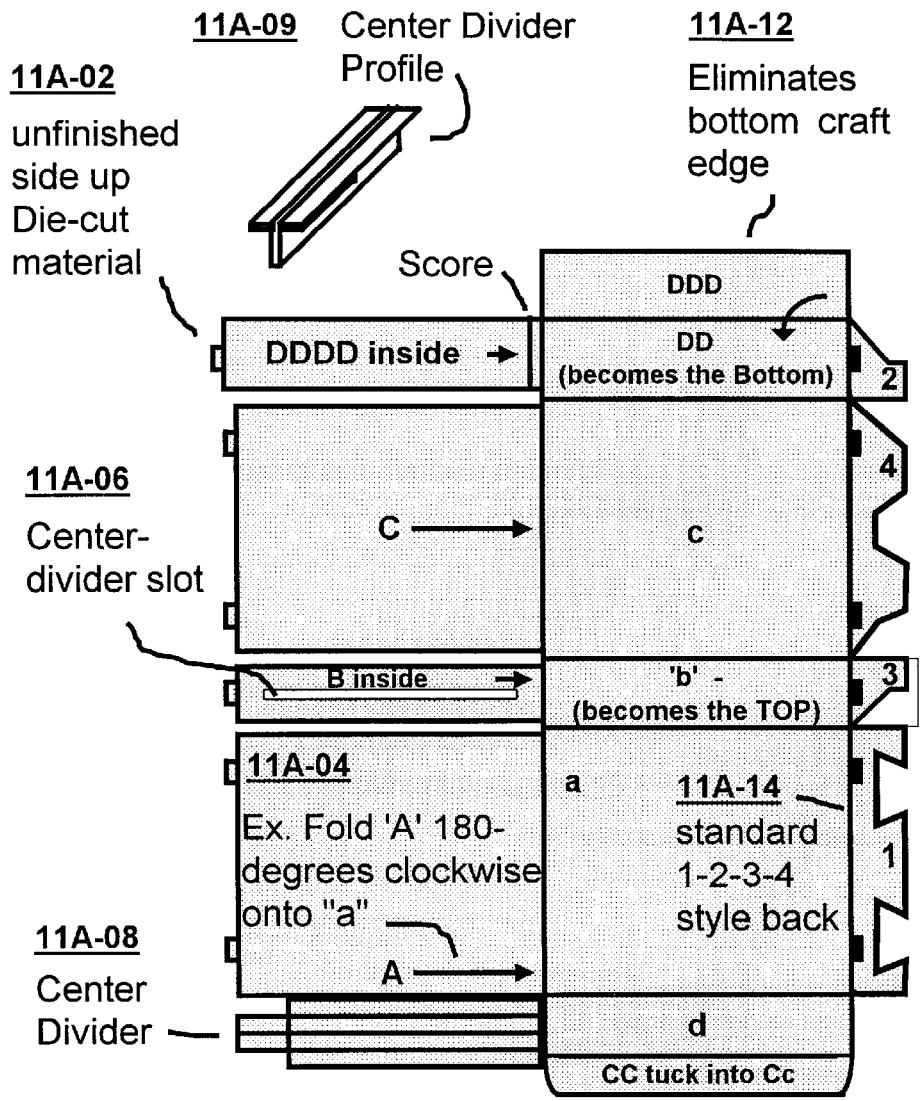
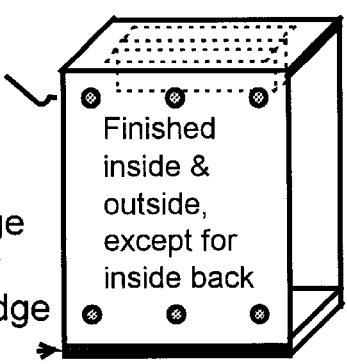
FIGURE-11A

Insertable Slipcase DRAWER may be fashioned to work in concert with the SLIPCASE illustrated in Figure 11A.

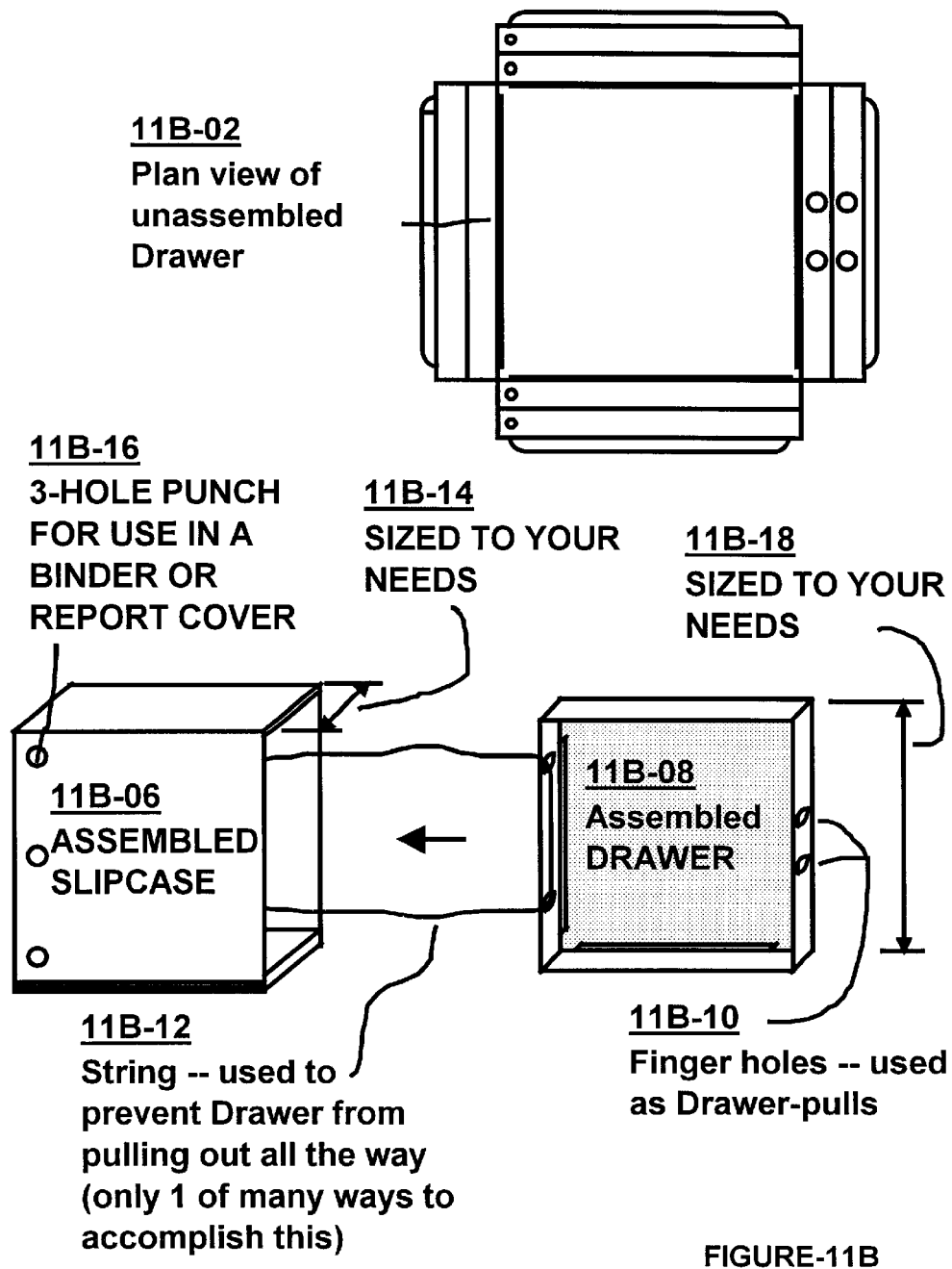

11B-02
Plan view of unassembled Drawer

11B-16
3-HOLE PUNCH FOR USE IN A BINDER OR REPORT COVER

11B-14
SIZED TO YOUR NEEDS

11B-18
SIZED TO YOUR NEEDS

11B-06
ASSEMBLED SLIPCASE

11B-08
Assembled DRAWER

11B-12
String -- used to prevent Drawer from pulling out all the way (only 1 of many ways to accomplish this)

11B-10
Finger holes -- used as Drawer-pulls

FIGURE-11B

ASSEMBLING THE SLIPCASE: with each step illustrating what the Slipcase looks like as or after the step is accomplished:

sub-figures 11C1 / 1 through 5

11C1-02 Step #1

1. If you see a detachable piece ('X') in the lower-left corner, detach it and fold it into a Center Divider

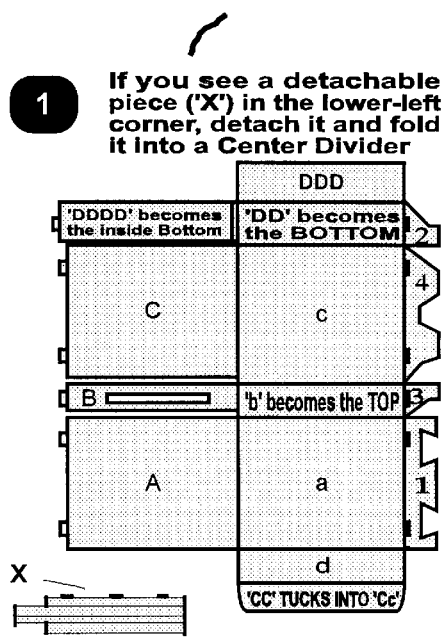

2. Insert the folded Center Divider 'X' into slot "B" from underneath, so that the finished side protrudes upward

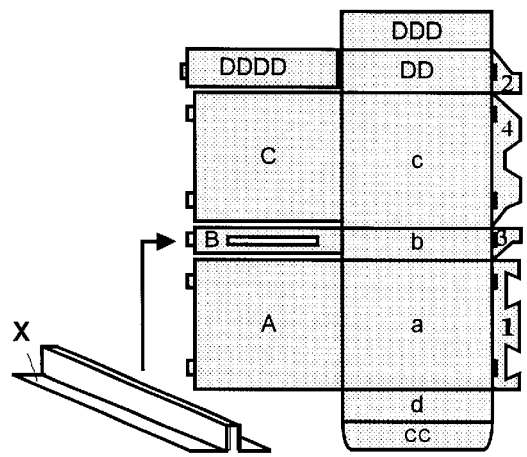

11C1-04 Step #5

3. After 'A' is folded over onto 'a'

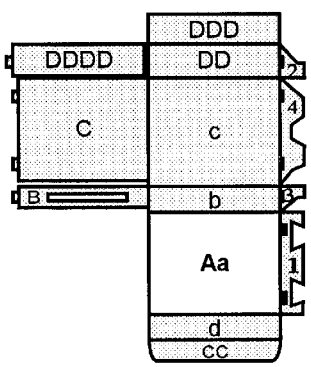

4. After 'B' is folded over onto 'b'

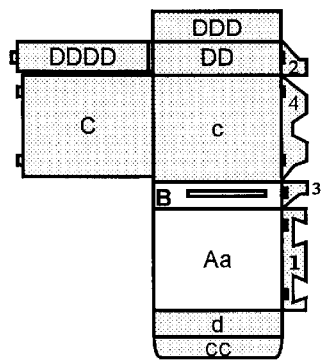

5. After 'C' is folded over onto 'c'

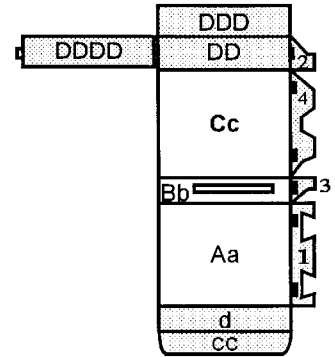

FIGURE-11C1

ASSEMBLING THE SLIPCASE: with each step illustrating what the Slipcase looks like as or after the step is accomplished:
sub-figures 11C2 / 6 through 9 (continued from 11C1)
Step #6
11C2-02
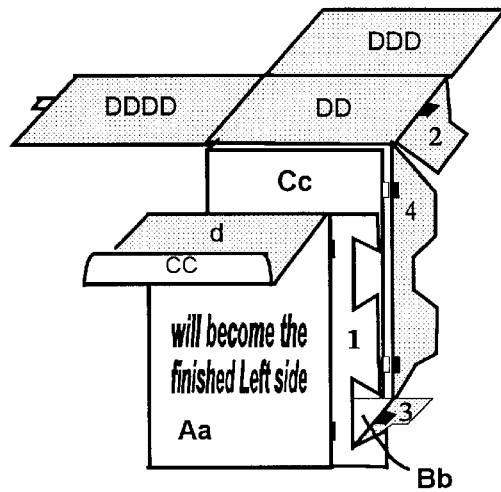
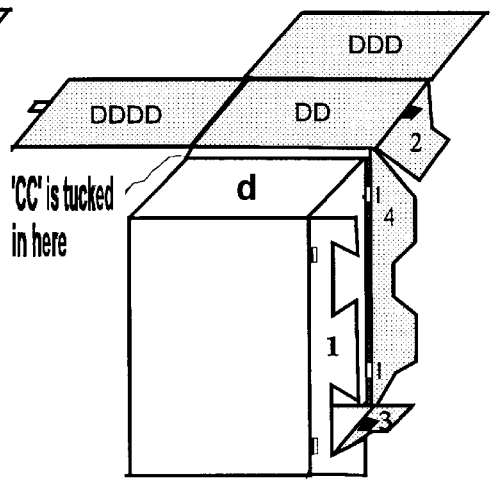
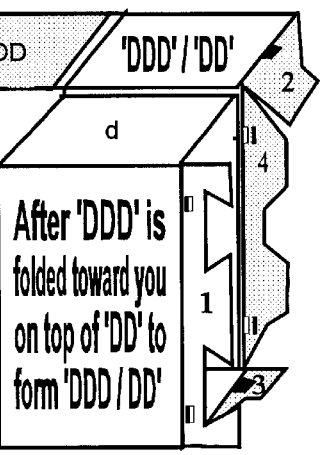
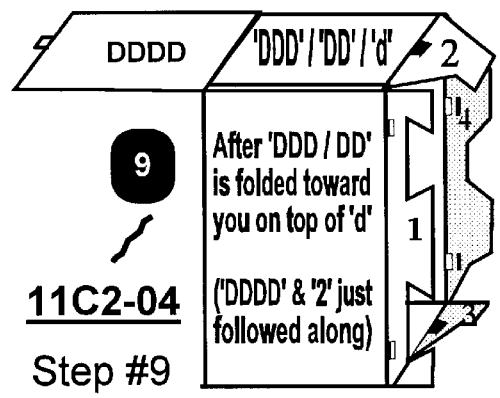
11C2-04
Step #9
FIGURE-11C2

ASSEMBLING THE SLIPCASE: with each step illustrating what the Slipcase looks like as or after the step is accomplished:
sub-figures 11C3 / 10 through 13 (continued from 11C2)
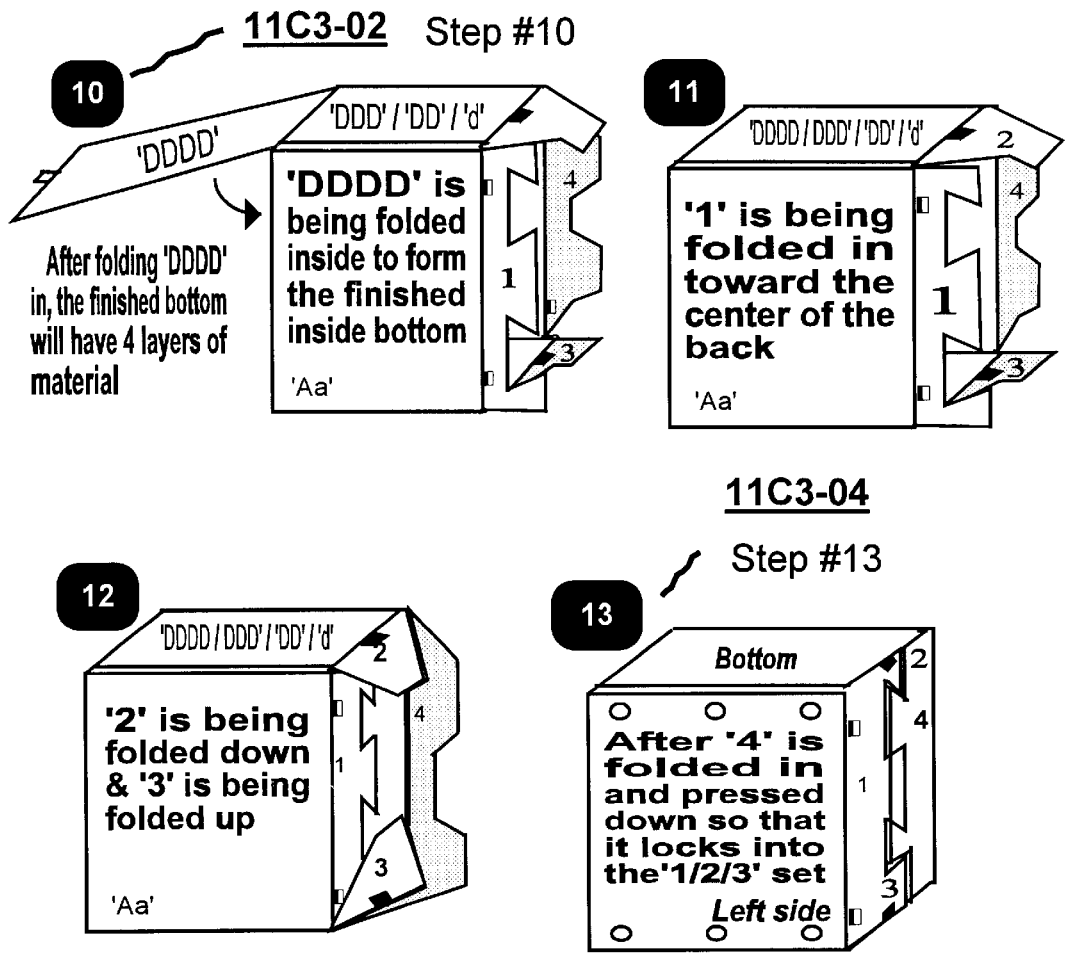
** Complete the assembly by applying the 6 "rough" Velcro coins to the left side of the Slipcase and 6 "soft" ones to the right side.
FIGURE-11C3

The Separators of a Slipcase may be of varying styles, including that of a full height
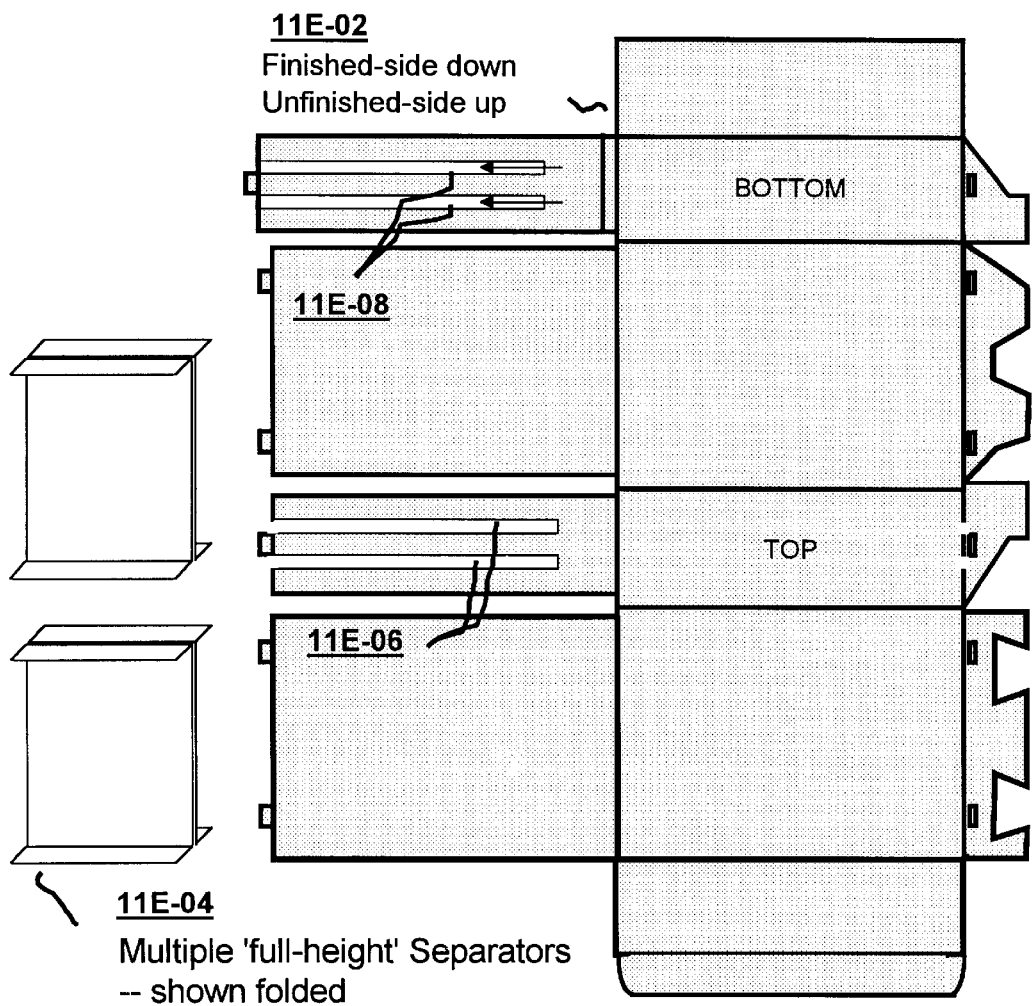
11E-02
Finished-side down
Unfinished-side up
11E-08
11E-06
11E-04
Multiple 'full-height' Separators
-- shown folded
BOTTOM
TOP
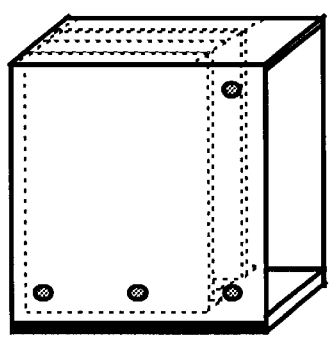
11E-10
Self-standing
SLIPCASE
with 'full-height'
multiple separators
(hidden)
FIGURE-11E A completely seamless, finished Slipcase may be fashioned from a one-finished-side piece of material by adding the reverse image of the back 1-2-3-4 lock at the right.

CREATING A TAB FROM A PRESSURE-SENSITIVE LABEL (Steps 1 & 2 of 4 Steps)
1 12C1-02
Tab-Label Sheet
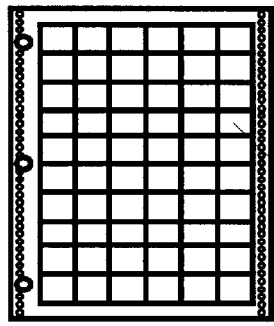
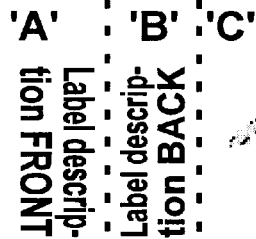
'A'  'B'  'C'
Label description FRONT | Label description BACK
12C1-04: the face of 1 Label (showing segments 'A', 'B' & 'C')
2 12C1-12
Fold 'B' & 'C' into an 'S' shape.
12C1-14
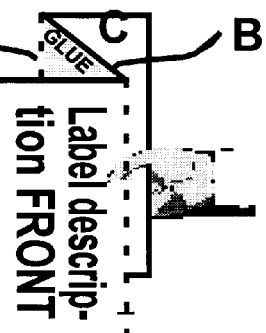
A | C | B
GLUE
Label description FRONT
FIGURE-12C1

CREATING A TAB FROM A PRESSURE-SENSITIVE LABEL (Steps 3 & 4 of 4 Steps)
3 Press the exposed glue of 'A' to the Sheet-front. Segment 'C' acts as an alignment STOP.
12C2-14
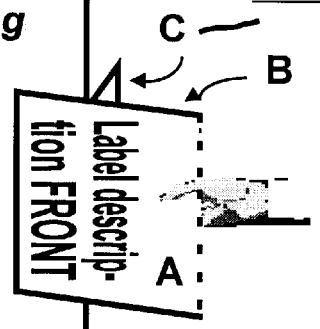
12C2-04
12C2-02
4 12C2-12
FINAL STATUS
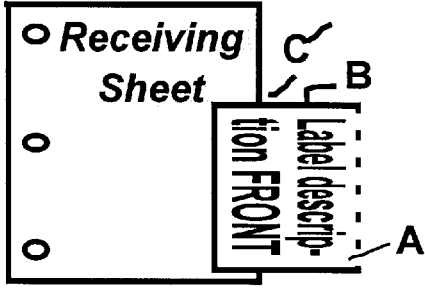
(segments 'B' and 'C' are visible from the back) 12C2-14
FIGURE-12C2

TOPIC LABELS
13-02 Start with pressure-sensitive label material
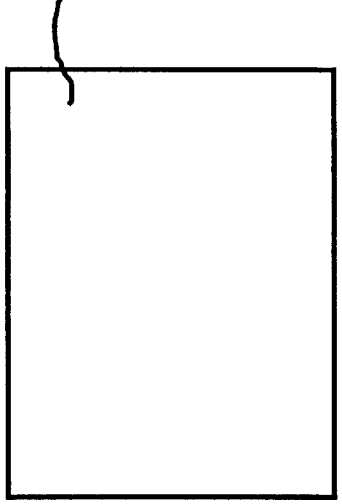
13-04 Die-cut application-sensitive separately removable pieces
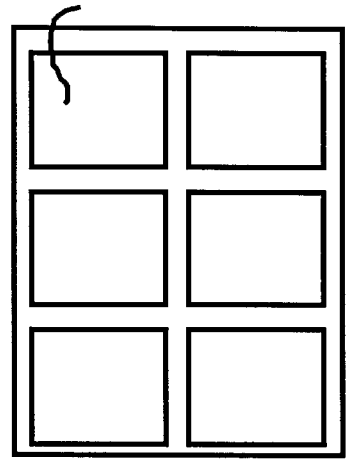
13-06 Subject-sensitive graphics
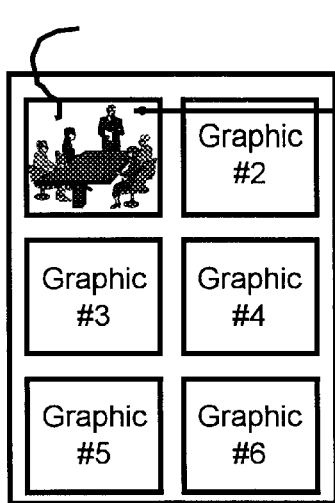
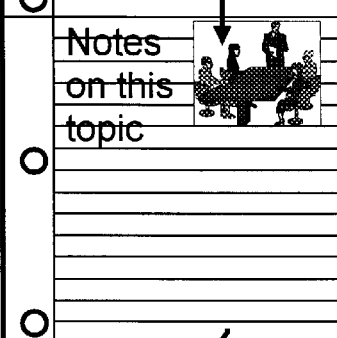
13-08
FIGURE-13

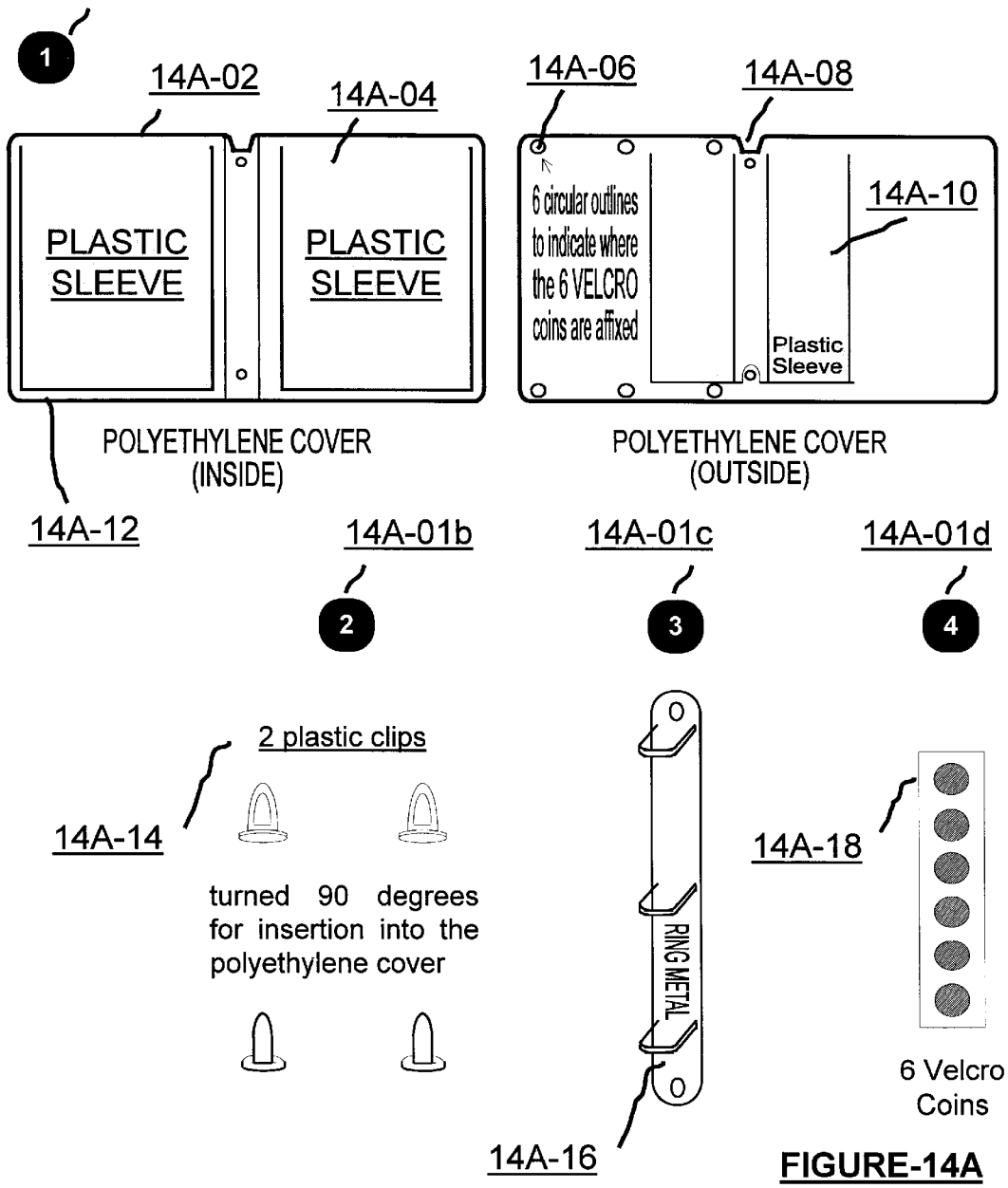

Building a Binder in order to enhance any binder use in general and any implementation of the "Process Management System" in particular
STEPS:
14B-02
1
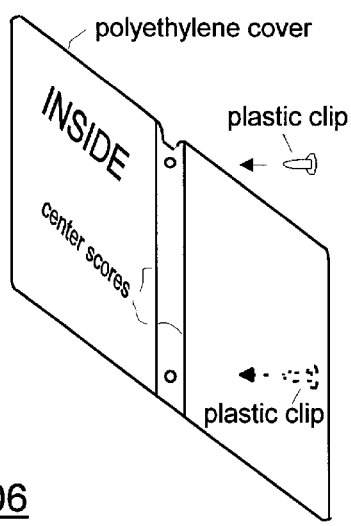
14B-04
2
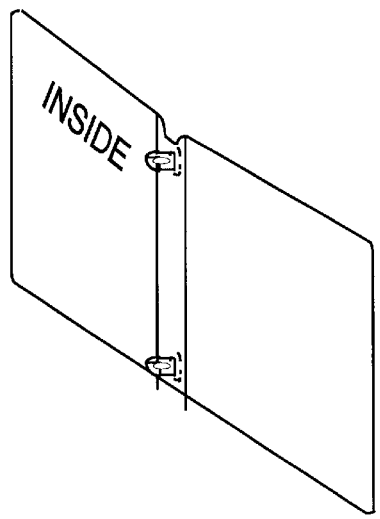
14B-06
3
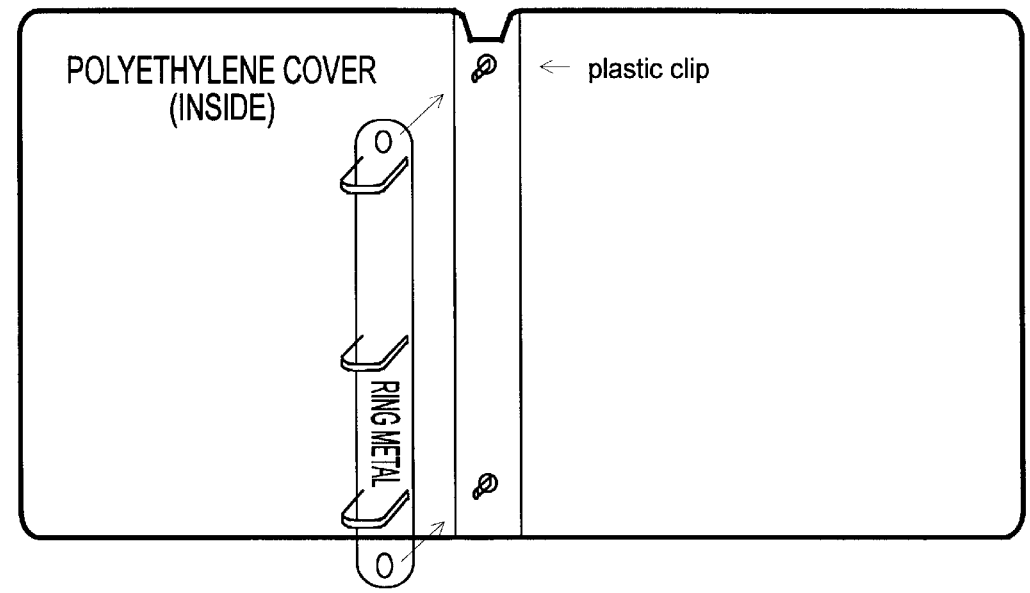
FIGURE-14B

Building a Binder in order to enhance any binder use in general and any implementation of the "Process Management System" in particular

STEPS continued:

Overview of the Binder that was built in order to enhance any binder use in general and any implementation of the "Process Management System" in particular
14D-02 BINDER FRONT
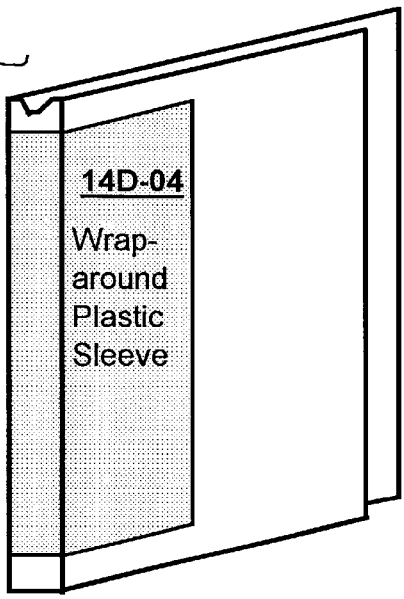
14D-06 Finger Notch
14D-04 Wrap-around Plastic Sleeve
14D-08 Front cover is cut back to reveal the right-edge divider tabs residing inside
14D-12 BINDER BACK
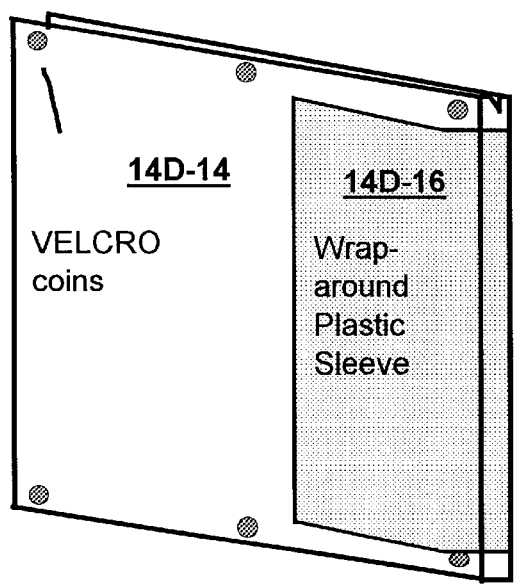
14D-14 VELCRO coins
14D-16 Wrap-around Plastic Sleeve
FIGURE-14D By a method of the left-edge tabbing of a document in a binder, one may advantageously reflect the status of such a document that is independent of the step in which the document physically resides because of the document's tab protrusion from the common and visible left-edge An apparatus may be fabricated to detect and report on the existence or non-existence of documents in pre-determined locations of a binder.

2-PART FOLDER with DOUBLE-SIDED USAGE
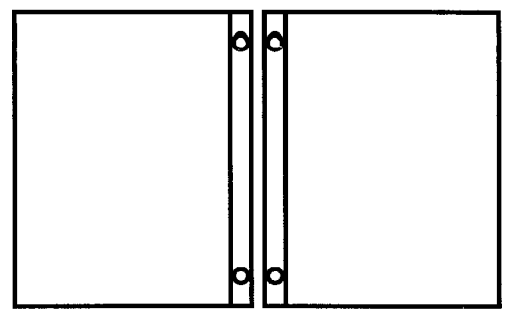
16B-02 2-part Folder
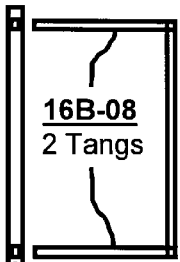
16B-04 Prong paper fastener
16B-08 2 Tangs
16B-10 Compressor
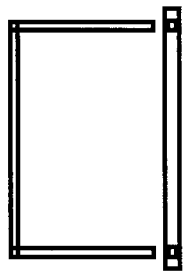
16B-06 Prong paper fastener
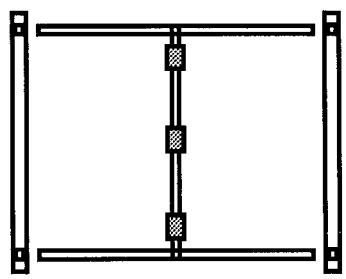
16B-12 2 attached Sets of Prong fasteners
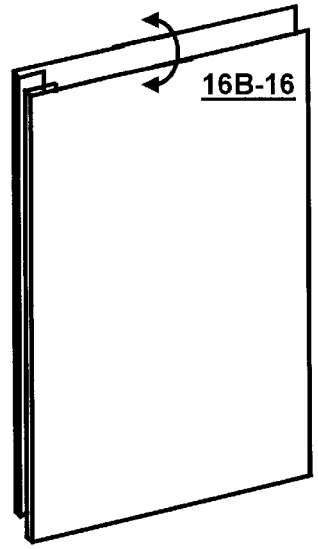
16B-16
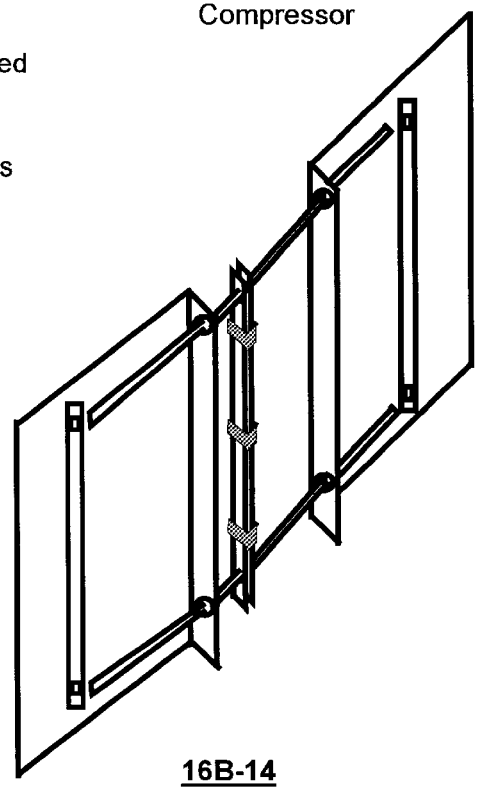
16B-14
FIGURE-16B

FOLDER with DOUBLE-SIDED USAGE
AS IT APPEARS WHEN ASSEMBLED
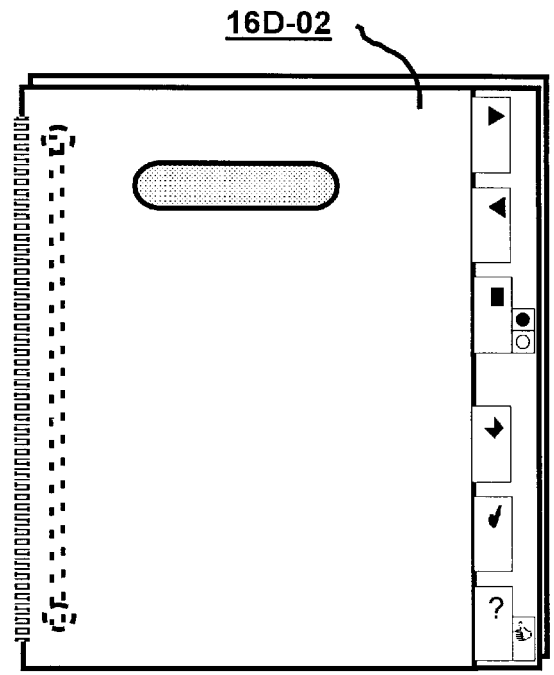
16D-02
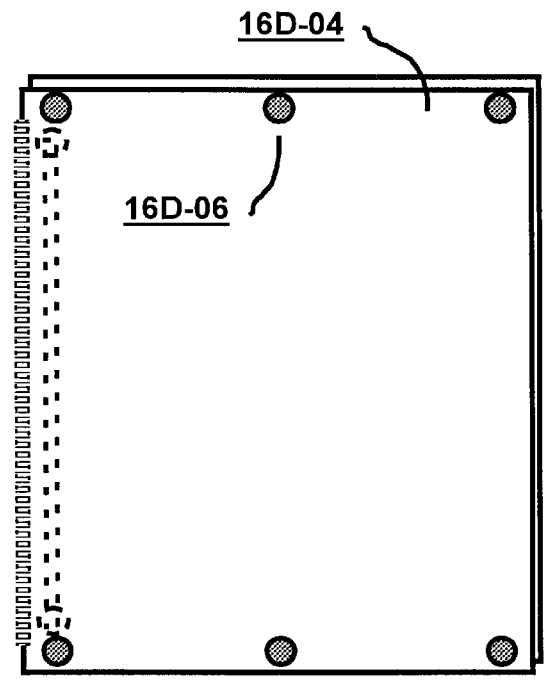
16D-04
16D-06
FIGURE-16D

The (minimum of) TWO SHEETS
that COMPRISE the 'PAPER FASTENING SYSTEM'
17-02: Pressure-sensitive Label Stock:
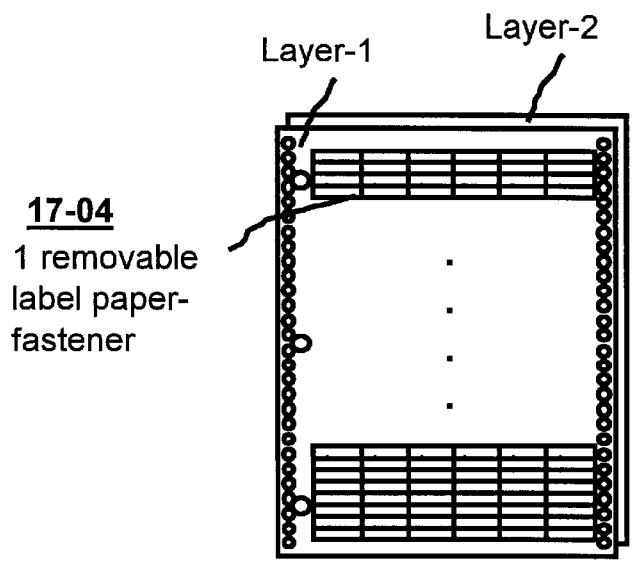
17-04
1 removable label paper-fastener
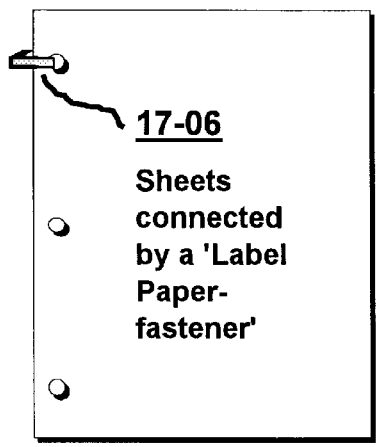
17-06
Sheets connected by a 'Label Paper-fastener'
FIGURE-17

A standard Prong Fastener
that is in the public domain
18A-02: Prong Fastener:
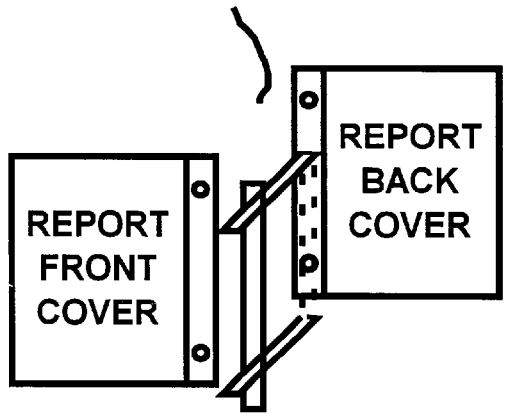
18A-04: Prong Fastener details
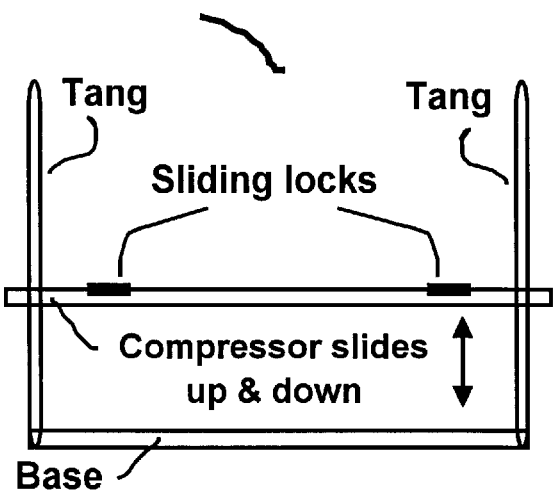
FIGURE-18A

A Prong Fastener may be a 2-Part assembly made from of a combination of polyethylene & Velcro

18B-10: Velcro LOOP material (glue underneath)

18B-06: Velcro Hook Tip

18B-08: Scores at 2 points

18B-04: Polyethylene Strip

18B-02: Report Covers

A Prong Fastener may be made from a 2-Part Velcro assembly

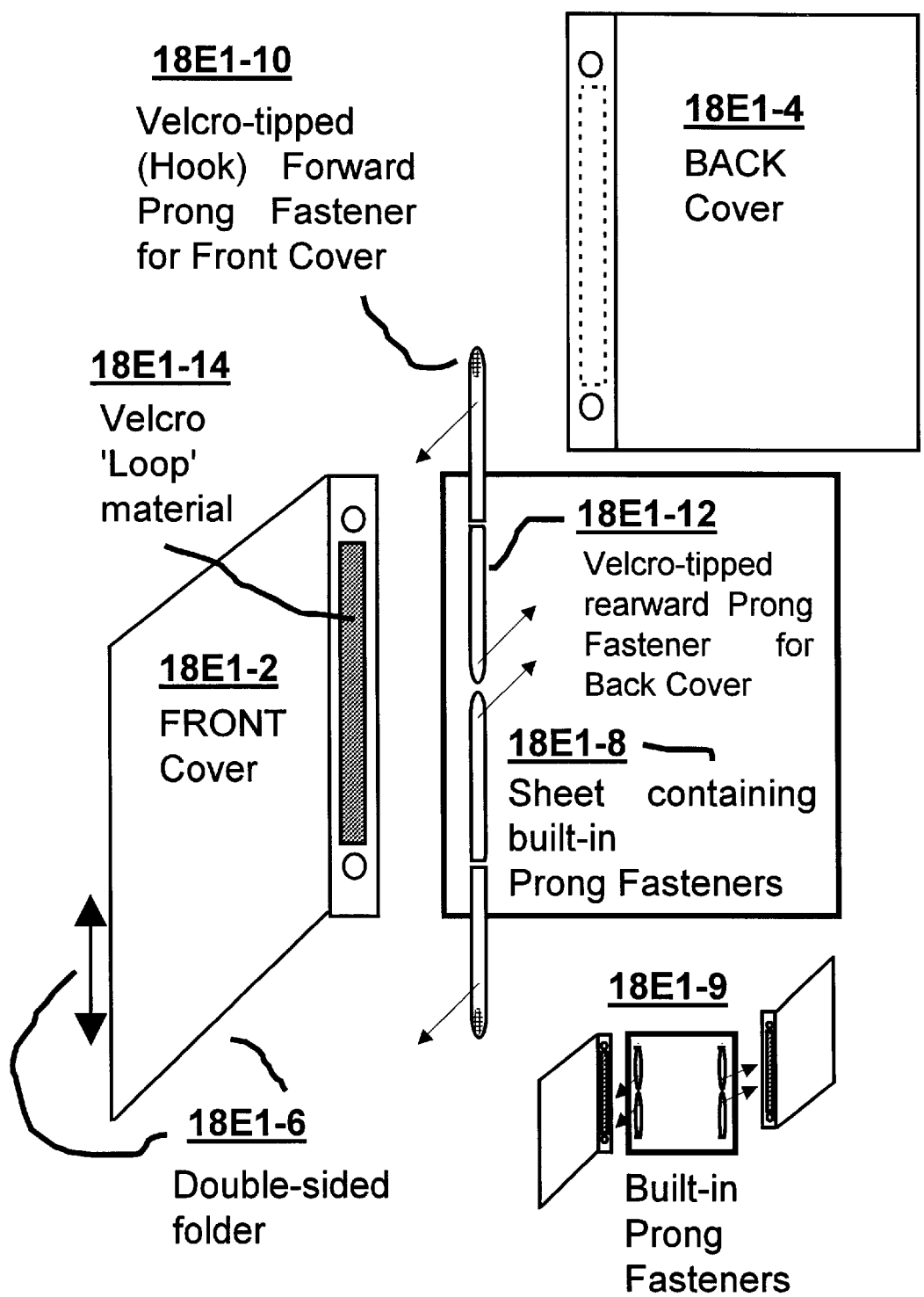
FIGURE-18E1

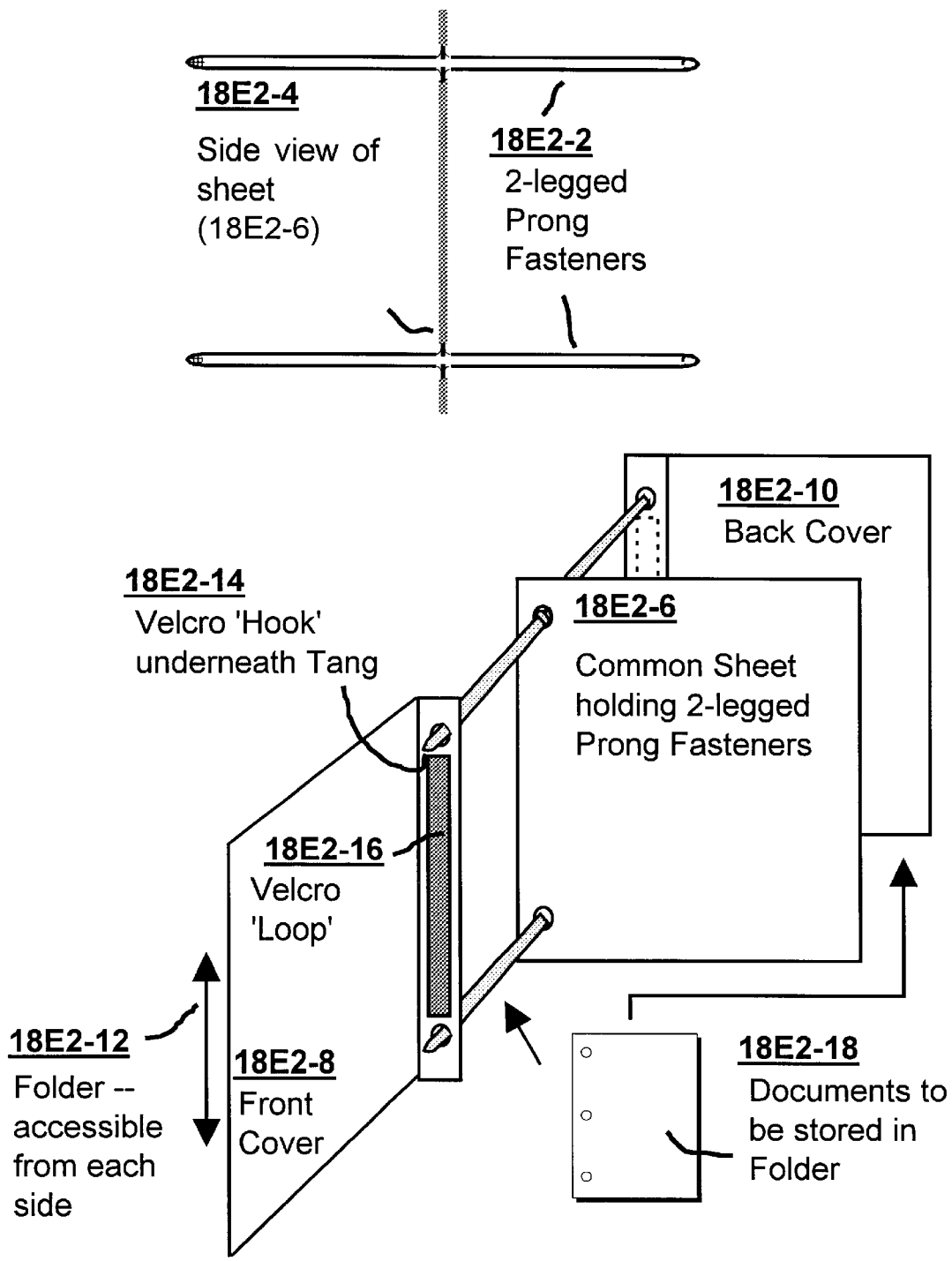
FIGURE-18E2

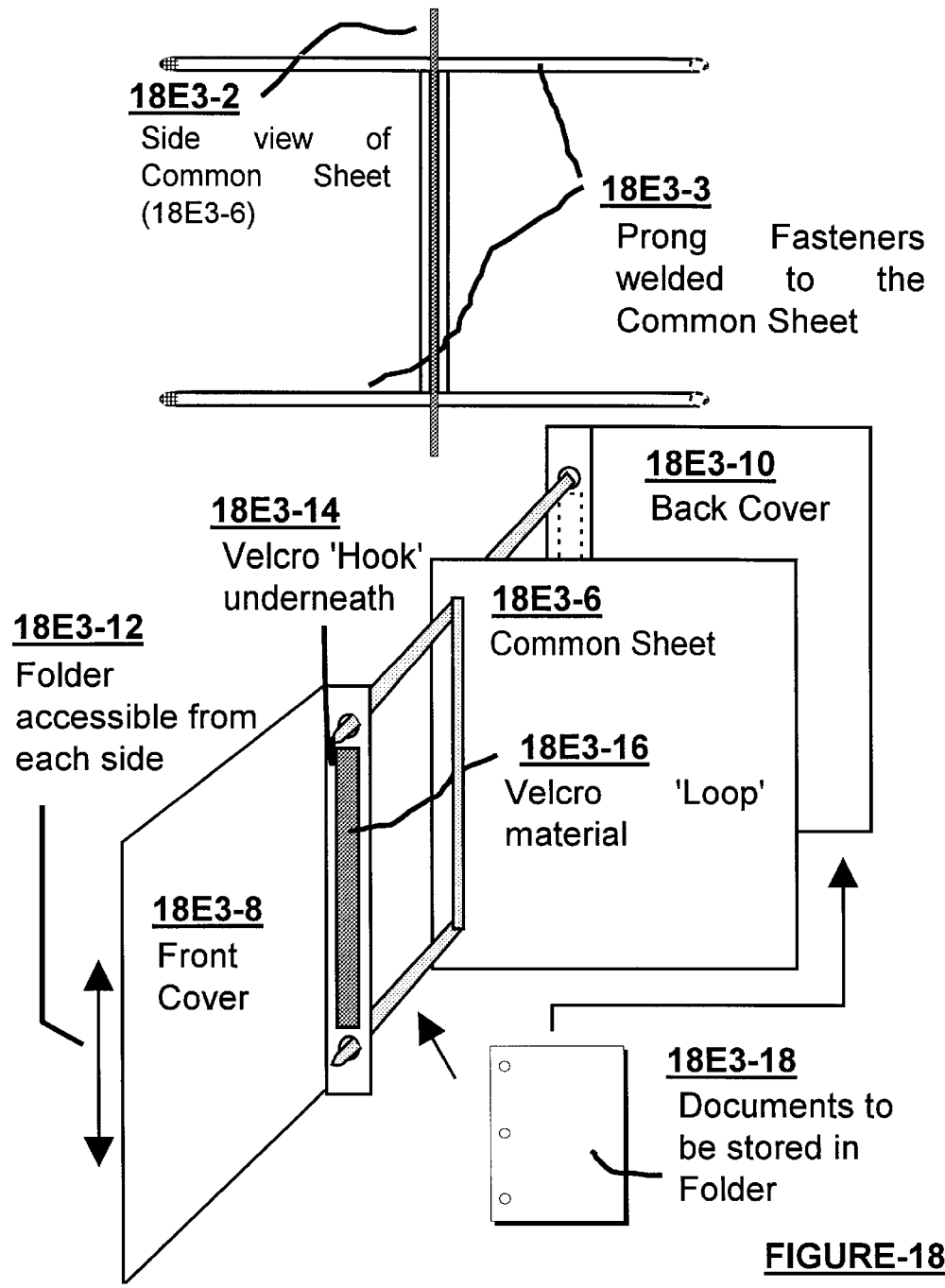

Expanding on the Tabbing System (first discussed in FIGURE 12A) by introducing 3 horizontal perfs in each Tab on each side
19A-02
Label Sub
tabs
19A-04
Protective
Sub-tabs
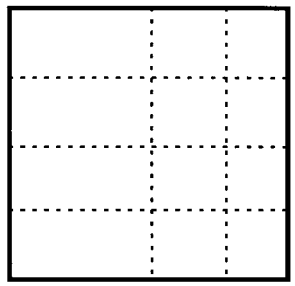
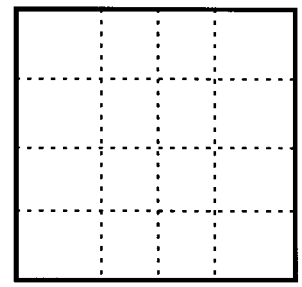
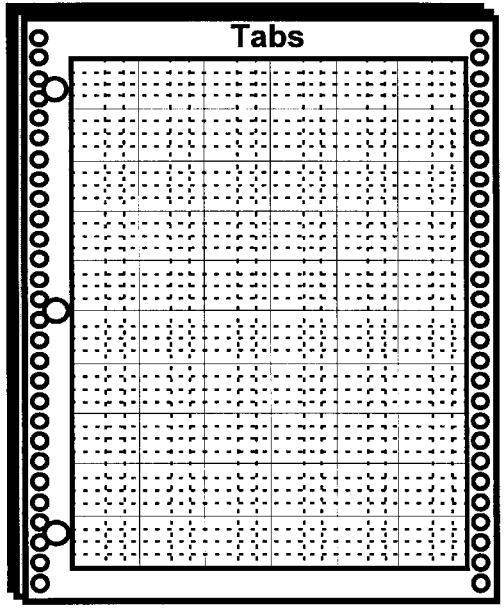
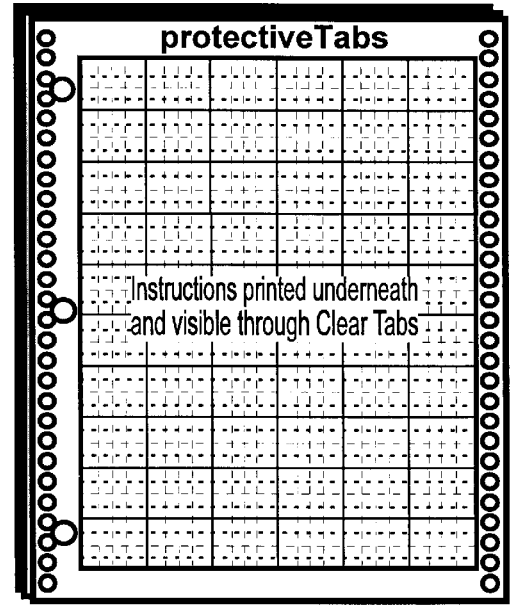
FIGURE-19A

The 'expanded' Tabbing System concept discussed in FIGURE 19A leads to a number of product applications:

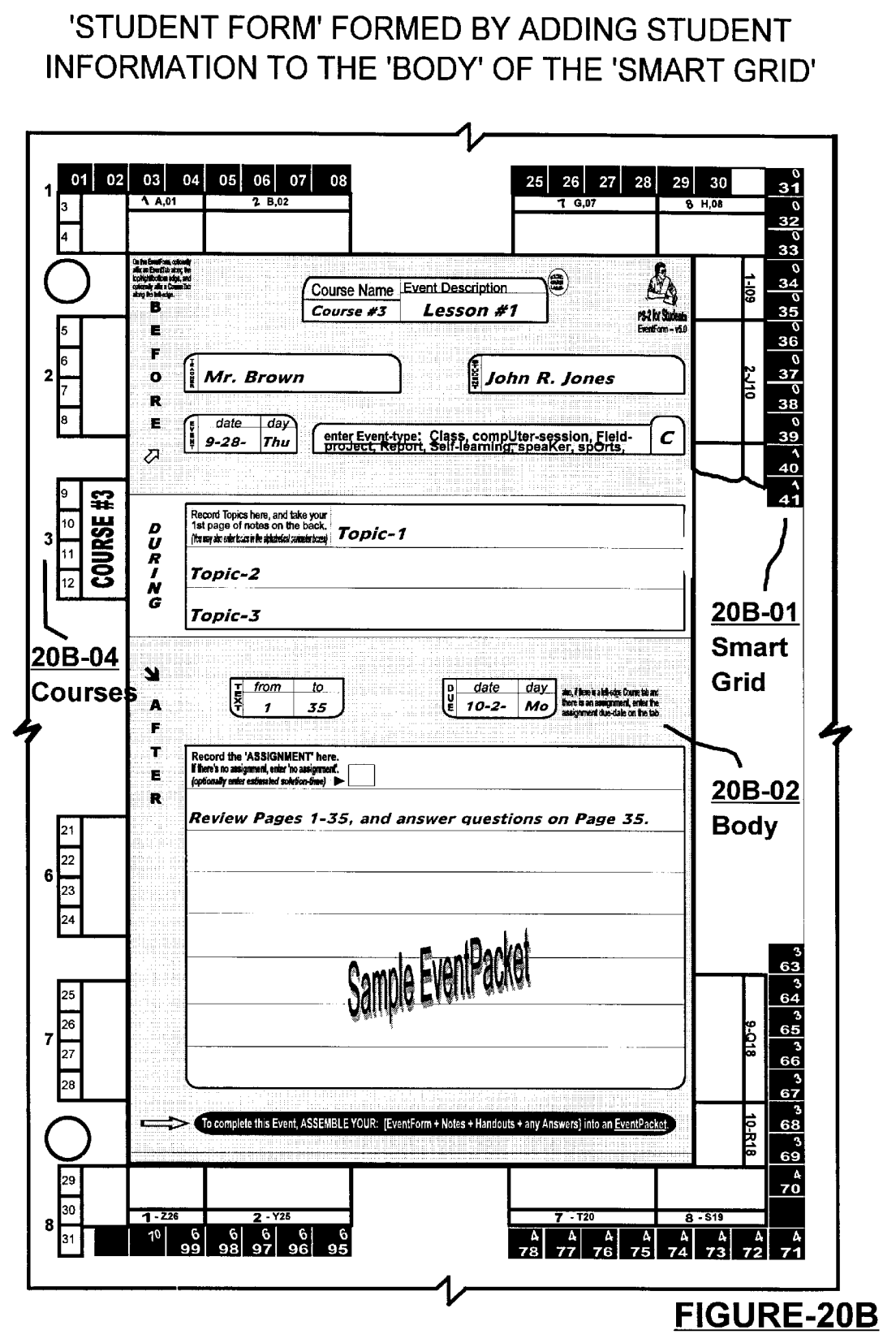

'STUDENT FORM' FORMED BY ADDING STUDENT INFORMATION TO THE 'BODY' OF THE 'SMART GRID'

20B-04 Courses

20B-01 Smart Grid

20B-02 Body

FIGURE-20B

A WINGED FOLDER (WF) THAT CAN BE CONFIGURED IN A MULTITUDE OF WAYS

PROCESS MANAGEMENT SYSTEM

CROSS REFERENCE TO RELATED APPLICATIONS

This application is a continuation-in-part of application Ser. No. 09/427,599 filed Oct. 27, 1999; now allowed, but which will be abandoned after filing this application. That application Ser. No. 09/427,599 was a continuation-in-part of: application Ser. No. 08/996,449, filed Dec. 22, 1997, issued on Nov. 2, 1999 as U.S. Pat. No. 5,975,580 to this inventor, Anthony Insalaco. This present application claims priority under 35 USC '120 for all common subject matter from those parent and grandparent applications.

STATEMENT REGARDING FEDERALLY SPONSORED RESEARCH AND DEVELOPMENT

None.

BACKGROUND OF THE INVENTION

1. Field of the Invention

The concept of a "process" is well known. In life, processes abound. Some are natural—as in the conception, gestation and birth of a child. Some are formulated and established by individuals in their daily lives—a person preparing for the start of a workday by going through a series of steps starting with awakening and ending with arrival on the job. A Process is a collection or series of related steps.

It is advantageous that 1) a process be comprised of consecutively performable steps; 2) the instructions on how to perform a process be a part of the Process itself; 3) that a step be capable of holding documents; and that 4) when documents are stored in or removed from or altered during a step, the resulting documents are immediately available to all physically linked steps, which may include steps of other processes.

The title of a step in a process should be the primary function to be performed and should preferably begin with a one-word action verb such as 'submit . . . ' or 'receive . . . ' or 'gather . . . '. Further, as a user enters a step of a process, the user should have at hand any necessary documents, accumulated from set-aside documents of predecessor steps and documents found directly in the step about to be performed. It should be pointed out that a step of a process may be devoid of documents or contain 'null' documents such that only the action provided by the step is necessary to accomplish the step. Such a step of a process might be: 'Verify that the lights are on in the warehouse'.

If the documents of a step within a process are to be used by any steps within any other related processes, it is of great value to have the steps linked, so that the documents developed by one step are readily available to other linked steps without further physical movement of developed documents. In this sense, a Process is a collection of documents—multiply titled by action verbs, each of which represents an ordered step of a Process in which said documents are acted upon.

2. Description of the Related Art

Process Management often involves the development of documents. A well-established approach of prior art is to focus on the efficient collection and organization of documents for ease of accessibility by the use of organizers, while the instructions on how to process such documents are kept separate from the documents themselves. A process management system is most often comprised of two separate major pieces; 1) the apparatus or the set of devices employed to develop documents and 2) the 'how to' instructions or method(s) on how to employ the apparatus. Therefore, most often, a user must come to a process management with some prior instructional knowledge on how to perform the associated process or processes.

SUMMARY OF THE INVENTION

It is therefore the objective of the present invention to overcome the drawback of the prior art and to provide a Process Management System that: 1) has the instructions on how to perform the process built into the execution of the Process itself; 2) establishes process steps that are consecutively ordered for ease of execution; 3) allows for the storage within process steps of developed; and 4) through a mechanism of linking steps of processes allows for the presentation of relevant documents to one step that were developed in other steps without separate retrieval by a current step. The present invention makes the process procedure an integral part of the documents that may be developed during the process and related processes that may utilize some of the same documents.

In addition, during the invention process of the Process Management System, a host of sub-inventions that further enhance the capabilities of the Process Management System was developed and will be discussed. In addition, these subinventions can stand alone as organizational enhancement products in any number of other related venues.

The present invention combines into a single system the method and means of managing the dispositions of documents as they move through their life-cycles under the control of a processes.

These and other related objectives are achieved according to the invention by a system that provides for performing the consecutively-ordered steps of a process and making resulting acted-upon documents readily available to subsequent linked steps comprising the same or other processes.

The embodiment chosen for invention illustration uses: 1) a standard ring binder with tabbed dividers as the organizer and 2) a student's academic day as the systematization target—having documents as the systematized documents. Because the invention is a 'Process Management System', it is obvious that many embodiments of the invention are possible—covering many Process-based applications—without departing from the spirit and scope of the invention.

Other objects and features of the present invention will become apparent from the following detailed description considered in connection with the accompanying drawings. It is to be understood, however, that the drawings are designed as an illustration only and not as a definition of the limits of the invention.

Glossary of Terms

| | Glossary of Terms: |
|---|---|
| Holder | An apparatus or method of holding materials in a logical order where such materials include dividers, documents and other things. Examples of such a holder includes, but is not limited to: ring binder, folder, clamp binder, a series of pockets, pocket folder, Acco-press binder, placing sheets between unbound leaves, accordion folder, file drawers, prong- fastener, metal pin fastener, hand-held while maintaining proscribed order, etc. |
| Raw edge | For example, taking a rectangular piece of unfinished corrugated cardboard and folding it produces a smooth roll at the roll point, but leaves all other edges in their natural or raw state. |
| Document: | Comprising any materials, where a document is the symbolic representation of such materials; |
| Divider: | A device used to separate documents for some purpose. |
| Step: | A discrete performable event within a process having an order among all the steps belonging to the process |
| Tab: | A way of locating a particular divider. One divider may have more than one tab. |
| Process tab | A tab on a divider that corresponds to a step in a Process. A step is performed by selecting a process tab. |
| Tab link | Two or more tabs on a divider are said to be linked. |
| Slipcase: | A box with one end open to allow for the insertion of an object - in this context a holder. |
| Tabbing System | A method and means of creating paper tabs from pressure-sensitive label material. |
| Paper Fastener | A method and means of attaching documents together with a fastener fashioned from pressure-sensitive label material. |
| Reversible Divider: | Bottom-tabbed Dividers constructed in such a fashion as to allow for reversibility. |
| Double-sided Folder: | A means for establishing a single 2-part Folder with a double-sided access. |
| Enhanced Binder: | A Binder with properties that allow the Binder an expanded scope of usage. |
| Topic Labels: | A means for enhancing learning & organization by placing graphics onto pressure-sensitive labels which may then be dynamically attached to common note paper so that a user may add descriptive value. |

Labeling conventions for a:

| | | |
|---|---|---|
| Process: | Process#:"name-of-the-process" | |
| | ex.: | Process1:Class-session |
| Step: | Step#:"name-of-the-step" | |
| | ex.: | Step4:GATHER |
| Process & Step: | Process#:name/Step#:name | |
| | ex.: | Process1:Class-session/ Step4:GATHER |
| | shorthand: | P#/S# or P#S# |
| | ex.: | Step5,Process2 is P2/S5 |
| Figure element | Drawing-element/# | |
| | ex.: | Drawing-element/5-12 where 5 refers to FIG. #5 and 12 refers to element-12 on FIG. #5. |

BRIEF DESCRIPTION OF THE DRAWINGS

FIG. 2A illustrates how the very labeling of linked processes establishes and defines a flowchart for the processes;

FIGS. 9A & 9B illustrate that one may create a set of bottom-tabbed dividers in such a way that the dividers have a multifaceted positioning and use;

FIGS. 9C & 9D illustrate that a set of dividers, analogous to those of FIGS. 9A & 9B, may be created for side-extending tabs for a multi-faceted positioning and use;

FIG. 9E illustrates that a set of square tabbed dividers with a specific hole-punch pattern may be created with tabs whose total length is no more than half the length of one side of the square, such that when multiple sets of such dividers are grouped and oriented, they form a super-set of tabbed dividers which allow for access from any one of fours edges when viewed as sitting in a divider holder—in a binder for example;

FIG. 10 illustrates the creation of a paper database by applying multiple tabs to a covering sheet of paper to a number of related of sheets paper in order to create multiple views to the covering sheet;

FIG. 11A illustrates the fabrication of a stand-alone Slipcase—with one end open to receive a binder that is referenced in this invention;

FIG. 11B illustrates that a "Drawer" may be fashioned to be used in concert with the Slipcase concept of FIG. 11A, such that when operating as a unit, the Slipcase/Drawer may serve as a storage medium for other common office products (pens, calculator, hole punch, etc.) and further may be placed in a ring binder or folder with easy side access;

FIGS. 11C1, 11C2 & 11C3 illustrates the folding process necessary to fashion the Slipcase discussed in FIGS. 11A & 11B;

FIG. 11E illustrates that the Slipcase of FIG. 11A may include varying styles of multiple internal separators, including a full-height style, as opposed to the style that emanated from the top only as presented in FIGS. 11C1 through 11C3;

FIGS. 12A through 12E illustrate the development of a Tabbing System which allows for the establishment of inexpensive paper tabs from common pressure-sensitive label material—whereby by the introduction of certain perforations and an accompanying grid locator system, such paper tabs may be placed along any edges of common sheets of paper with accuracy assurance. Additionally, a concept is developed whereby a protective covering plastic tab-label is incorporated as a part of the same paper tab-label construct, as well the instructions for the Tabbing System's operation;

FIG. 13 illustrates that from common pressure-sensitive label material, "Topic Labels" (labels with subject-pertinent graphics) may be die-cut and printed which may then be applied to common note paper to serve as a learning and organization enhancement tool.

FIGS. 14A through 14D illustrate the development of an "enhanced binder" with a number of beneficial features heretofore non-existent in a single binder.

FIGS. 16A through 16D illustrate the development of a 2-part folder that is expandable and may be accessed from either folder cover plus the additional concept that intervening dividers may be introduced between the covers that act independently from the covers-joining mechanism;

FIG. 17 illustrates an inexpensive and flexible Paper Fastening System whereby a sheet of normal pressure-sensitive label material is die-cut into sections which are then folded and applied to two or more common sheets or paper, each having at least one hole punch in the same location;

FIGS. 18A through 18E3 illustrate that a Prong Fastener may be advantageously fashioned in ways and materials different from the standard metal prong fastener that is in the public domain, including materials such as Velcro, magnetized strips, polyethylene or combinations thereof;

FIGS. 19A & 19B, illustrate that, by the introduction of horizontal perforations in the Tabbing System discussed in FIGS. 12A through 12E, one is able is achieve a number of additional applications of such Tabs.

FIG. 20B illustrates the creation of a "Student Form" used for academic organizational purposes—formed by installing student lesson information to the "body" of the "Smart Grid.

Figure 21A:
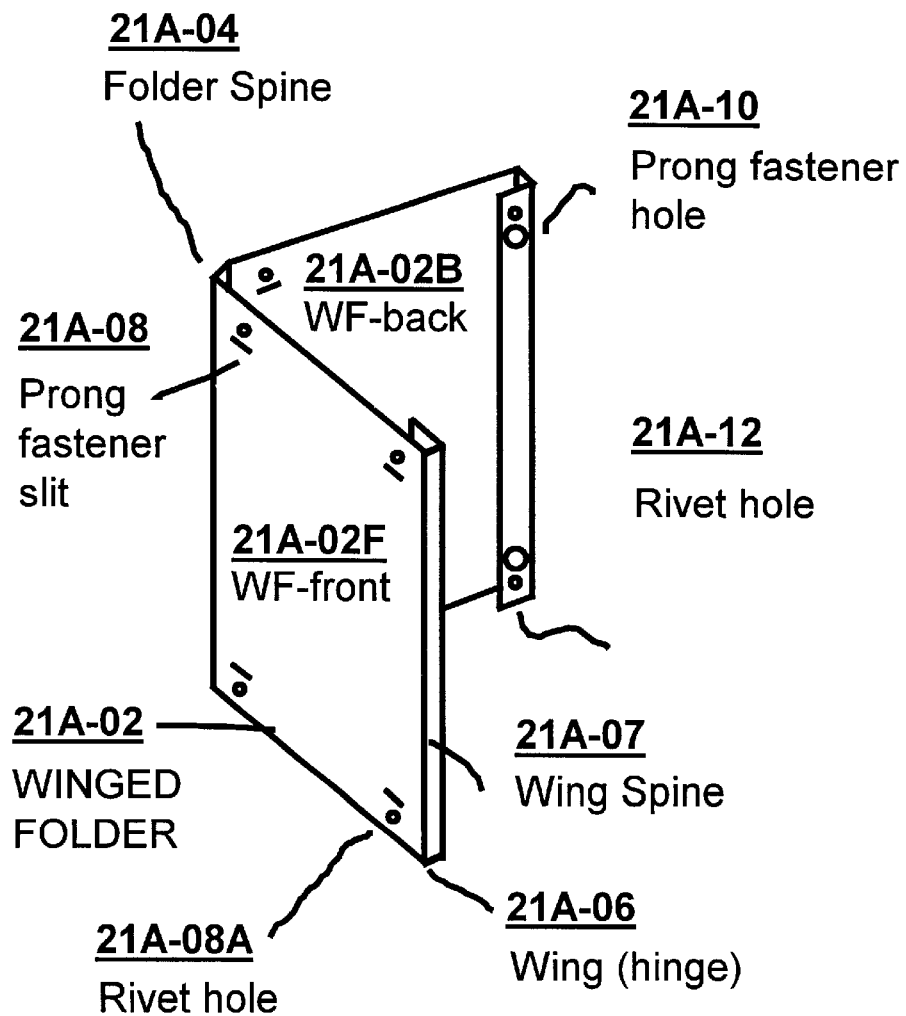

Finally, FIGS. 21A,B,C illustrate a "Winged Folder" that may be configured in a multitude of ways, including, but not limited to, a multiply-expandable folder.

DETAILED DESCRIPTION OF THE PREFERRED EMBODIMENT

Figure 1:
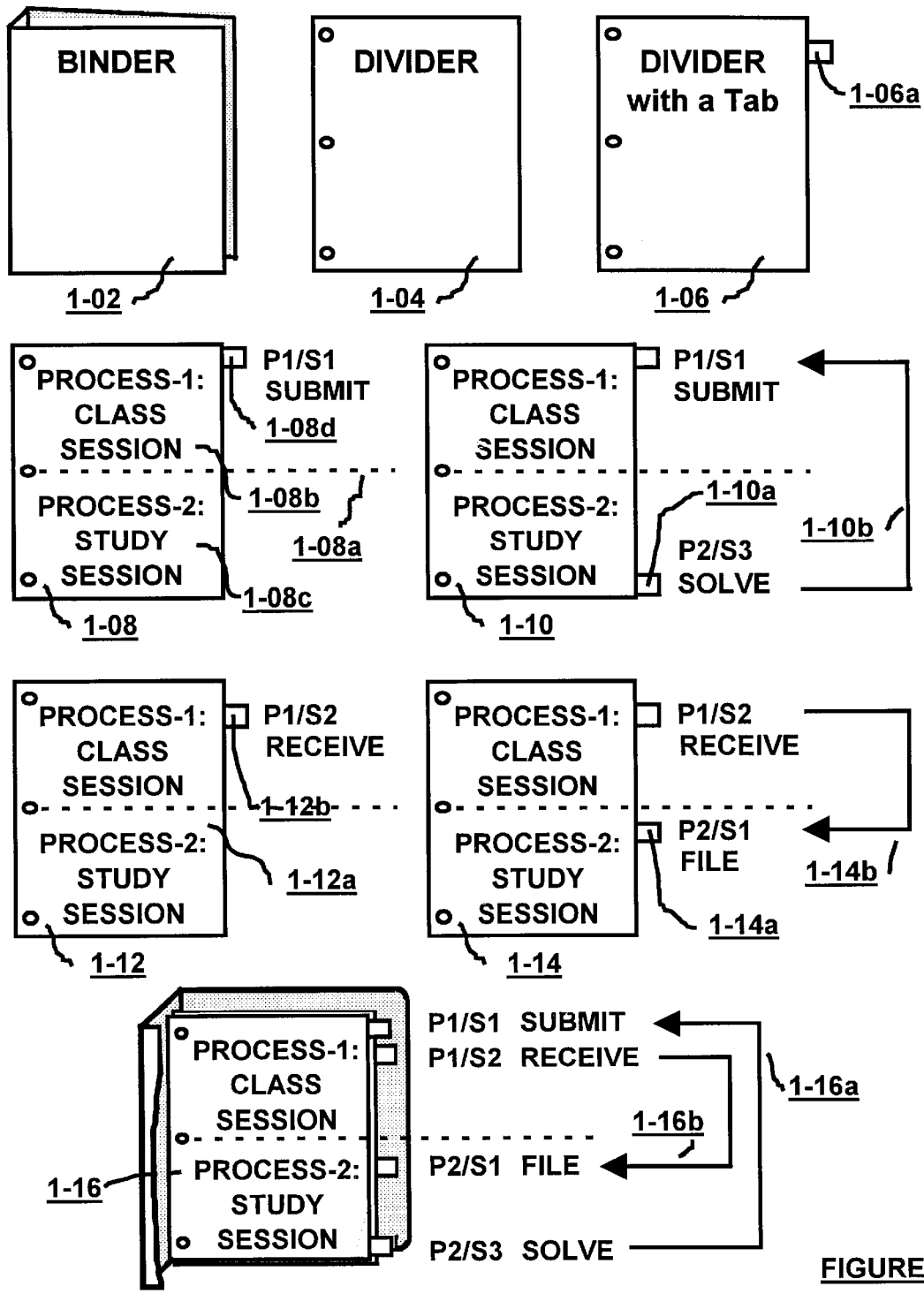
FIG. 1 illustrates the development of a an organizer having two Process-defining dividers with each divider having two linked steps.

In the drawings, wherein similar reference characters denote similar elements throughout the several views:

Referring now in detail to the drawings and, in particular to FIG. 1, wherein two steps of two related processes that govern the document-processing activities of a student's academic day are developed. The first Process is 'Process1: Class-session'. [1]The second Process is 'Process2:'Study-session'. Drawing-element/1-02 is an empty organizer, taking the form of a standard ring binder. It contains two dividers, which define the two aforementioned processes. In drawing-element/1-04, a standard divider is shown. Its purpose, as with all dividers in divider-applications, is to separate one collection of documents from another. In drawing-element/1-06, we identify the divider with a tab (drawing-element/1-06a). In drawing-element/108, the divider is logically divided into two process areas located about an imaginary horizontal line (drawing-element/1-08a). Above the imaginary horizontal line is Process1: Class-session (drawing-element/108b). Below the imaginary horizontal line is Process2: Study session (drawing-element/1-08c). In drawing-element/ 108d, an action-verb ('SUBMIT') is assigned to the tab—thereby converting the tab [2]from merely a labeling mechanism on a divider to a step in a process or a process tab; Step 1 of Process1: Class-session/Step1 or P1/S1 for short. Drawing-element/1-10 is the same divider as that shown in drawing-element/1-08, except that it has been expanded to include another step ('SOLVE'); namely the third step of Process2: Study-session/Step-3 or P2/S3 for short. (drawing-element/1-10a. Because, the two introduced steps, P1/S1 and P2/S3, reside on the same divider, they are viewed as "linked" (drawing-element/1-10b). Altering the document content during one of the aforementioned steps belonging to the two aforementioned processes automatically leaves the documents in the altered state when accessed during the linked step of the other process.

Drawing-element/1-12 represents a second divider. As with the first introduced divider (drawing-element/1-08), it is logically divided into two parts about an imaginary horizontal line (drawing-element/1-12a) in order to establish discrete locations for the steps of the two processes associated with the documents contained within this divider. The second step of Process1:Class-session is 'RECEIVE' and is introduced with drawing-element/1-12b. Its shorthand is P1/S2. In drawing-element/1-14, Step 1 of Process2:Study-session is introduced onto the same divider as P1/S2 and entitled 'FILE' (drawing-element/1-14a). As with the steps of the first divider discussed above (drawing-element/1-10), the steps of this second divider (drawing-element/1-14) are physically linked by virtue of the fact that they both reside on the same divider, the linkage represented by drawing-element/1-14b. Altering any document within either of the two steps identified by divider 2 will leave the document in an altered state when accessed by the other step on divider 2.

Finally, the two dividers are placed one on top of the other in drawing-element/1-16 to form a set—as they would be in reality when they reside in a binder. We clearly see the physical separation of the two processes about the aforementioned imaginary line and the two steps of each process. Documents that the student places into the 'STORE' tab during Step 3 of Process2:Study-session is readily available for submission from the "SUBMIT" tab during Step 1-1 of Process1:Class-session, because Step 1-1 is linked to Step 2-3—the linkage denoted by drawing-element/1-16aas developed by drawing-element/1-10. Similarly, documents that the student receives back from a teacher and places in the "RECEIVE" tab (Step 2 of Process1:Class-session) will be available for filing during Step 2-1 of the student's Process2:Study-session, because P2/S2 is linked to P1/S2—the link denoted by drawing-element/1-16bas developed by drawing-element/1-14. Thus a portion of two linked processes has been developed. The full processes will be developed next during the discussion of FIG. 2A.

Figure 2A:
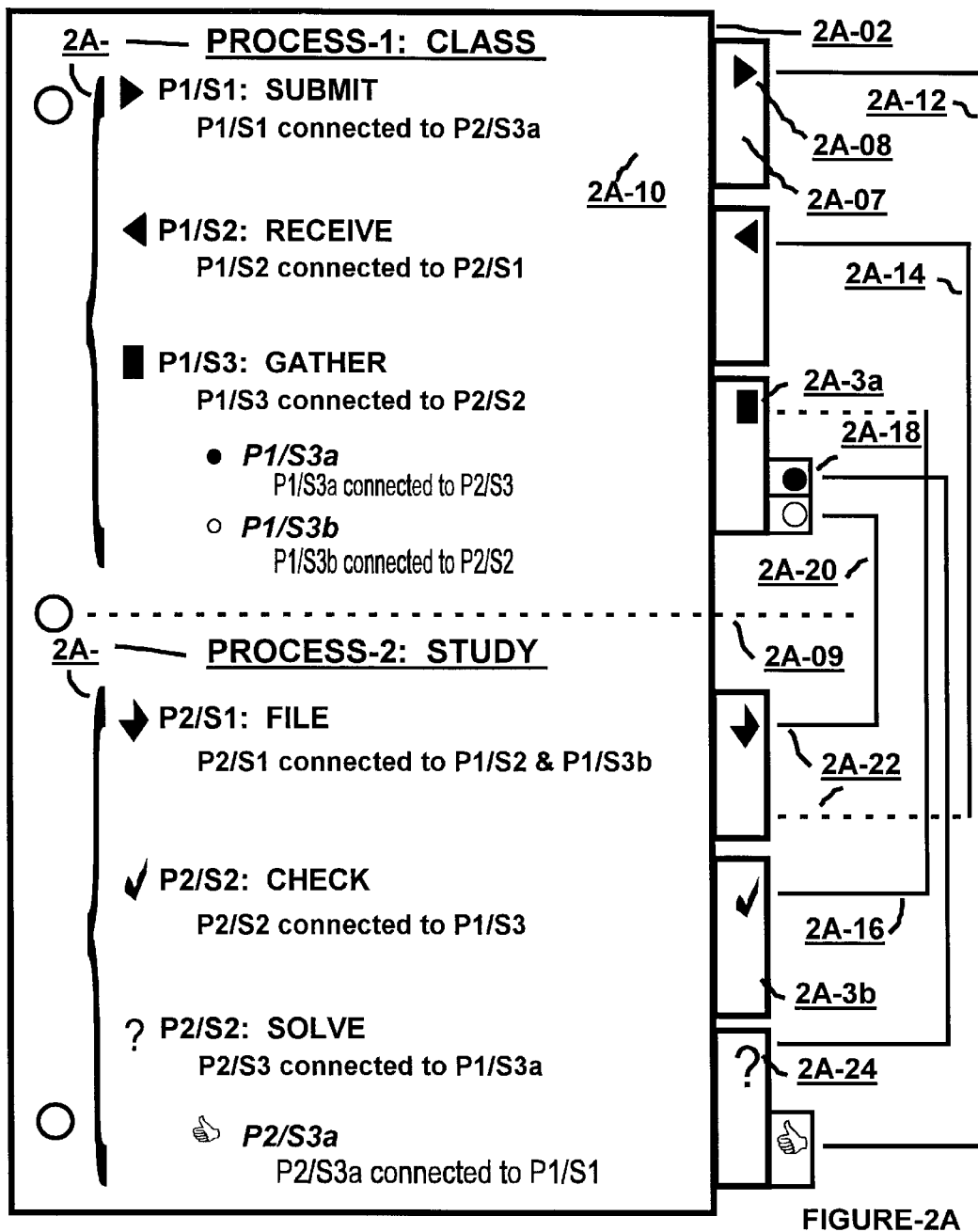
FIG. 2A utilizes the step-linking concepts of FIG. 1. in order to develop the two processes that reflect the document-processing actions of a student during the student's academic day—thereby forming a closed system governing the student's document management processing. In addition.

Referring now to FIG. 2A, is illustrated the full development of the two processes which form a closed document management processing system that governs the documents-processing activities of a student's academic day—thereby fleshing out the step linkage and Process1nterrelationship-building as begun in FIG. 1. Drawing-element/2A-02 refers to a set of four dividers. The four dividers, when taken as a whole, define the two processes. Each divider has two or more tabs (drawing-elements/2A-3a&2A3b for physical divider #1), where each tab represents a step in a process. The implicit connectivity is represented by drawing-element/2A-16.

The placement of tabs is such that one can visibly discern groups of tabs—separated by an imaginary line (drawing-element/2A-09). If a step lies above the imaginary horizontal, then such step belongs to Process1:Class-session (drawing-element/2A-04) and is performed in the order corresponding to its position in the plurality of steps lying above the imaginary line. Similarly, if a step lies below an imaginary horizontal line (drawing-element/2A-09), then such step belongs to Process2:Study-session (drawing-element/2A-06) and is performed in the order corresponding to its position in the plurality of steps lying below the imaginary line. Further, because each divider has 2 or more steps on it, such steps are defined as being linked (drawing-elements/2A-3a&2A3b linked by drawing-element 2A-16), although the processing order of a linked step is independent and related to the step's corresponding position within the plurality of steps of the process area in which it is located. Drawing-elements/2A-12,2A-14,2A-16,2A-18 & 2A-20 illustrate the linkages among the steps that define the two processes under discussion.

In terms of the governing processes, Process1:Class-session is defined by a one sentence directive; "Submit, Receive & Gather!". 'Submit' (drawing-element/2A-08 is the first step of Process1, with the steps proceeding in consecutive order and ending with the last step, Step1-3:Gather (drawing-element/2A-3a). A one-sentence directive defines Process2:Study-session; "File, Check & Solve!". 'File' is the first step of Process2, with the steps proceeding in consecutive order and ending with the last step, Step2-3:Solve.

Note that in the case of the "File" Tab, there are two connectivities (drawing-element/2A-22). When a student receives materials back from a teacher, he or she places it in the "Receive" Tab—P1/S2 or Process-1/Step-2). That act automatically makes the work available to the "File" Tab because both Tabs reside on the same divider. Similarly, during the "Gather" Step, if there is no assignment issued, the class materials are placed in the "open-circle" sub-Tab and are also made available to the "File" Tab, because the "open-circle Tab and the "File" Tab reside on the same divider. Taking these two connectivities into account, we see that there are actually three Tabs connected to the same Divider—namely the "Receive", "open-circle" and the "File" Tabs.

Figure 2B:
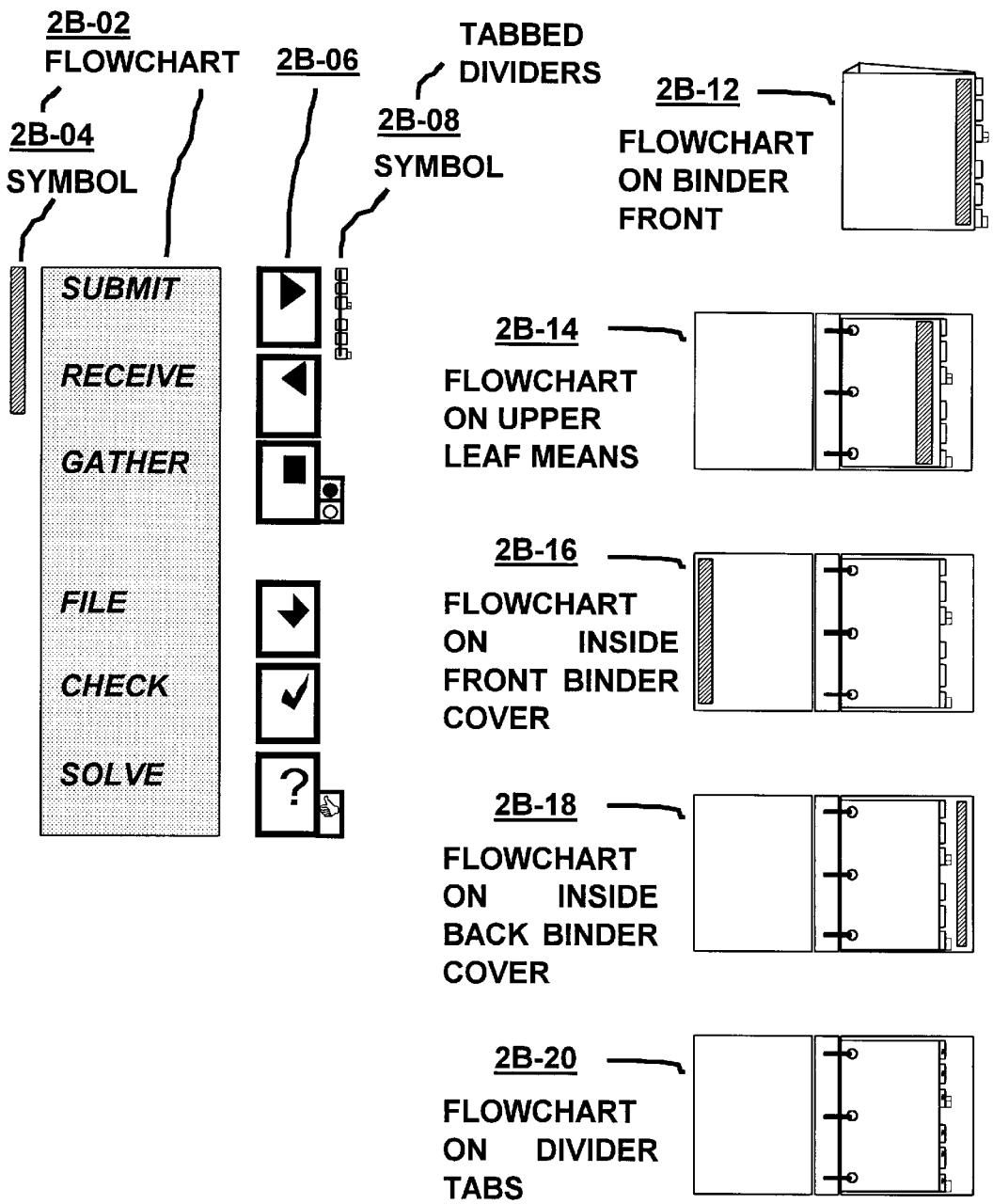
FIG. 2B illustrates how the flowchart for a process or linked processes may be displayed in any number of locations on or within the binder means.

Steps in a Process may be labeled in several ways, and because they are Steps (verbs), their very labeling establishes and defines a flowchart for a Process. The conventional means is to label a divider's tab with a name that indicates what is contained within the divider. However, because this invention utilizes such tabs as defining steps within a process, it is not practical to place all the words of a step's directives on a small tab. Rather, it is more convenient to place all of the directives of all steps on a conventional label that may be placed on its own untabbed divider and reside at the front of all dividers, taking the form of a Label-card. Drawing-elements/2A-10 is one element of the overall descriptive label and provides a description of what the action-verb 'SUBMIT' means. Another possibility is to place a Label-card attached to the back cover of the organizer, which protrudes past the horizontal width of the divider set and thereby visibly describes processes. In FIG. 2B will be discussed other areas where such a flowchart may be placed.

Drawing-element/2A-08 illustrates how a symbol or icon is utilized to provide a meaningful shorthand for a step's description. In fact, in practical usage, the full, literal descriptions fade into the background or may be removed completely—leaving only the icons to drive the processes. The "?" of drawing-element/2A-24 quickly substitutes for the associated literal description and comes to symbolize the area where a student finds all open assignments.

The Label-card may conveniently be configured with a plastic sleeve so that labeling nomenclature may be custom tailored to the needs of a user. Such a plastic sleeve also promotes the use of the organizer and methodology to be language—independent so that by merely interchanging an inserted paper label, a user can render the organizer into a different language—thus allowing for broad country-independent usage.

Process tabs may be also meaningfully colored-coded for additional user-friendliness. In fact, some applications of this invention may actually form the contour of the process tab into a shape that bespeaks of the action to be taken during the step. For example., during Step1-1:Submit, documents are located and turned into the teacher for grading. The tab associated with the action of submitting, in addition to of replacement of the 'right arrow icon depicted (drawing-element/2A-08) may have the tab contoured into the shape of an open hand pointing to the right—thereby making the action pictorial in nature.

Referring now to FIG. 2B, is illustrated the fact that the tab descriptions discussed above in FIG. 2A may be viewed as forming a flowchart for the linked processes used in this example. Drawing-element/2B02 shows the grouping of Process-1:Class Session steps and Process-2:Study Session Steps into a flowchart, both symbolized by drawing-element/2A-04. Drawing-element/2B06 shows the associated icon-displayed tabbed-dividers of Process-1:Class session and Process-2:Study Session steps, symbolized by drawing-element/2A-08.

In Drawing-elements/2B-12 through 2B-20 there is illustrated the fact that the flowchart for the Process Management System/student rendition. Among other locations, as examples of various flowchart placements, in drawing-element/2B-12 is illustrated how the flowchart may be placed on the front cover of the binder means. In drawing-element/2B-14 is illustrated how the flowchart may be placed on an upper leaf means within the binder means. Drawing-element/2B-16 illustrates how the flowchart may be placed on the inside front cover of the binder means. In particular, it may advantageously be placed on the left edge of the inside front cover of the binder means, such that if any leaf within the binder means is selected and rotated counterclockwise 180 degrees to lay on the front inside cover of the binder means, the flowchart remains visible. Drawing-element/2B-18 illustrates how the flowchart may be placed on the inside back cover of the binder means so it remains visible during the selection of any leaf within the binder means. Drawing-element/2B-20 illustrates how the flowchart elements may be placed on tabs of the tabbed dividers within the binder means. Moreover, the flowchart elements may be repeated on the reverse side of the tabs, such that as a tabbed divider is rotated 180 degrees counter-clockwise during the selection process, the flowchart element remains visible.

Figure 3A:
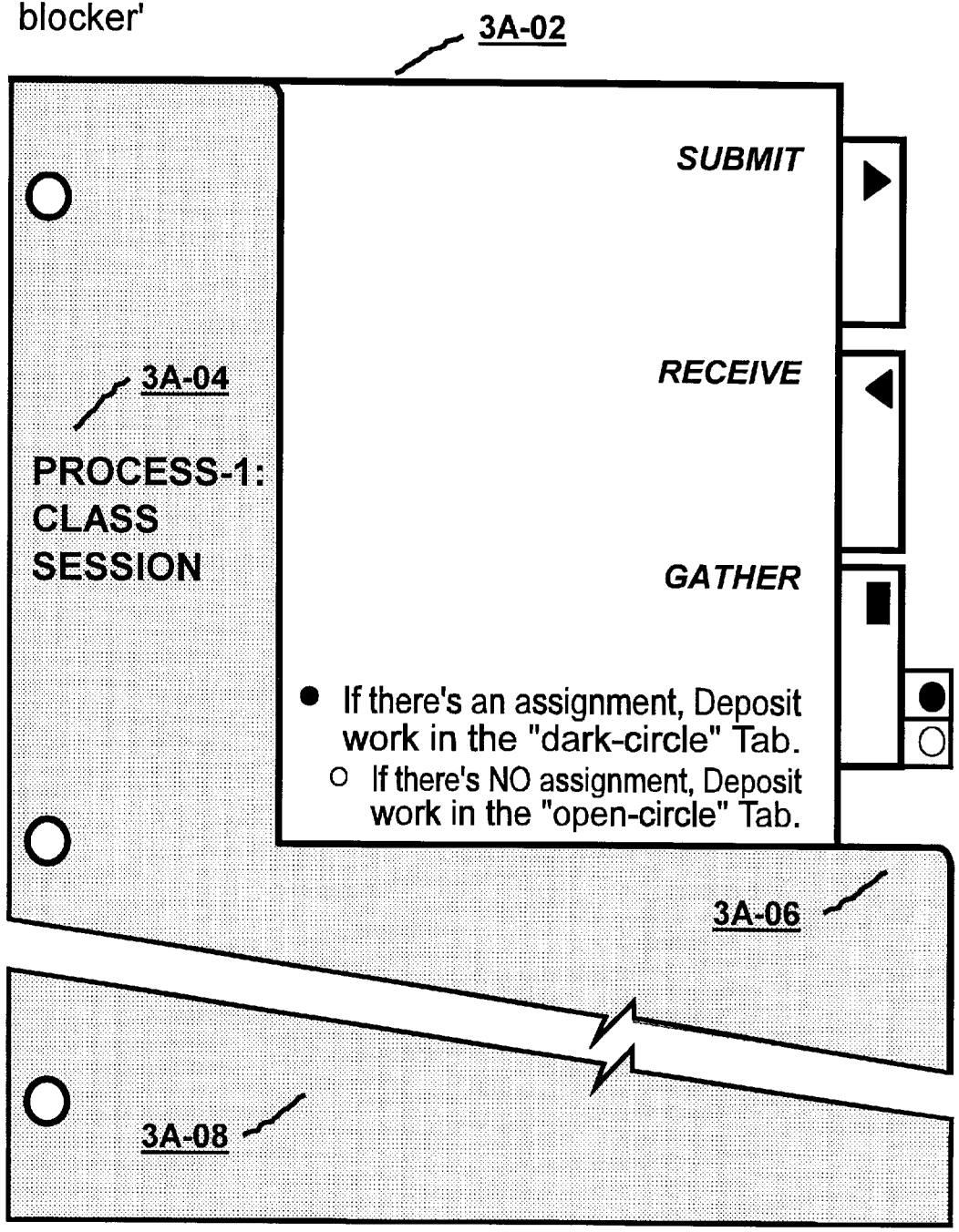
FIG. 3A illustrates a mechanism, for ease of user processing, whereby one or more processes may be made visible to the user, while other processes may be masked from user view when not in use by use of a shaped sheet.

Referring now to FIG. 3A, the set of four dividers is displayed (drawing-element/3A-02) representing the two processes that govern the document-processing activities of a student's academic day—as developed in FIG. 2A. In addition, there is a shaped sheet or Masking Card (drawing-element/3A-08) with one large vertical tab (drawing-element/3A-06). The purpose of the large vertical tab (drawing-element/3A-06) is (at the user's discretion) to block Process2:Study-session from view; including both its flowchart and actual process tabs. The illustration specifically refers to the view occurring during a student's classes (drawing-element/3A-04), when Process1:Class-session controls the student's document-processing activities, and the student wishes to block from view the entire Process2:Study-session process tabs and its flowchart. Conversely, during Process2:Study-session, the student 1) removes the Masking Card (drawing-element/3-08) from the organizer, 2) flips it about an imaginary horizontal axis line and 3) replaces it in the organizer. Because the Masking Card is symmetrical about the horizontal axis line, it will now cause the upper right hand portion of underlying dividers to be blocked from view—thereby blocking Process1:Class-session from the student's view and revealing the process tabs and flowchart of the Process2:Study-session. The Masking Card (drawing-element/3A-04) is a device optionally used in order to reduce the density of elements in the user's line of sight thereby promoting a focus on a current process or processes at a point in time while masking the other processes within the collection of processes. With this same principle, a user may choose to always have the flowchart (descriptions of all steps revealed), while optionally masking the tabs associated with the steps. This can easily be accomplished by placing the Masking Card after the Labeling-card or flowchart—as in this example where the flowchart is located on the upper leaf means.

Figure 3B:
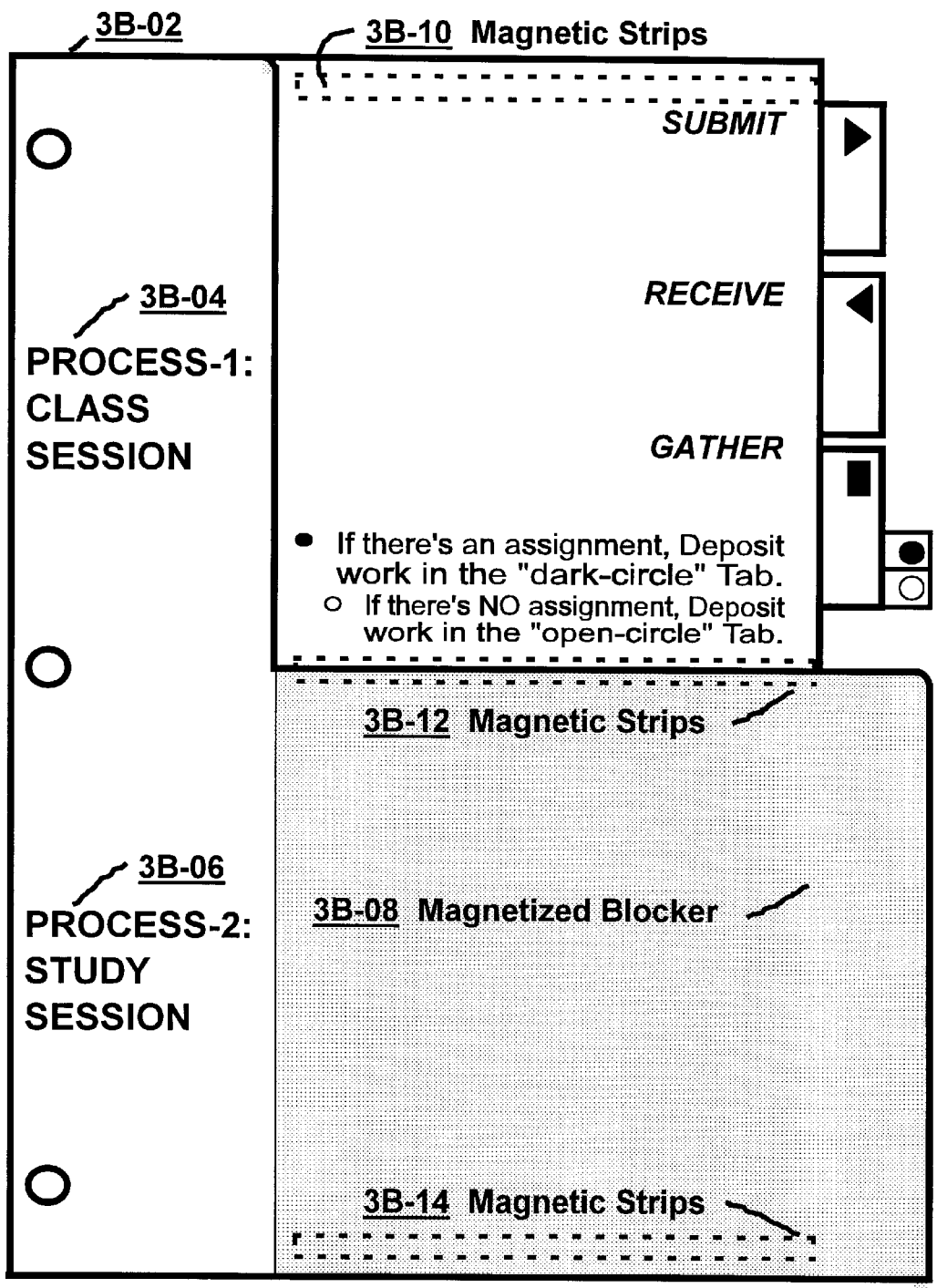
FIG. 3B illustrates another mechanism, for ease of user processing, whereby one or more processes may be made visible to the user, while other processes may be masked from user view when not in use by use of a magnetized blocker.

Referring now to FIG. 3B, in order to illustrate that there is a host of possible masking/revealing methods for processes, once again the set of four dividers from FIG. 3A is displayed (drawing-element/3B-02) representing the two processes that govern the document-processing activities of a student's academic day—as developed in FIG. 2A (drawing-elements/3B-04 & 3B-06). In addition, there is a magnetized masking sheet (drawing-element/3B-08) whose dimensions are such that (at the user's discretion) the flowchart and associated process steps of Process2:Study-session may be blocked from view. As opposed to FIG. 3A, where the Masking Card was a separate "divider" which sat in front of the set of process dividers, this manhood is by physical attachment of the Masking Card by the use of well-known magnetic materials in adhesive strip format. Specifically, three horizontal magnetic strips are adhered to the back of Process Divider number one at the top, middle and bottom right-side areas, as denoted by the dotted lines (drawing-elements/3B-10,3B-12 & 3B-14). In addition, two horizontal opposite-poled magnetic strips are adhered to the reverse side of the Masking Card at the top and bottom. In this case, the Masking Card is held in place by the implicit magnetic attachment that between the magnetic strips on the back of the Masking Card and the back of process divider number one.

The illustration specifically refers to the view occurring during a student's classes (drawing-element/3B-04), when Process1:Class-session controls the student's document-processing activities, and the student wishes to block from view the entire Process2:Study-session process tabs and its flowchart (drawing-element/3B-06). Conversely, during Process2:Study-session, the student 1) removes the Masking Card (drawing-element/3-08) from the front of the set of dividers, 2) rotates it 180-degrees about an imaginary horizontal axis line and 3) replaces it on the front of the set of dividers. Because the Masking Card is symmetrical about the horizontal axis line, it will now cause the upper right hand portion of underlying dividers to be blocked from view—thereby blocking Process1:Class-session from the student's view and revealing the process tabs and flowchart of the Process2:Study-session. This Masking Card rendition (drawing-element/3A-04) is a device optionally used in order to reduce the density of elements in the user's line of sight—thereby promoting a focus on a current process or processes at a point in time while masking other processes within the collection of processes. With this same principle, a user may choose to always have the entire flowchart (descriptions of all steps revealed), while optionally masking only the process steps (tabs) associated with process or processes. This can easily be accomplished by fabricating a narrower Masking Card that is minimally attached to divider one and protrudes to mask the tabs of (in this case) Process2:Study-session.

Figure 3C:
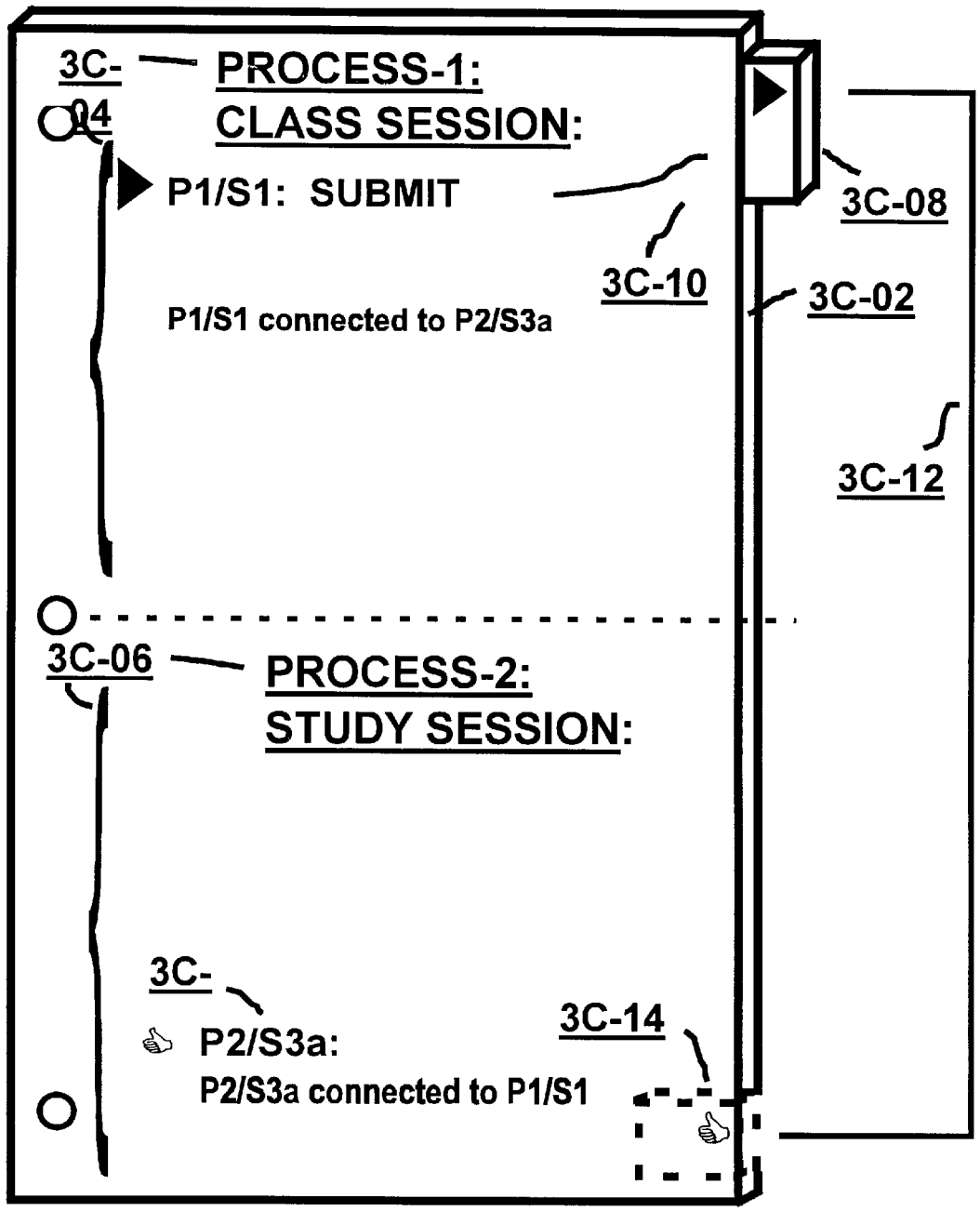
FIG. 3C illustrates another mechanism, for ease of user processing, whereby one or more processes steps may be made visible to the user, while other process steps may be masked from user view when not in use by use of a mechanical linking or related step-tabs whereby when one is blocked from view by physically pushing it in and thereby completely hiding it, its related step will move out into view.

Referring now to FIG. 3C, in order to illustrate that there is another means of masking the steps of one process while revealing the steps of another process, a single divider has been chosen from the set of dividers as originally illustrated in FIG. 2A (drawing-element/3C-02. Moreover, the divider has been established with sufficient "thickness" so as to "contain" its two related steps in the form of rectangular constructs (drawing-elements/3C-08 & 3C-14). Logically, the two steps belong to two different processes; Process1:Class-session (drawing-element/3C-04) and Process2:Study-session (drawing-element/3C-06), respectively. Further, the steps are defined by the labels shown in drawing-elements/3C-10 & 3C-16, respectively.

The underlying concept is that, by well-established mechanical principles, a device comprised of wheels and levers (other materials may also be candidates) may be fashioned to translate the logical connectivity (drawing-element/3C-12) of the step elements (3C-08 & 3C-14) belonging to the two stated processes into a physical connectivity, whereby when drawing-element 3C-14 is pushed toward the left into the divider (denoted by dashed lines because drawing-element/3C-14 will be completely hidden after having made a full entrance), drawing-element/3C-08 will have conversely moved toward the right and become visible (drawing-element/3C-08. By such means, the other dividers comprising the two processes may be similarly constructed so that hiding one step by physically moving it to the left has the effect of revealing one more of its related steps by an automatic movement to the right.

By such a mechanism, all tabs that are not relevant to a particular process are invisible to the user, thereby facilitating the execution of the process.

Figure 3D:
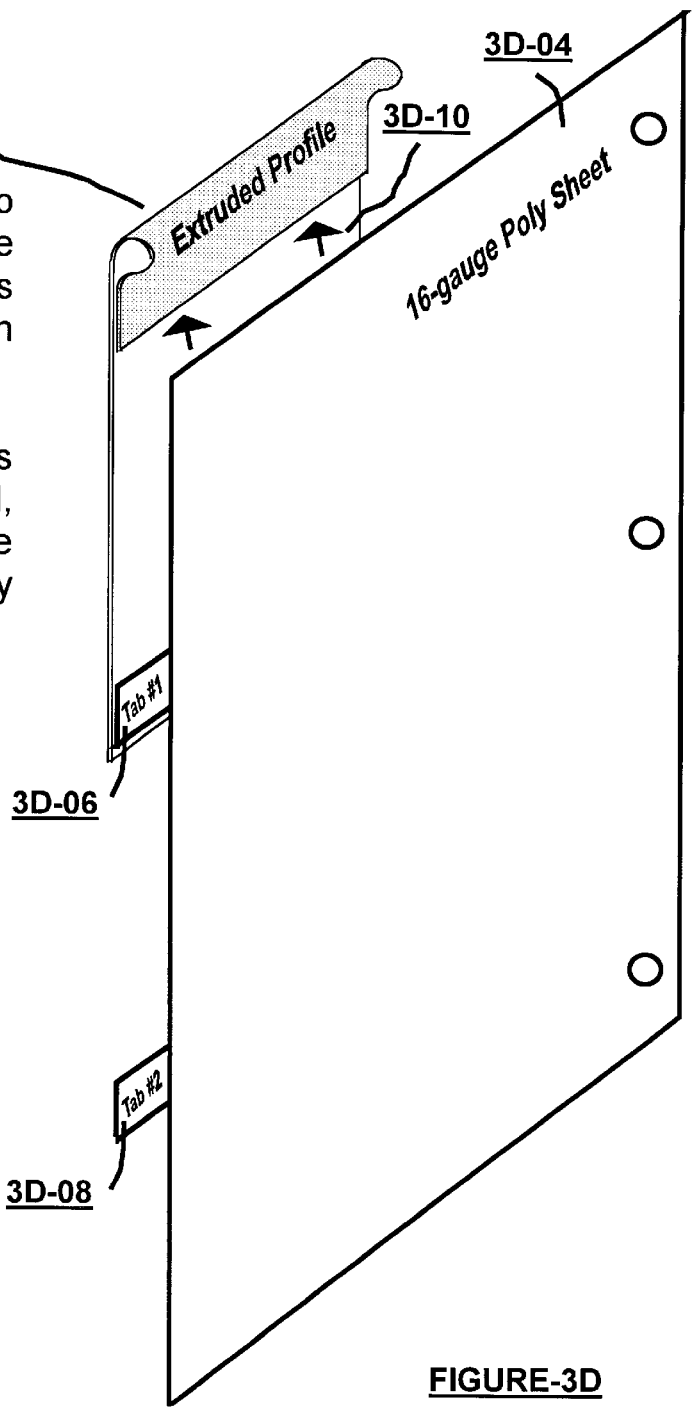
FIG. 3D illustrates another mechanism, for ease of user processing, whereby one or more processes may be made visible to the user, while other processes may be masked from user view when not in use by use of "clip on" blocker.

Referring now to FIG. 3D, it is illustrated that there is yet another masking/revealing method for processes that involves a "clip-on" blocker. In drawing-element/3D-04 is a polyethylene divider (although other materials may be used for a divider, including paper) with two tabs on it that represent the linked steps of two different processes (drawing-element/3D-06 & 3D-08). The objective is to reveal a tab belonging to one process while blocking the linked tab of the second process. The objective is achieved by the introduction "clip-on" blocker (extruded plastic, for example). The extruded profile and some of its specifications are represented in drawing-element/3D-02. Operationally, the polyethylene divider is "slipped under" the clip-on blocker" or conversely the "clip-on blocker" is slipped "over" the divider. This has the effect of blocking any tabs and nomenclature on the divider up to the extent of the "clip-on blocker's" dimensions. The direction of movement is illustrated by drawing-element/3D-10. Note, that although a divider is shown with the "clip-on blocker", the concept works equally well if the "clip-on blocker" is applied to the top or bottom edge of the binder that contains the process divider(s).

These discussions and illustrations of FIG. 3A, FIG. 3B, FIG. 3C and FIG. 3D are meant to be only four examples of many possible masking/revealing techniques including, but not limited to, Masking Cards that are attached via VELCRO, tabs and slots, snaps, sliders and others. In fact, this invention contemplates that users will devise their own masking hardware and techniques to satisfy their individual processing needs and strategies.

Figure 4:
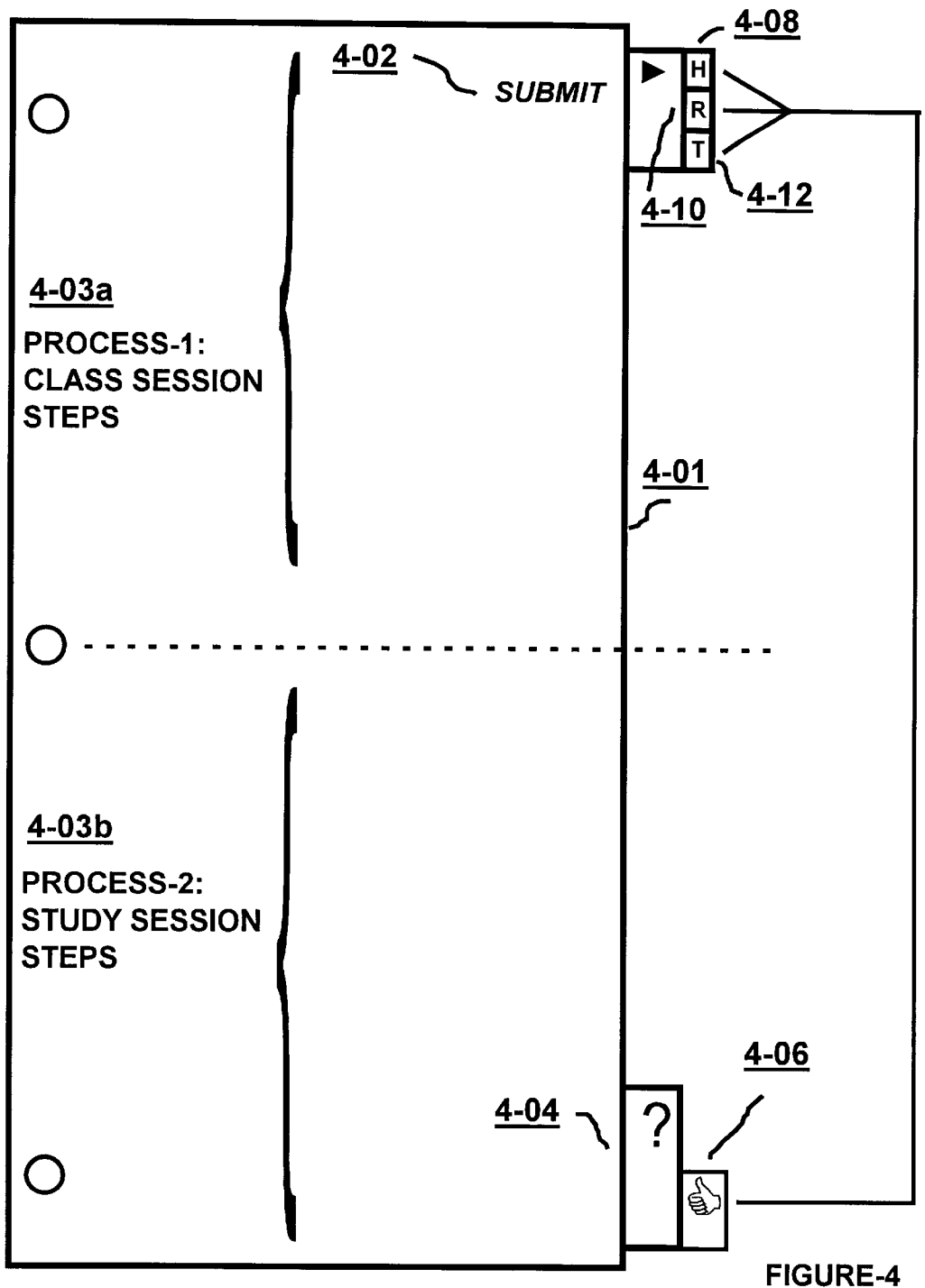
FIG. 4 illustrates that visible sub-Tabs may be introduced for finer document categorization.

Referring now to FIG. 4, one of the four major dividers heretofore illustrated in FIG. 2A is displayed (drawing-element/4-01). In addition 3 subdividers have been introduced, each with an extending sub-tab and labeled "H" for Homework, "R" for Reports & "T" for Tests (drawing-elements/4-08,10 & 12 respectively). Further, a subset of the overall flowchart from FIG. 2B is shown (drawing-element/4-03a & 4-03b) to represent the two processes that govern the document-processing activities of a student's academic.

It is sometimes desirable to introduce finer categorizations for documents that move among steps. For example, Step3:Solve (drawing-element/4-04) is the step in which a student solves open assignments and deposits the answers into the "thumbs-up" sub-tab. Rather than a wholesale placement of all "assignment answers" in the thumbs-up sub-tab, it is shown that a finer breakdown may be achieved in the way of Homework, Report and Test "answers" by introducing tabbed subdividers, which underlie the major "thumbs-up" tab (drawing-elements/4-08,4-10 & 4-12). By doing so, the student now has discrete locations into which Homework assignments (drawing-element/4-08), Report assignments (drawing-element/4-10) and Tests (drawing-element/4-12) may be deposited.

Because the Process1:Class-session/Step1:Submit tab (drawing-element/4-02) was chosen to be physically linked to the Process2:Study-session/Step3:Solve-"thumbs-up" tab (drawing-element/4-06) along linkage pathway (drawing-element/4-06), at the completion of a Homework assignment (for example) when the "thumbs-up" sub-tab is selected, the Homework assignment would be deposited into the underlying "Homework" or "H" sub-divider—the one with the "H" nomenclature on its tab (drawing-element/4-08). It therefore will surface as a discrete Homework assignment (as opposed to the Report or Test assignments) to be Submitted during the Process1:Class-session/Step1:Submit step The same correlation holds for the Report ("R") or Test ("T") process tabs (drawing-elements 4-10,4-12).

In this way, any number of finer breakdowns may be achieved within process steps, having tabs that are visible or not visible from the main flowchart level. For example, the "H", "R" and "T" sub-tabs (drawing-elements/4-08,4-10,4-12) could have had their dividers hidden by the main Submit divider and only become visible once a student accessed the Submit step. Moreover, they are not action steps in themselves but merely ride along as "nouns" or "little filing cabinets" to be used for document segregation.

Figure 5:
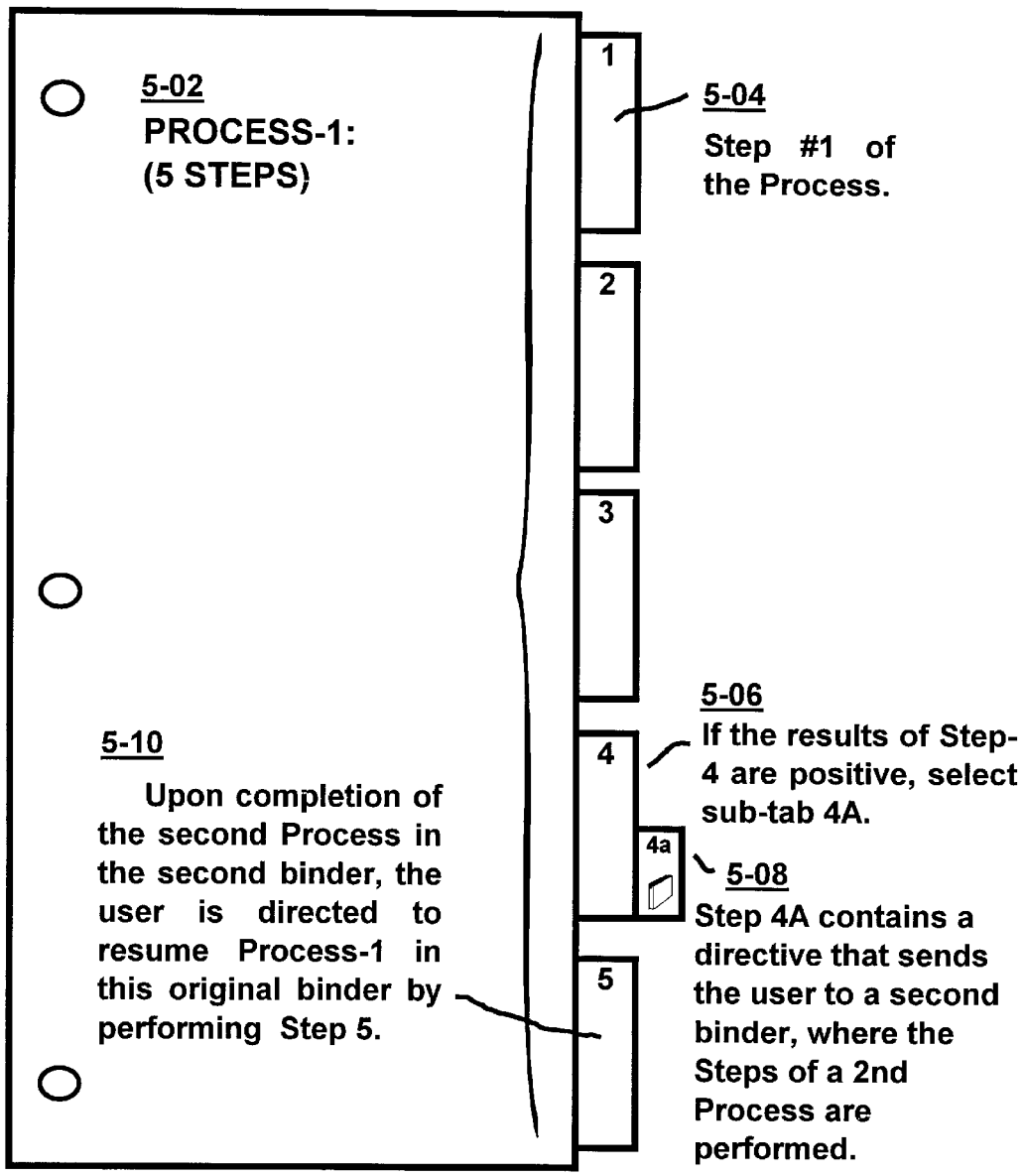
FIG. 5 illustrates how a step of Process-1 in Binder-1 may actually be a pointer into a 2nd Binder where a 2nd Process is performed—thereby allowing for the interleaving of any number of Binders & Processes, each having any number of Steps that are inter-related across multiple binders.

Referring now to FIG. 5, there is illustrated the fact that the a Step of a Process may be a pointer to another Process that resides in another binder. Drawing-element/5-02 illustrates Process-1 comprising five Steps, where Step #1 of the Process is accomplished by selecting Tab #1 (drawing-element/5-04) and so forth. A piece of logic within Process-1 states that if the results of Step 1–4 , (drawing-element/506), are positive, a user is dire to access Step 1–4a(drawing-element/5-08), which symbolically represents a second binder containing Process-1 A.

At the completion of Process-1A (in the second binder), the user is redirected back to the original binder shown— specifically to Step 1–5, where Process 1 is resumed (Drawing-element/5-10). At the completion of Process-1. By this concept of having a tab within a Process symbolically represent another binder containing another Process or Processes, one may develop very complex, yet discernible, applications across any number of binders containing any number of inter-related Processes.

Figure 6:
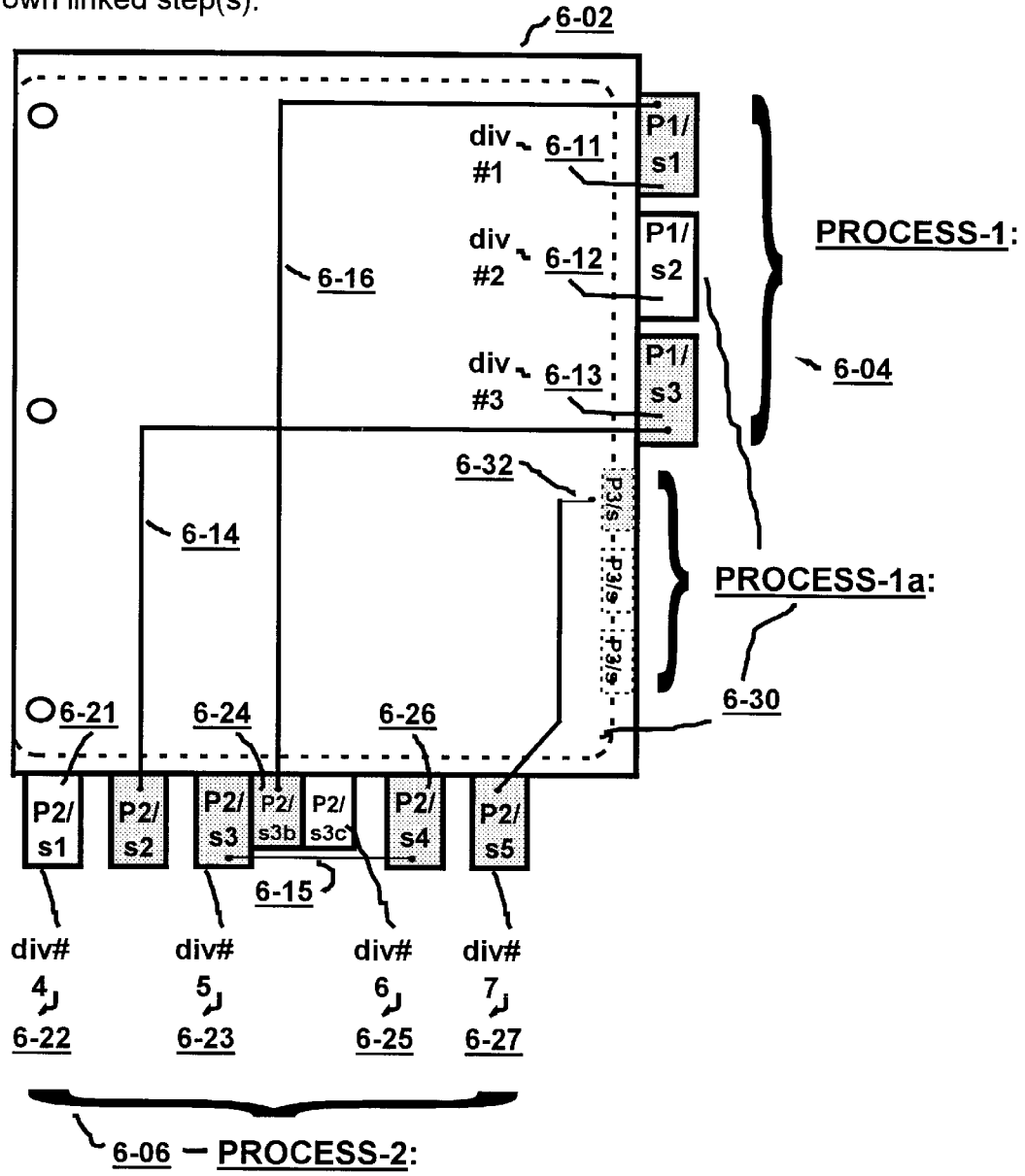
FIG. 6 illustrates that: 1) the tabs of process steps may reside along multiple edges of a divider-set, 2) a process may include linked and non-lined process tabs and 3) a step of a process may lead a user to an underlying process with its own linked steps.

Referring now to FIG. 6, it is illustrated that 1) process tabs of a process may be located on any edge of a divider, 2) linked and non-linked process tabs may coexist within the same process and 3) an implementation of the invention may hide a process until it can be revealed by selecting a process tab of a another process. In this Figure, if a process tab resides on the same divider as another process tab, it is known as a "linked" process tab and is distinguished by being shaded.

There is a set of seven dividers (drawing-element/6-02). Process1 (drawing-element/6-04) comprising three steps. Step1 of Process1 resides on divider #1 and has a corresponding tab labeled as P1/s1 (drawing-element/6-11). Step2 of Process1 resides on divider #2 and has a corresponding tab labeled as P1/s2 cam. (drawing-element/6-12). Step3 of Process1 resides on divider #3 and has a corresponding tab labeled as (drawing-element/6-13).

Process2 comprises five steps (drawing-element/6-06). The steps and its corresponding tabs of Process2 are located along a different edge (bottom edge) of the divider set from those defining Process1 (right edge). Step1 of Process2 resides on divider #4 and has a corresponding tab labeled as P2/s1 (drawing-element/6-21). Step2 of Process2 resides on divider #3 because it is linked to P1/s3 along the linkage pathway represented by drawing-element/6-14, and has a corresponding tab labeled as P2/s2 (drawing-element/6-22). Step3 of Process2 resides on divider #5 and has a corresponding tab labeled as P2/s3 (drawing-element/6-23). Additionally, there are two sub-steps that, along with P2/s3, that form the entire Step 3 of Process2. The first sub-tab corresponding with Step3/part 1 is labeled as P2/s3*b* (drawing-element/6-24) and resides on divider #1 because it is linked to P1/s1 along the linkage pathway represented by drawing-element/6-16. The second sub-tab corresponding with Step3/part-2 is labeled as P2/s3*c* (drawing-element/6-25) and resides on divider #6. Step4 of Process2 resides on divider #5 because it is linked to P2/s3 along the linkage pathway represented by drawing-element/6-15, and has a corresponding tab labeled as P2/s4 (drawing-element/6-26). Step5 of Process2 resides on divider #7 and has a corresponding tab labeled as P2/s4 (drawing-element/6-26). Step5 of Process2 resides on divider #8 and has a corresponding tab labeled as P2/s5 (drawing-element/6-27).

Illustrating another concept of the invention is the fact that selecting a tab of a step may direct the user to launch an underlying process that is hidden from view until the launching process tab is selected. In this example, selecting the tab of the second step of Process1 (drawing-element/6-12) directs a user to an underlying process, Process1A (drawing-element/6-30). In addition, Step 1 (P1A/S1) of the underlying Process1A dividers is physically linked to Step5 of Process2, along the linkage pathway represented by drawing-element/6-32. Upon selecting Step 1 of the underlying Process1A, the user may find documents that were deposited there by Step5 of Process2 (drawing-element/6-27) during the previous performance of Process2/Step5. The user performs the remainder of Process1A and, upon exiting, resumes performing Process1/Step2. In this manner, a leveling of process may be achieved with application-defined linkages among process tabs. In this manner, a complex application may be made manageable by "masking" subsidiary processes from view.

Figure 7:
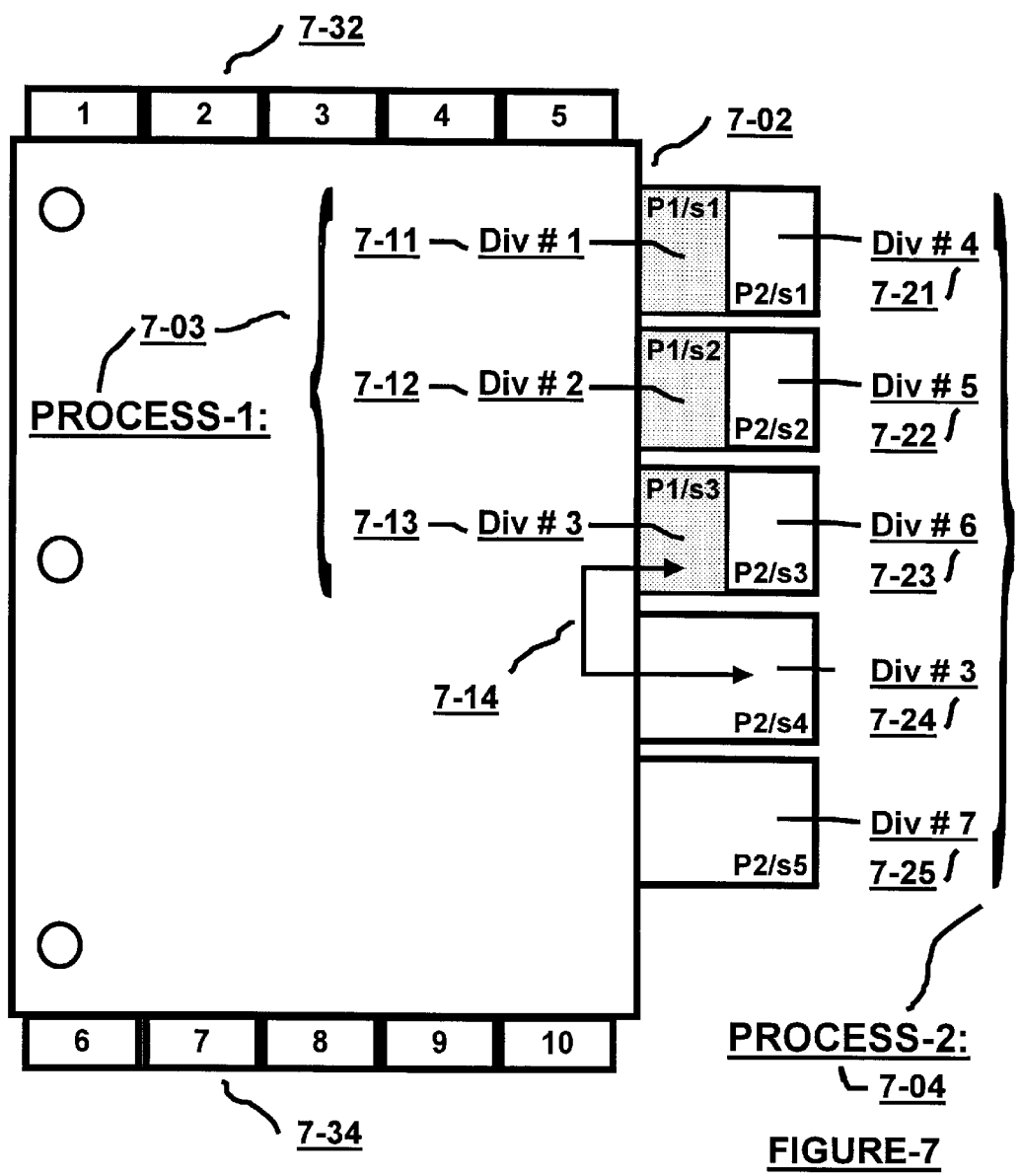
FIG. 7 illustrates that multiple processes may exists "side-by-side" on one edge of a divider set using differing extension lengths for the process tabs of the processes.

Referring now to FIG. 7, it is illustrated that in a certain application of the invention, a user wishes to have two processes "side-by-side" on one edge of divider by extending the process tabs of on of the processes. Moreover, the concept of process tab linkage is achievable. Drawing-element/7-02 is a set of seven dividers, which define two processes. Process1 comprises three steps (drawing-element/7-03). Divider #1 contains of Process1/Process tab-1, entitled P1/s1 (drawing-element/7-11); divider #2 contains Process1/Process tab-2, entitled P1/s2 (drawing-element/7-12); divider #3 contains Process1 /Process tab-3, entitled P1/s3 (drawing-element/7-13).

Process-2 comprises five steps. (drawing-element/7-04). Divider #4 contains of Process2/Process #tab-1, entitled P2/s1 (drawing-element/7-21); divider #5 contains Process2/Process tab-2, entitled P2/s2 (drawing-element/7-22); divider #6 contains Process2/Process tab-3, entitled P2/s3 (drawing-element/7-23). Process2/Process tab-4 resides on divider #3, along with Process1/Process tab-3. These two process tabs are known as "linked" process tabs and are linked along the linkage pathway represented by drawing-element/7-14. Documents placed in such linked process tabs during a process are available all other process tabs comprising the linked process tabs. Divider #5 contains Process2/Process tab-5, entitled P2/s5 (drawing-element/7-25). Process2 process tabs have a longer extension length from the body of their respective dividers and, thereby, are visible simultaneously with Process1 process tabs.

In this example, in addition to the process tabs located along the right-edge of the Process-defining, there may be another set of dividers with tabs that are not part of any process. Such tabbed dividers have the conventional use of only storing documents—not to store documents as part of a process. They are displayed along the top-edge of the dividers, one of which is denoted by drawing-element/7-32, and along the bottom-edge of the dividers, one of which is denoted by drawing-element/7-34. An example to support this configuration of dividers in an organizer is the case of a delivery person. As a user of the organizer, the delivery person may use Process1 for morning deliveries and Process2 for afternoon deliveries. Such a delivery person may wish to reserve the top and bottom edges of a divider set in an organizer for conventional, referential, non-process tabs to hold relevant documents by customer; the top-edge may be for customers 1 through 5 and the bottom-edge may be for customers 6 through 10—the right-edge is reserved for the two processes and their corresponding process tabs that govern the delivery activities.

Figure 8A:
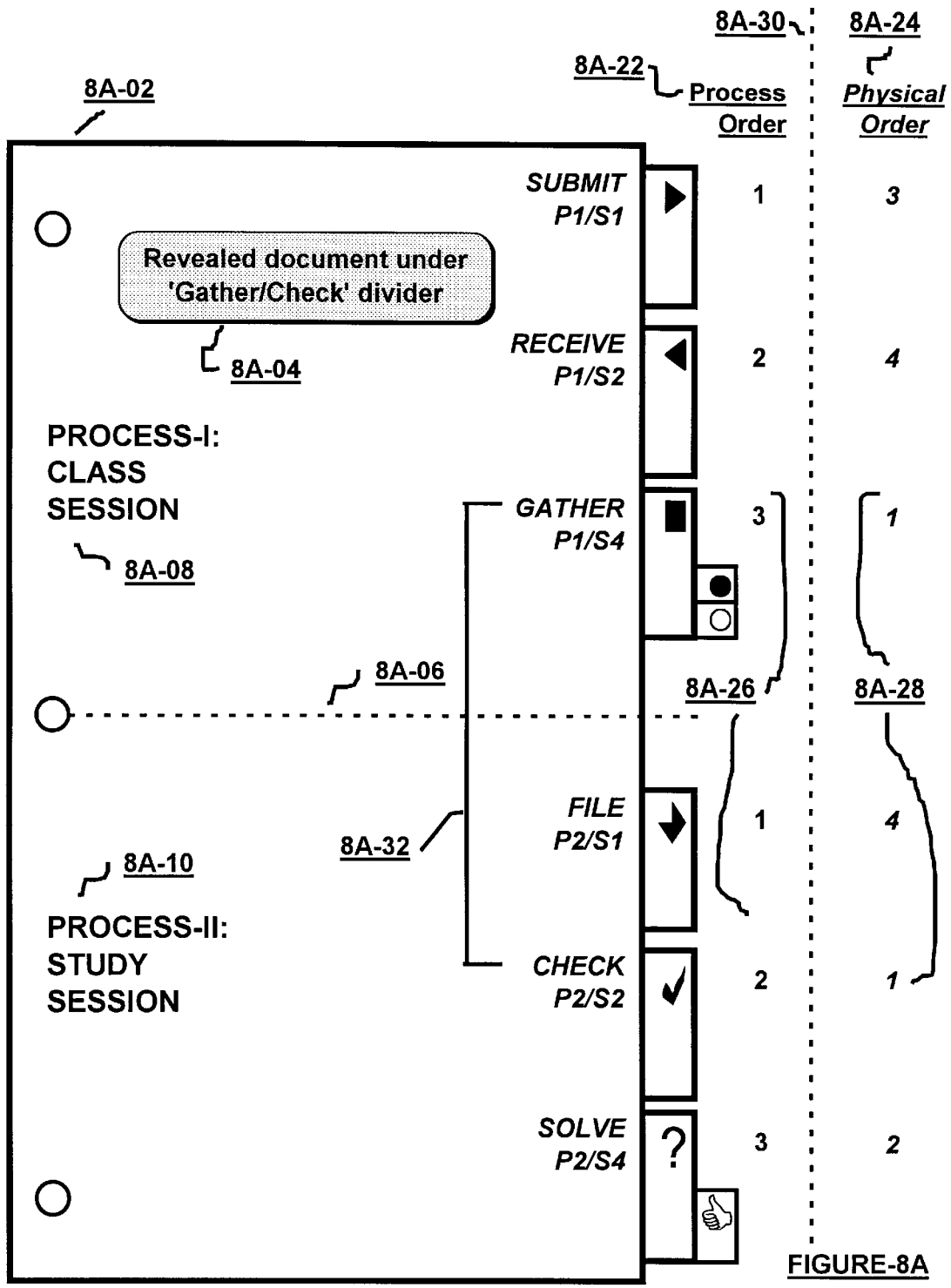
FIG. 8A illustrates that the first physical divider is not necessarily the first logical divider of a process—thereby allowing for the establishment of a mechanism to reveal a document that resides in a divider other than the first logical divider in an organizer.

Referring now to FIG. 8A, it is illustrated that there exists a mechanism to reveal a document that resides in a divider other than the first logical divider in the organizer. A step in a Process is selected by a corresponding tab. The tab is a physical part of the divider. The divider has a physical position in the organizer. It is reasonable to say that the tab has a physical order. However, the same tab has an order in which it is processed. It is reasonable to say that tab has a process order that is distinct from its physical order. Drawing-element/8A-30 is an imaginary vertical line that distinguishes the physical processing order (drawing-element/8A-22) from the physical order (drawing-element/8A-24) for each tab. Using the invention's example from FIG. 2B, we define the document-processing activities of a student's academic day by the use of tabs representing process steps residing on four dividers, which in turn reside in an organizer.

Process1 is the Class session (drawing-element/8A-08) comprising three steps and Process2 is the Study session (drawing-element/8A-10) comprising three steps. Each process tab has a process order and a physical order. For example, the "Gather" step of Process1 is processed third, but resides on a divider which is located first among the set of four dividers. The reason for this reality is follows.

On any given class day, in the Process1:Class-session/Step3:GATHER tab of the organizer, there are documents—each of which may be pre-printed to correspond to a student's class for the day and ordered by class occurrence. Such documents are used by a student to gather class topics along with the assignments associated with respective classes. The document is referred to as an "Lesson form". The name of the class is pre-printed on the document— "English class" for example. It is advantageous for the class name to be visible so that when the student opens the organizer, the name of the next class will be visible through a revealing window (drawing-element/8A-04) cut into the divider. If the "GATHER" process tab, being the third step were to be located as the third divider, the intervening documents in process tabs 1 through 2 would block the assignment document from view. The solution advanced by the invention is to place the "GATHER" divider as the first one in the organizer, so that the first of its documents will be visible through the revealing window that is cut into the "GATHER" divider. Drawing-elements/8A-26,8-28 show that the "GATHER" divider is physically located first in the organizer (for the purpose of document revelation as discussed previously) and logically located third with respect to the order in which its associated tab is selected during the Process1 flow.

Following this line of reasoning, there is another process tab, Process2:Study-session/Step2:CHECK. When the student selects such process tab, the student is locating documents residing in Process1/Step2 because both process tabs are physically attached to the same divider along the linkage pathway represented by drawing-element/8A-32. In reality, physical divider #1 is the GATHER/CHECK divider. Moreover, it should be noted that each of the process tabs on the one half of the divider set is physically linked to one or more process tabs on the other half of the divider.

The purpose of Process2:Study-session/Step2:CHECK is for the student to have a positive step in order to check for necessary inventory in the organizer, where one inventory item is the desirably-visible Lesson form. Therefore, if there are no more Lesson forms in the organizer, a message stating such will show through the revealing window, since the message is a static document that resides as the last document under the GATHER/CHECK divider.

In summary, the location of processing process tabs on the dividers is critical because the order of such process tabs defines the processing order of a process. The physical placement of the actual dividers is only important when the satisfaction of a particular requirement is necessary, such as the example of masking an underlying process as discussed in FIG. 6, or the side-by-side requirement of two processes as discussed in FIG. 7, or the "revealing window" case as discussed in this illustration. Except for such situations where one divider may have to be purposely placed ahead of another one., the physical order of a divider in a set of dividers is random.

It should be pointed out that the documents in a process tab may suggest a sub-process. When such documents are moved to a linked process tab during a process, one can consider the sub-process as being relocatable or dynamic in nature. Further, a user may have an actual set of dividers that define the sub-process, and such a divider set itself may be moved (along with its contained documents) to a linked process tab. One may consider the sub-process represented by the set of sub-dividers as being dynamic in nature. This concept and capability is extremely powerful and allows for defining complex interwoven processes that exchange reusable and relocatable sub-processes—depending on the needs of the invention's particular implementation.

Figure 8B:
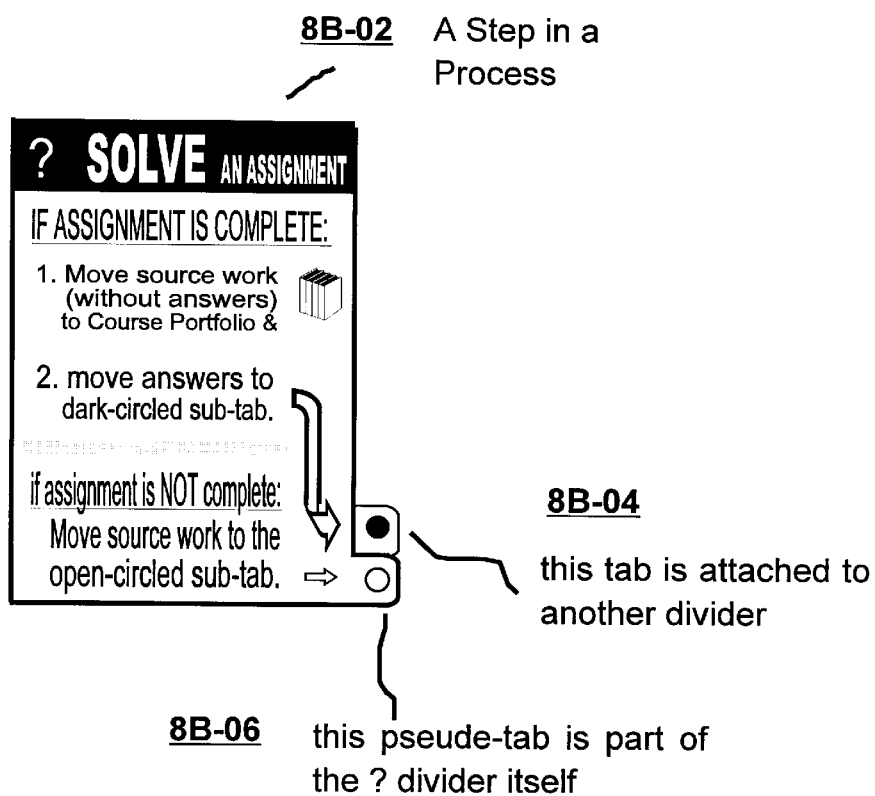
FIG. 8B illustrates that the resulting action of a step in a process may be to move a document back into the causal step—thus creating a recursion.

Referring now to FIG. 8B, it is illustrated that a user enters a step in a process that is a 'decision' step (drawing-element/8B-02). The user is directed to solve an assignment (removing the documents from the step to work on them), and then to make a decision. In this case, the user has two choices. One choice directs the user to move the referenced documents to the dark-circled sub-step, which is a visual part of the step but resides on a separate divider (drawing-element/8B-04). The other choice directs the user to move the documents to the open-circled step, which is merely a printed on the original step (drawing-element/8B-06). If the user chooses this latter option, the documents will, in effect, be moved back into the step from which the documents were originally removed to be acted upon. This powerful device establishes a recursion, whereby, according to program logic, documents may be moved back into the place from which they emanated.

Figure 8C:
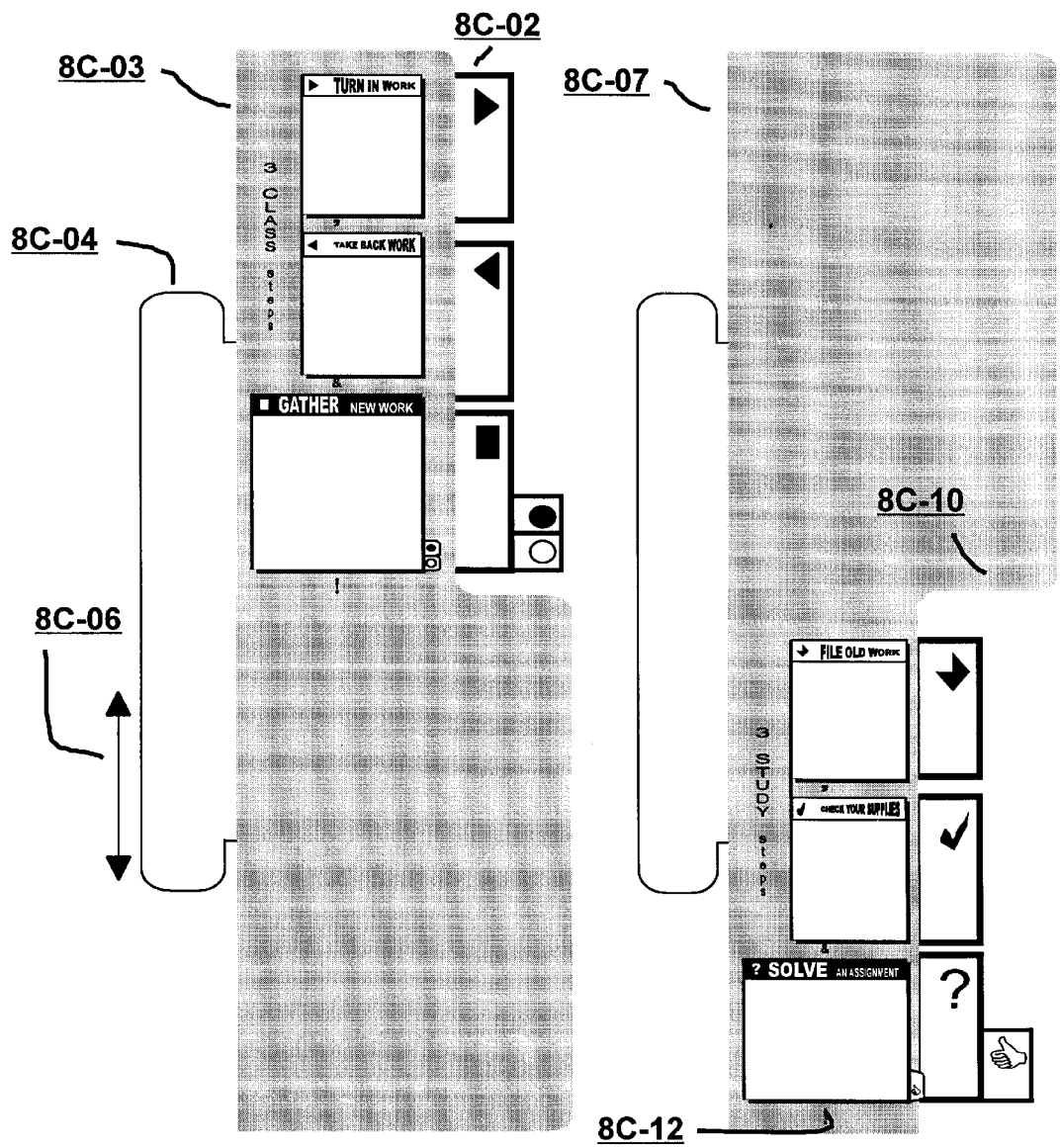
FIG. 8C illustrates that a flowchart to a process may be placed on one side of piece of material that serves to block the underlying steps of a linked process and whose reverse side serves to hold the steps of the linked process, such that when the piece of material is rotated 180-degrees, the second process is revealed while block the underlying steps of the first process.

Referring now to FIG. 8C, it is illustrated that the flowcharts for the two linked processes referred to throughout this Specification may reside on opposite sides of a piece of material (drawing-elements/8C-03, 8C-07) that is dynamically attached (drawing-element/8C-04) to the binder (or any other holder that holds the step-dividers of the processes) according to a connecting shape (such as that shown in drawing-element/8C-04) and may be fashioned to include a blocker section (drawing-element/8C-10) that masks the underlying Steps of the oppositely-visible Process (drawing-element/8C-02).

When a user wishes to reveal the steps of the opposite process, the blocker piece (drawing-element/8C-03) is removed from the binder by disengaging its holding prongs (drawing-element/8C-04) from the binder's holding slits and rotated 180-degrees (drawing-element/8C-06). This action will cause Process-1 flowchart and associated steps (drawing-element/8C-02) to be covered and Porcess-2 flowchart and its associated steps (drawing-element/8C-12) to be revealed.

Figure 8D:
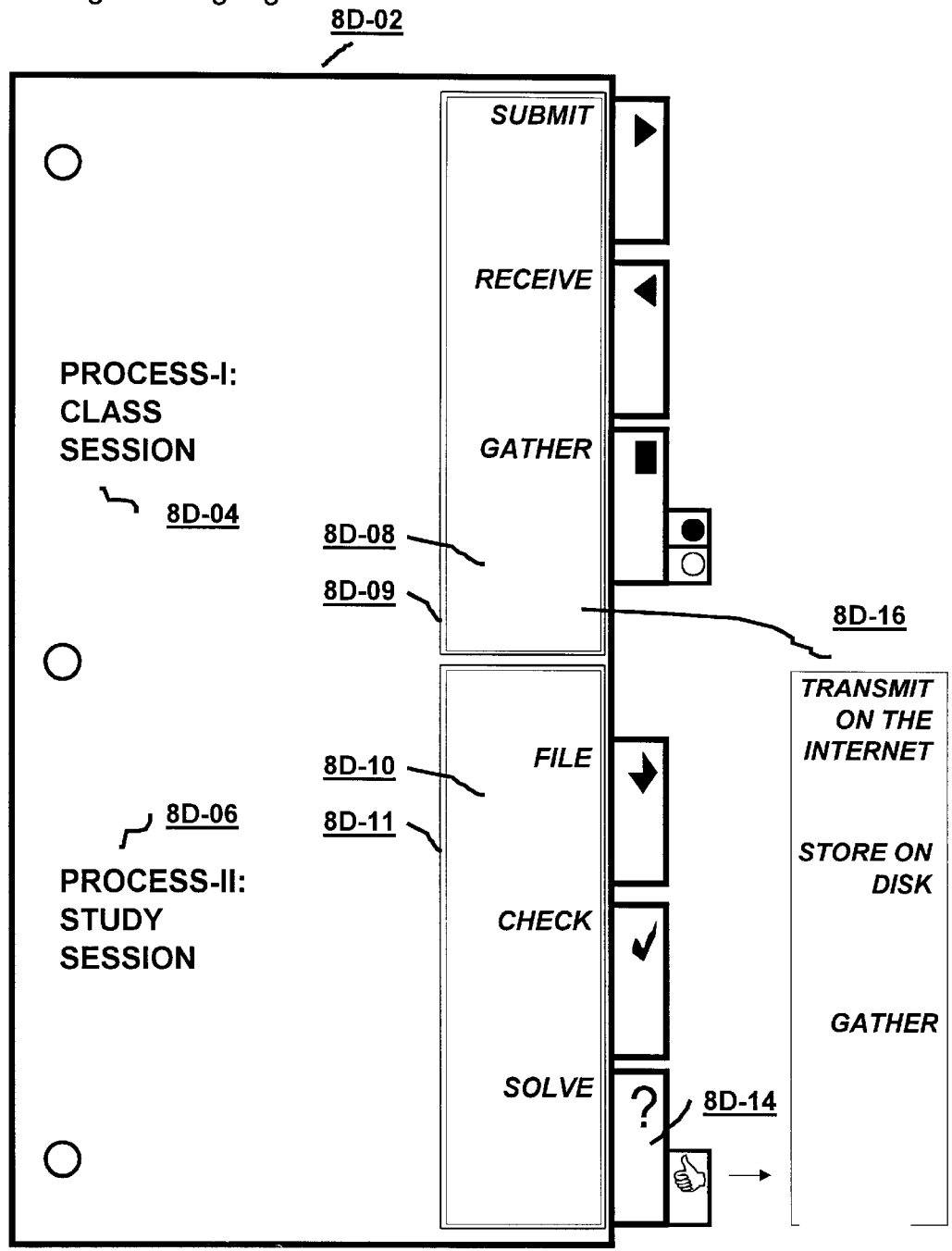
FIG. 8D illustrates that the flowchart governing a process may be altered or replaced by a new flowchart that is derived from executing a step in the original process, according to some governing logic.

Referring now to FIG. 8D, it is illustrated that the flowchart governing a process may be altered or replaced by a new flowchart that is derived from executing a step of an original process, according to some governing logic contained within the step. Specifically, Process-1 (drawing-element/8D-04) has a governing 3-step of, flowchart that is printed on paper (drawing-element/8D-08) and contained within an adjacent plastic protective sleeve (drawing-element/8D-09). Process-2 (drawing-element/8D-06) is static and remains unchanged throughout the life of the process and has a governing 3-step flowchart that is printed on paper (drawing-element/8D-10) and contained within an adjacent plastic protective sleeve (drawing-element/8D-11). Within the Solve Step, a document is removed for solving, and it is of such a nature that it generates an alteration in the flowcharting of Process-1. The user, locates a new governing flowchart for Process-1 (drawing-element/8D-16), slips it into Process-1's plastic sleeve (drawing-element/8D-08), such that the next time the user processes Process1, the new flowchart will be in place to control the steps' activities. Of course, there may be some subsequent reversal procedure, whereby the original flowchart is returned to the uppermost visible layer (drawing-element/8D-08)

The power of this dynamic step renaming cannot be overestimated. For many processes, this capability proves to be a powerful tool in the Process Management System's tool bag.

Figure 8E:
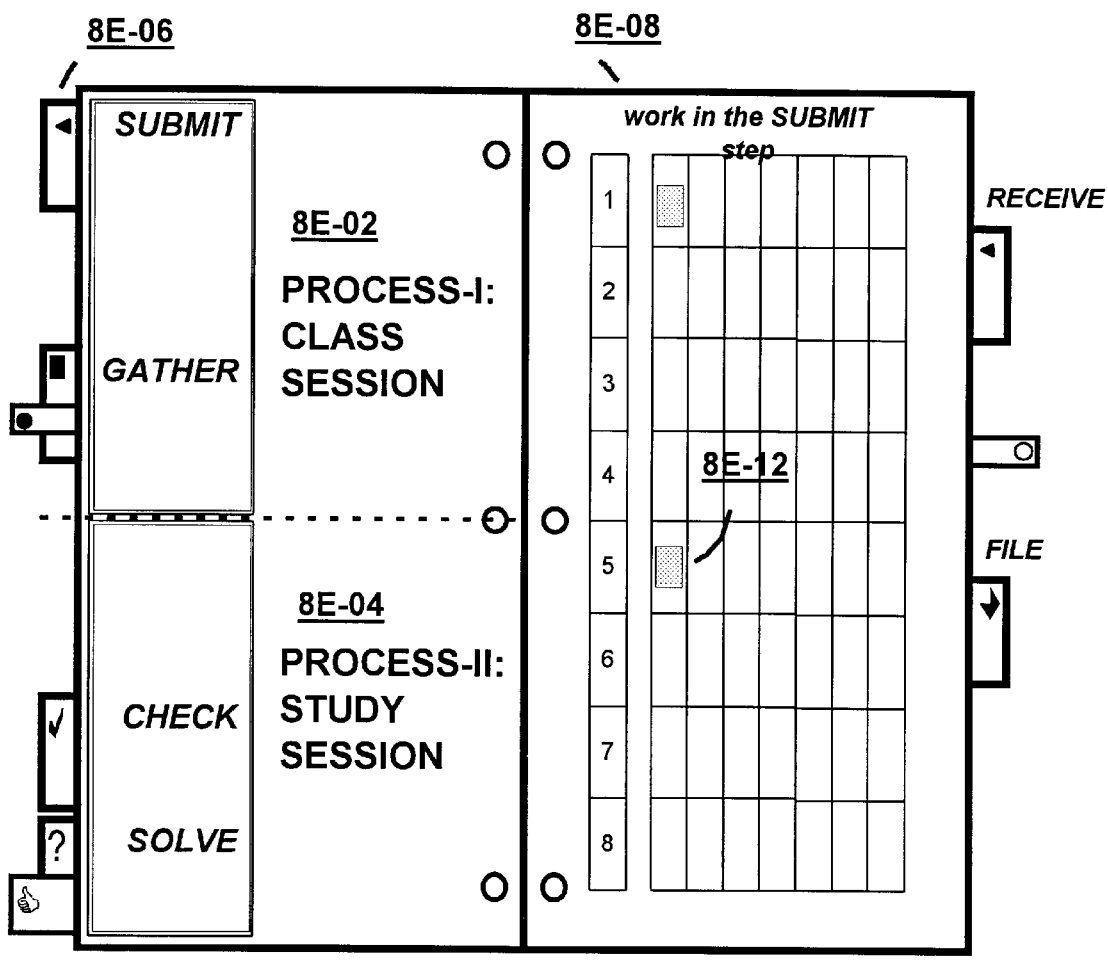
FIG. 8E illustrates that, instead of actual documents residing in the steps of a process, one may use symbolic representations of such documents in the form of labels, for example.

Referring now to FIG. 8E, it is illustrated that instead of actual documents being carried within and transferred among the steps of a process, a user may utilize symbolic representations of such documents—in terms of removable pre-gummed label, for example. Drawing-elements/8E-02 and 8E-04 are two processes. A user has selected step #1 of Process-1 (drawing-element/8E-06) and this is reality is reflected in the illustration of the open binder. Drawing-element/8E-08 illustrates a grid that refers to the 'SUBMIT' step. Drawing-element/8E-12 is a label that has been placed in the first location of the number 5 line (referring to Course number 5). This tells the user that a completed assignment for Course number 5 is ready to be turned in. The label may contain information that points the user to the location where the actual document-to-be-turned-in can be found.

In the example of the previous paragraph, a label is presented as the symbolic representation of the documents of the step. Since the label itself is moved from step to step, it is implied that the process step's leaf is of such a composition as to allow for the pasting and removal of such label or the label—itself is of a removable composition. To expand upon this, the process step's leaf may be of other attracting materials totally or contain proscribed areas of other attracting materials. For example, a leaf may contain magnetic strips to work in tandem with symbolic representations of documents that are oppositely magnetized. In practice, when directed by flowchart logic to move documents from one step to another, a user would physically break the magnetic attraction of the symbolic representation of the documents to the process step's leaf and then cause it to be magnetically attracted to the attracting leaf of the subsequent step. The same concept holds for a venue of Velcro attachment of a symbolic representation of documents to a process step's leaf. Expanding upon this, there may be any attracting materials used alone or in combination, so that a leaf may, for example be composed of magnetic and Velcro strips to receive symbolic representations of documents.

Additionally, it should be noted that there may exist more than one symbolic representation of a document. For example, such symbolic representations of the single document may be carried along in tandem in process steps, only to be separated into multiple target steps in any given step of the process—according to the logic dictated by the step.

The strength of this usage of the Process management System is that is requires minimum impact on a users current organization strategies. It "lays on top of" such strategies. The benefits of workflow management are ascertained transparently—without changing anything the user is already doing.

Figure 8F:
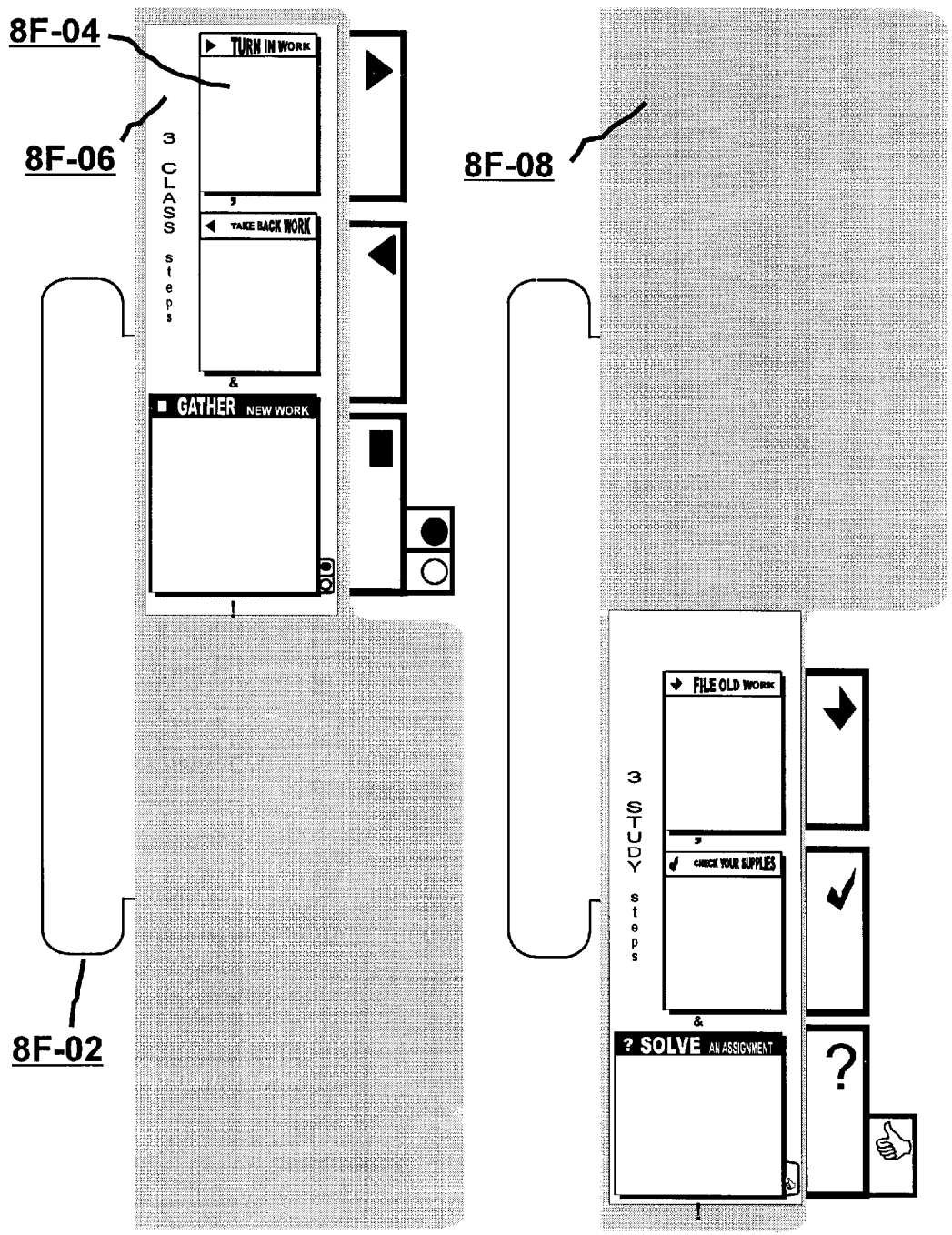
FIG. 8F illustrates that a flowchart to a process may be placed on an underlying leaf and a half-windowed piece of material provided to serve to reveal such flowchart and steps while the opposite half of the material blocks the underlying description and steps of a linked process, such that when the piece of material is rotated 180-degrees, the second process and steps are revealed while the underlying description and steps of the first process are revealed.

Referring now to FIG. 8F, it is illustrated that, as opposed to FIG. 8C, a flowchart to a process may be placed on an underlying leaf (drawing-element/8F-04) and a half-windowed (drawing-element/8F-06) piece of material (drawing-element/8F-02) provided in order to reveal such flowchart and steps while the opposite half of the material blocks the underlying description and steps of a linked process, such that when the piece of material is rotated 180-degrees (drawing-element/8F-08), the second process and steps are revealed while the underlying description and steps of the first process are revealed, Referring now to FIG. 9A, it is illustrated that a standard set of bottom-edge dividers may be manufactured from two identical sets of four bottom-edge tabbed dividers and, by the introduction of a three-hole punch on the right-edge, such a divider set may be rotated 180-degrees to become top-edge tabbed dividers. In drawing-element/9A-02 is a finished standard set of eight bottom-edge tabbed dividers. Drawing-element/9A-04 depicts a set of four bottom-edge tabbed dividers with a three-hole punch introduced on the right edge of each divider. In drawing-element/9A-06, it is illustrated how two sets of four-bottom-edge tabbed dividers may be oriented and combined together to four the desired set of eight bottom-edge tabbed dividers.

It may be claimed that the same objective is currently achievable combining two sets of four bottom-edge tabbed dividers and then introducing the three-hole punch into the completed set of eight. This is true, however it requires the hole punching as a separate step during the manufacturing process—whereas in this method the hole punching may be included in the original divider manufacturing process.

Referring now to FIG. 9B, it is illustrated that the additional 3-hole punch in the dividers of FIG. 9A allow for many configurations of the dividers in the set of eight. In drawing-element/9B-02, it is illustrated how a set of eight dividers is formed from the original manufactured set of four tabbed dividers, with four bottom-edge, left-half tabbed dividers and four top-edge, right-half tabbed dividers. In drawing-element/9B-04, it is illustrated how another application-specific configuration may be created from the original set of four, double-sided, 3-hole punched bottom-tabbed dividers.

Referring now to FIG. 9C, it is illustrated that analogously to the illustrations of FIGS. 9A & 9B, one may manufacture a set of dividers (drawing-element/9C-02), the length of whose tabs occupy no more than one-half of the sheet height, such that the utilization of additional hole punches allow for a placement factor multiple of four. In other words, the set of the four dividers shown may be placed in any one of fours locations, without remanufacturing. Drawing-element/9C-04) shows the properly-oriented left-edge combination of two identically manufactured sets.

Referring now to FIG. 9D, illustrated is a set of eight tabbed divider sets having four tabbed-dividers each. Or, viewed another way, we have one set of bottom-edged tabbed dividers manufactured four times and one set of right-edged tabbed dividers manufactured four times (drawing-element/9D-02). When oriented and combined by advantageously using the additionally-installed hole punches (left and right), one achieves a super-set of 32 tabbed-dividers, as illustrated in drawing-element/9D-04).

Referring now to FIG. 9E, illustrated is a set of four tabbed "square" dividers is manufactured and replicated eight times. Each divider has eight hole punches (drawing-element/9E-2) so that any orientation of a divider will allow it to be installed in a ring binder (as an example of a holding device). When the eight sets are combined and properly oriented, the illustrated super-set of 32 dividers results (drawing-element/9E-04).

Referring now to FIG. 10, illustrates the creation of a paper database by applying multiple tabs to a standard sheet of paper in order to create multiple views to the sheet. Drawing-element/10-06 is the covering sheet to a number of related sheets. The collection of sheets is referred to as a packet. The covering sheet has been divided into nine (9) sections, "A" through "I", corresponding to various parameters. Further, each section has two or more sub-sections or choices for the application of a protruding tab. A tab has been placed into rectangular box #2 of section "A" (drawing-element/10-08). For example, let's say the packet refers to an individual's census information, where section "A" is the gender. Then, "A1" refers to "male" and "A2" refers to "female". In this example, a protruding tab has been applied to the "A2" location to denote that the packet refers to a female respondent.

Similarly, section "B" is the parameter pertaining to age group, and "B5" specifically denotes the 50–65 age-age group. Note that a protruding tab has been applied at location "B5" with an associated title (drawing-element/10-10). And so forth for all the other parameters in this sample census survey (drawing-elements/10-12, 14, 16, 18, 20, 22 & 24). Nine protruding tabs have been applied to the nine categories being tracked in this census questionnaire.

Further, let's assume that we take another respondent's packet of respondent information and applied nine protruding tabs for that person. By placing one multiply-tabbed packet on top of a second multiply-tabbed packet (drawing-element/10-26), we have established a "paper database", where we have multiple views to the same data, depending on which criterion we want to search. In doing so, we can search for "all the females in the total population of packet" or "all the females within the 50–65 age-group". We may apply the well-established "ANDing" and "OR" logic from a physical selection and culling of the packets.

Of course, this example is only one of countless possible across any number of applications. In the case of the student venue that we established for a discussion of the Process Management System, a packet may refer to the information collected in a class for a course on any given day. Further, if we limit our packet cover sheet to one parameter, say Topics discussed, we may devote all of the perimeter locations to the varying choices of Topics.

Referring now to FIG. 11A, it is illustrated that a SLIPCASE (with an open front ready to receive an insertable object such as a binder) can be formed without any other fastening means other than folding a specially die-cut piece of material, such as corrugated cardboard (drawing-element/11A-02). Advantageously, the material need be finished on one side only, although the resulting assembled Slipcase will visually appear to be finished on the inside and outside (except for the inside back, which is not readily visible anyway)—with the unfinished side of the material fully-covered as a result of the folding process.

Drawing-element/11A-04 illustrates step #1 of the folding process, whereby a single "upper case" letter is folded toward and on top of the same "lower case" letter, and a double "upper case" letter is folded toward and on top of the same single "upper case" letter, and a triple "upper case" letter is folded toward and on top of the same "upper case" double letter.

Drawing-element/11A-06 illustrates how a slot may be introduced during the die-cutting operation such that a specially folded divider (drawing-element/11A-08) may be inserted to the inside-top layer in order to create a sub-dividable Slipcase. In fact, although a single divider is illustrated here, a more complex dividable Slipcase may be created in similar fashion by simply widening those elements which define the Slipcase's width. As an aesthetic enhancement, drawing-element/11A-12 is introduced so that the finished Slipcase will have absolutely no raw edges—in other words "seamless" (drawing-element/11A-22). Drawing-element/11A-14 illustrates is a shorthand to illustrate the use of a standard, so-called 1-2-3-4 back as a superior "locking" system for the Slipcase. The assembled Slipcase is illustrated in drawing-element/11A-24. Drawing-element/11A-26 illustrates how VELCRO coins may be advantageously attached to both sides of the Slipcase, such that other Slipcases may be attached to it—thereby forming a library of insertable objects. In this example, we've spoken about the use of such Slipcases as holders for binders to provide a professional environment, as well as a means for easier access.

Referring now to FIG. 11B, it is illustrated that a removable Drawer may be fashioned from some material, such as corrugated cardboard. It is contemplated that such a Drawer be used in conjunction with a size-appropriate rendition of the Slipcase that was discussed in FIG. 11A in order to hold necessary student supplies, such as a hole puncher, calculator, pencils, pens, etc. In drawing-element/11B-02, a "plan view" of the unassembled drawer is illustrated. After folding (drawing-element 11B-18), the Drawer is complete with the finger holes used as drawer pulls (drawing-element/11B-10), the sizing necessary to fit into the Slipcase (which also has been appropriately sized to receive it in drawing-element/11B-14) and a mechanism for keeping the Drawer from falling out such the string apparatus (drawing-element/11B-12).

In drawing-element/11B 16, a 3-hole punch has been introduced into the Drawer-holding Slipcase so that the unit may be advantageously used in a binder or 2-part folder. Due to its depth, it is impractical that the unit be expected to turn within a binder, as would a common sheet of paper. The solution is to store as the "last item" within the binder or folder. Then, due to the implicit random-access quality of a tabbed divider, which may be placed in front of it, it may "logically" be located in any processing position among a set of dividers within the binder or folder, even though it is "physically" last.

Referring now to FIG. 11C1, is illustrated the detailed Slipcase assembly—step 1 (drawing-element/11C1-02) through step 5 (drawing-element/11C1-04).

Referring now to FIG. 11C2, is illustrated the detailed Slipcase assembly—step 6 (drawing-element/11C2-02) through step 9 (drawing-element/11C2-04).

Referring now to FIG. 11C3, is illustrated the detailed Slipcase assembly—step 10 (drawing-element/11C3-02) through step 13 (drawing-element/11C3-04).

Figure 11D:
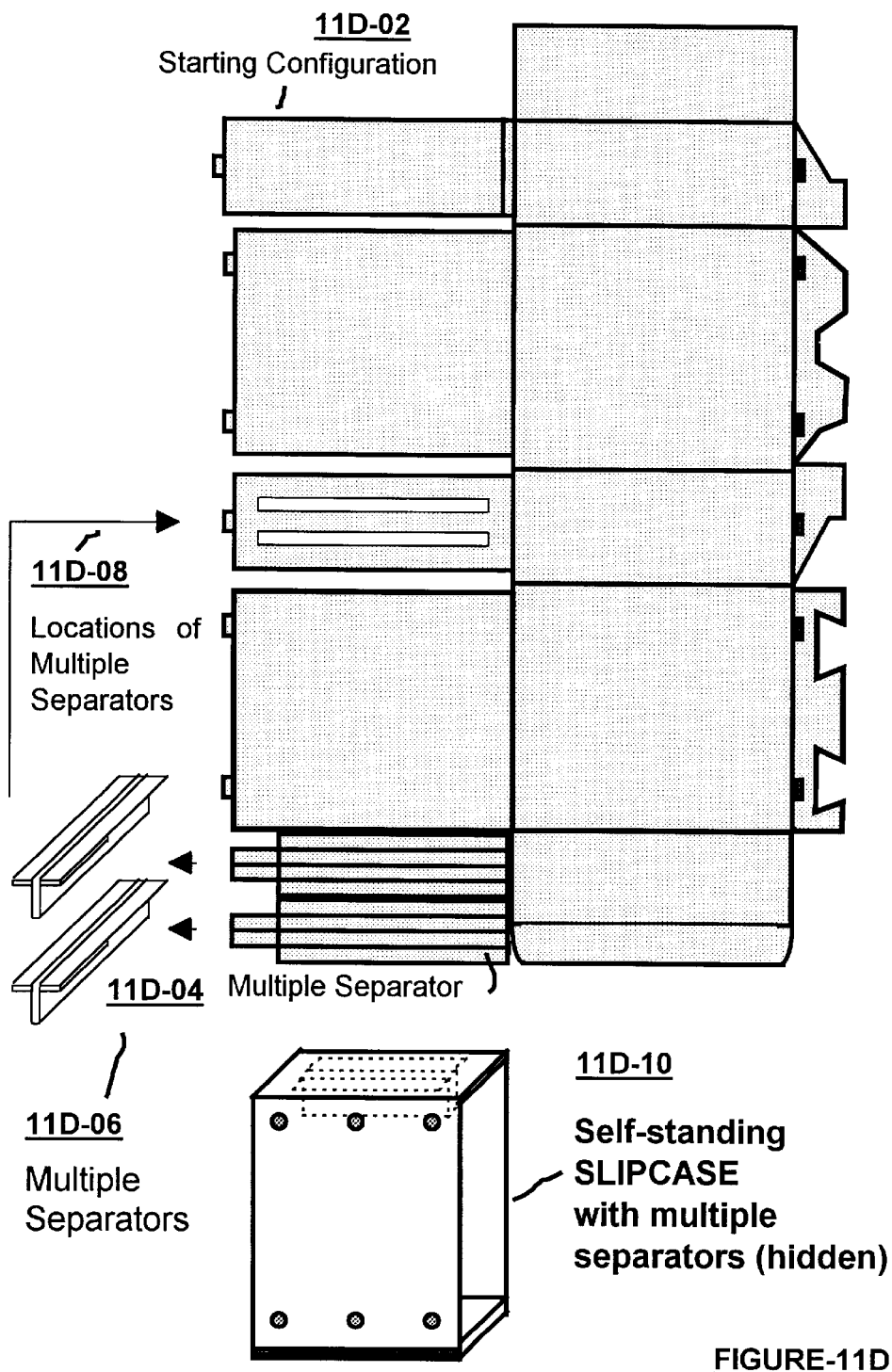
FIG. 11D illustrates that the Slipcase of FIG. 11A may include multiple internal separators.

Referring now to FIG. 11D, it is illustrated that the Slipcase of FIG. 11A may include multiple internal separators (drawing-element/11D-04). They may be a part of the original sheet of material containing the unassembled Slipcase (drawing-element/11D-02) or they may be made from a separate sheet or sheets of like or different material. Drawing-element/11D-06 illustrates the folded configuration of such Slipcase separators. Drawing element/11D-08 illustrates the open slit areas (before Slipcase assembly) into which such separators are placed with the protruding side up. Drawing-element/11D-10 is the assembled self-standing Slipcase with multiple separators (shown by dotted lines).

Referring now to FIG. 11E, it is illustrated that the Slipcase of FIG. 11A may include varying styles of multiple internal separators, including a full-height style, as opposed to the style that protruded from the top only—as presented in FIGS. 11C1 through 11C3. Drawing-element/11E-02 is the unassembled Slipcase. Drawing-element/11E-04 is are the two assembled separators. Drawing-elements/11E-06 & 08 are the top and bottom slots respectively, into which the legs of the separators are placed. The full-height separators are installed after the box is assembled and before the back is locked with the 1-2-3-4 lock. They are held in place by the interaction of the legs within the enclosed slots, as shown in the assembled Slipcase (drawing-element/11E-10).

Figure 11F:
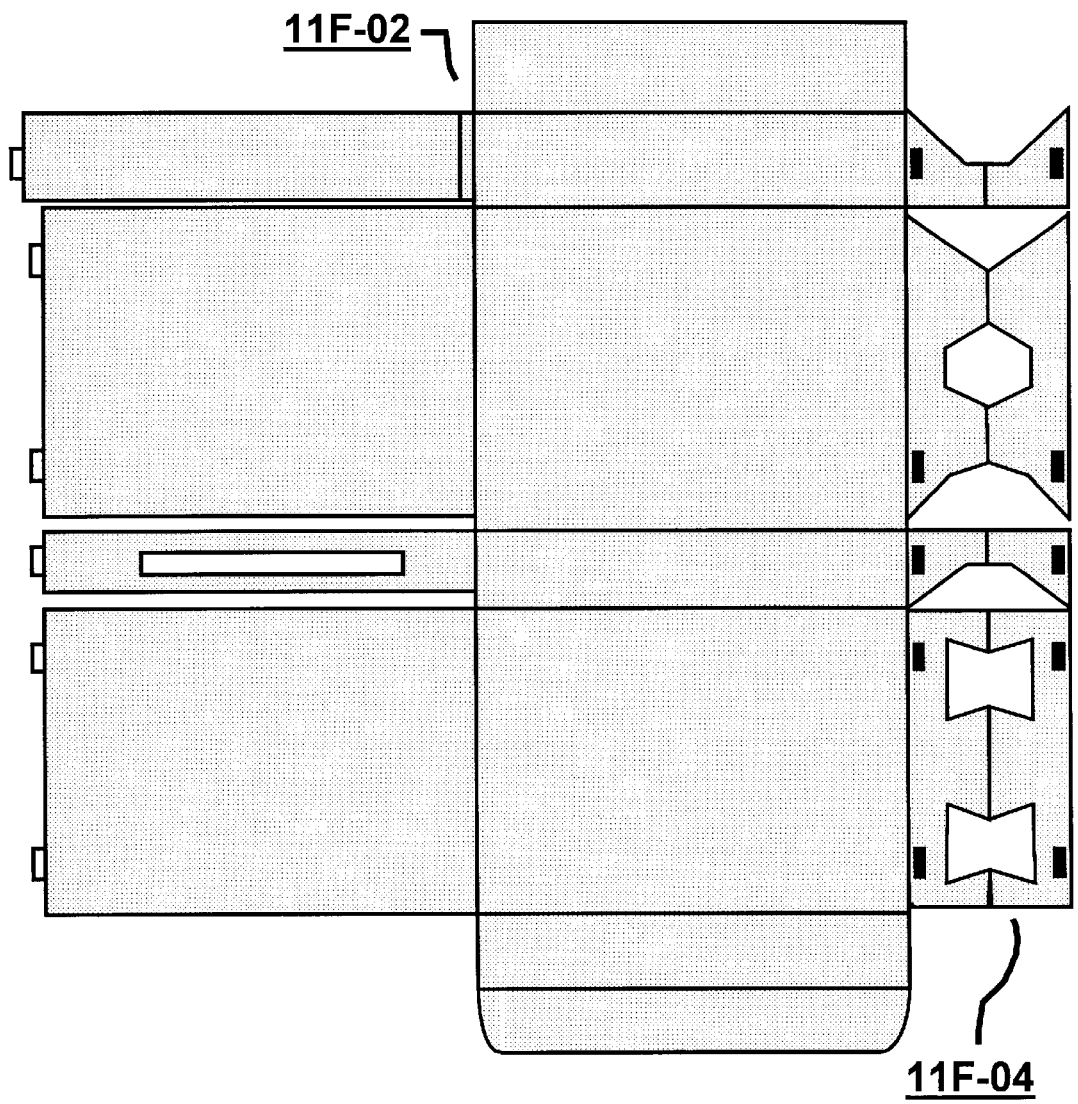
FIG. 11F illustrates that by introducing a mirror-image configuration of the right-side 1-2-3-4 Slipcase locking mechanism, one is able to achieve a Slipcase that is finished on all five sides inside, rather than the four sides available without the introduction of such a mirror-image piece.

Referring now to FIG. 11F, it is illustrated that it is possible to fashion a Slipcase that is finished on all five inside surfaces, instead of the four that have been illustrated heretofore. In drawing-element/11F-04, is shown the material that is ready to be assembled into a seamless & finished Slipcase. In drawing-element/11F-04, it is illustrated how another piece of material, when added to the original 'back 1-2-3-4 lock mechanism' in a mirror-image fashion, provides material that may be folded inward on itself. Then, when the new 1-2-3-4 locking back is assembled, the inside of the Slipcase will show the finished side inside and outside.

Figure 12A:
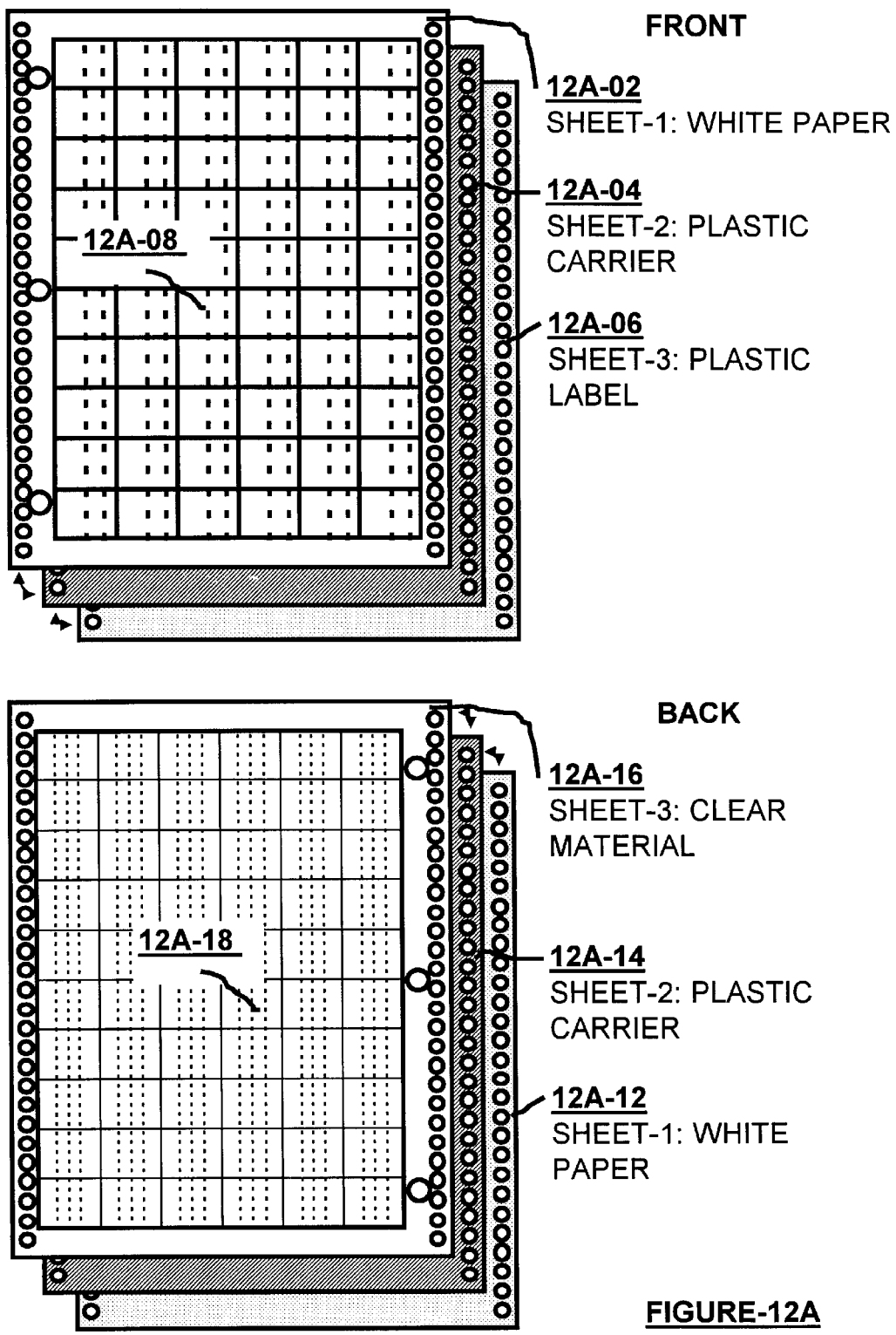

Referring now to the "12 series" of Figures, a Tabbing System will be illustrated. In FIG. 12A, the attachments or adhesion of three common sheets of material are illustrated. Sheet-1:front is paper and will be used as pressure-sensitive label material. Sheet-2 (both sides) is plastic-coated, Sheet-2:back has pre-printed Tabbing System instructions on it and Sheet-2:front and Sheet-2:back have clear glue applied. Sheet-3:is made of clear or translucent, yet printable material. Sheet-1:back is adhered to Sheet-2 front, and Sheet-3:front is adhered to Sheet-2 back, with the Tabbing System instructions on the Sheet-2:back visible from Sheet-3:back through its translucent material and clear glue. This 3layer construct is outlined in drawing elements/12A-02, 12A-04. 12A-06, 12A-16, 12A-14 & 12A-12. Each of the three sheets has a 3-hole punch so that Sheet-1 and Sheet-3 may be pre-printed using a laser printer. Also, each of the three sheets has pin feeds so that Sheet-1 and Sheet-3 may be pre-printed using a dot matrix printer.

In drawing-element/12A-08 60 rectangles are die-cut, each with 2 vertical perforation marks for folding a Primary paper Tab. In drawing-element/12A-18 60 rectangles are die-cut, each with three vertical perforation marks for folding into a Secondary protective plastic Tab used in concert with the Primary paper Tab.

Figure 12B:
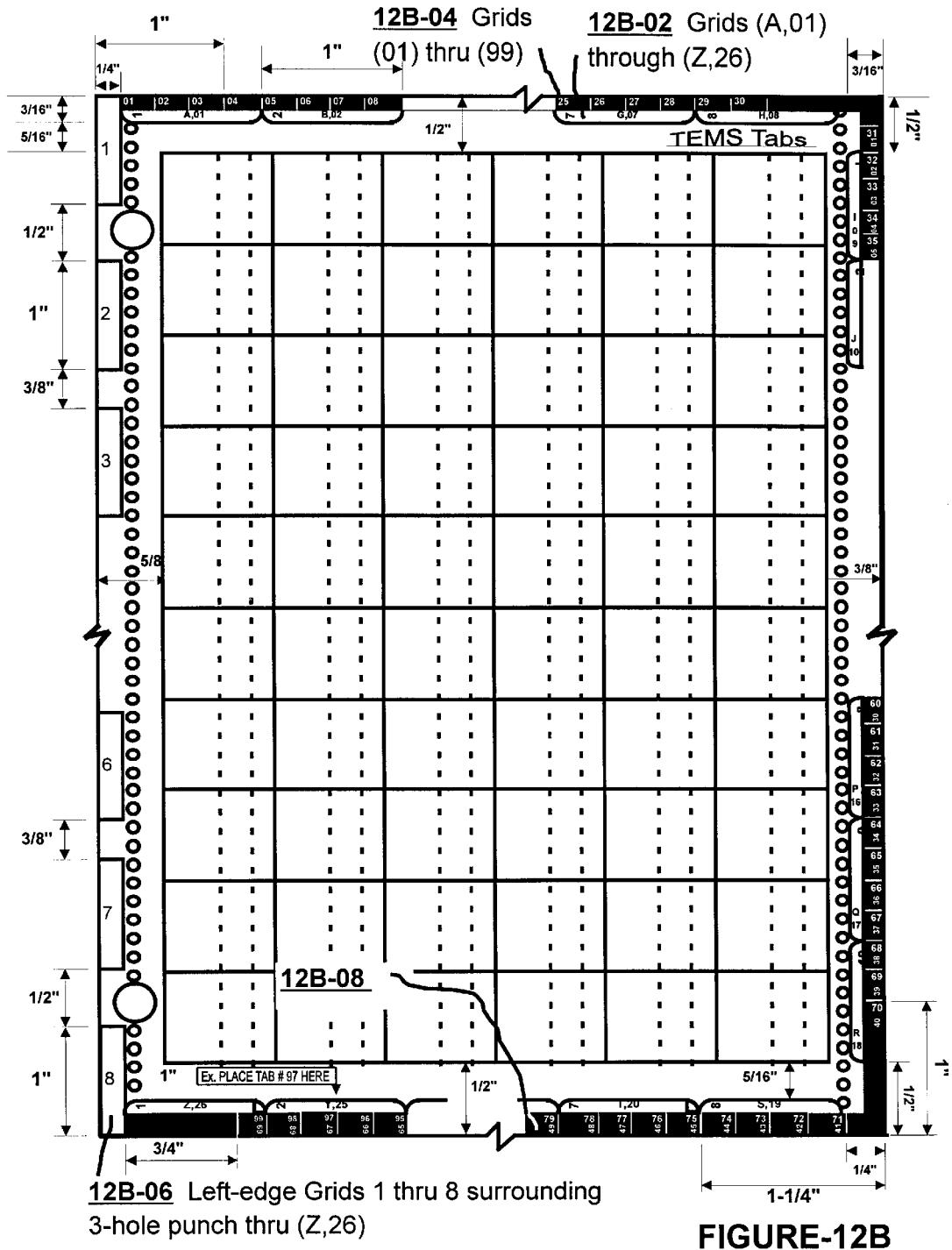

Referring now to FIG. 12B, is illustrated the introduction of "Locator Grids" onto Sheet-1:front. Their purpose is so that a user may take a normal sheet of paper (herein referred to as a Receiving Sheet), place the Tabbing System 3-Sheet Construct along an edge and thereby use the Locator Grids to mark the start and end points of the eventual tab placement (where such tab will be peeled from the Tabbing System 3-Sheet Construct, as discussed in FIG. 12A. Various renditions of Grids are used. Along the top, right and bottom are 1-inch grids (drawing-element/12B-02), labeled (A,01) through (Z,26). Another Grid is shown along the left-edge and is comprised of 8 one-inch segments (drawing-element/12B-06). They are established in such a way that any placed Tabs (following its Grid on a Receiving Sheet) will bypass the 3-hole punching locations.

So far, by using the Tabbing System 3-Sheet Construct Grids, we've seen that a Receiving Sheet may be marked and tabbed in any one of 26 ways, along the top, right and bottom and in any one of 8 ways along the left-edge. Additionally, it is advantageous to tab a Receiving Sheet in any one of 100 ways by using the Grid marks (in reverse image) of 00 through 99 (¼-inch segments) along the top, right and bottom. Although the actual tabs are one inch in length, they may still be used with the ¼ Grid by using the standard convention of overlapping tabs. Of course, by this overlapping technique, even a finer tab placement becomes possible, say ⅛" segments for a 200-hundred Receiving Sheet tabbing capacity. However, such a usage becomes impractical, and the maximum of one hundred has been settled upon.

There is a last Grid displayed on the face of the Tabbing System 3-Sheet Construct. For example, let's say that one wished to establish a 2-level tabbing environment for a certain application—let's say a student's tabbing requirement. One may place a Course Tab along the top or bottom of the Receiving Sheet (by using the Grid marks as discussed above). Then, using the right and bottom vertical Grids (with a 1 through 69 capacity), one may introduce a secondary—let's say a Topic Tab. The with 2 Tabs on a Receiving Sheet, one may easily determine a Course/Topic tabbing.

Referring now to FIG. 12C1, illustrated is Step #1 where a Tab is peeled off the Tab-Label Sheet (drawing-element/12C1-02 and positioned into segments "A", "B" & "C" (drawing-element/12C1-04) by holding the left-edge with a left thumb and the right-edge with a right thumb and forefinger.

In 12C1-12 (Step #2), Segments "B" and "C" are folded into an 'S' shape (drawing-element/12C1-12). According to drawing-element/12C1-14, segment "B" is glued to Segment "A" to act as a "STOP" when the tab is affixed to the Receiving Sheet.

Referring now to FIG. 12C2, Step #3 illustrates a Receiving Sheet (drawing-element/12C2-02). According to drawing-element/12C2-04, the glue-exposed portion of Segment "A" is applied to the front of the Receiving Sheet and the glue-exposed area of Segment "C" is about to be affixed to the back of the Receiving Sheet.

In Step #4, we see the final status of the Tab when applied to the Receiving Sheet (drawing-elements/12C2-12 and 12C2-14). As a very subtle point (drawing-element/12C2-14), states that Segment "C" should be applied to the front of a Receiving Sheet when applied to the left-edge, or to the back side when applied to any of the other edges. The reason for this difference has to do with the printing. In order to be able to apply Segment "C" to the front of the Receiving Sheet, one would have to be able to print upside down if your Tab were pre-printed.

Figure 12D:
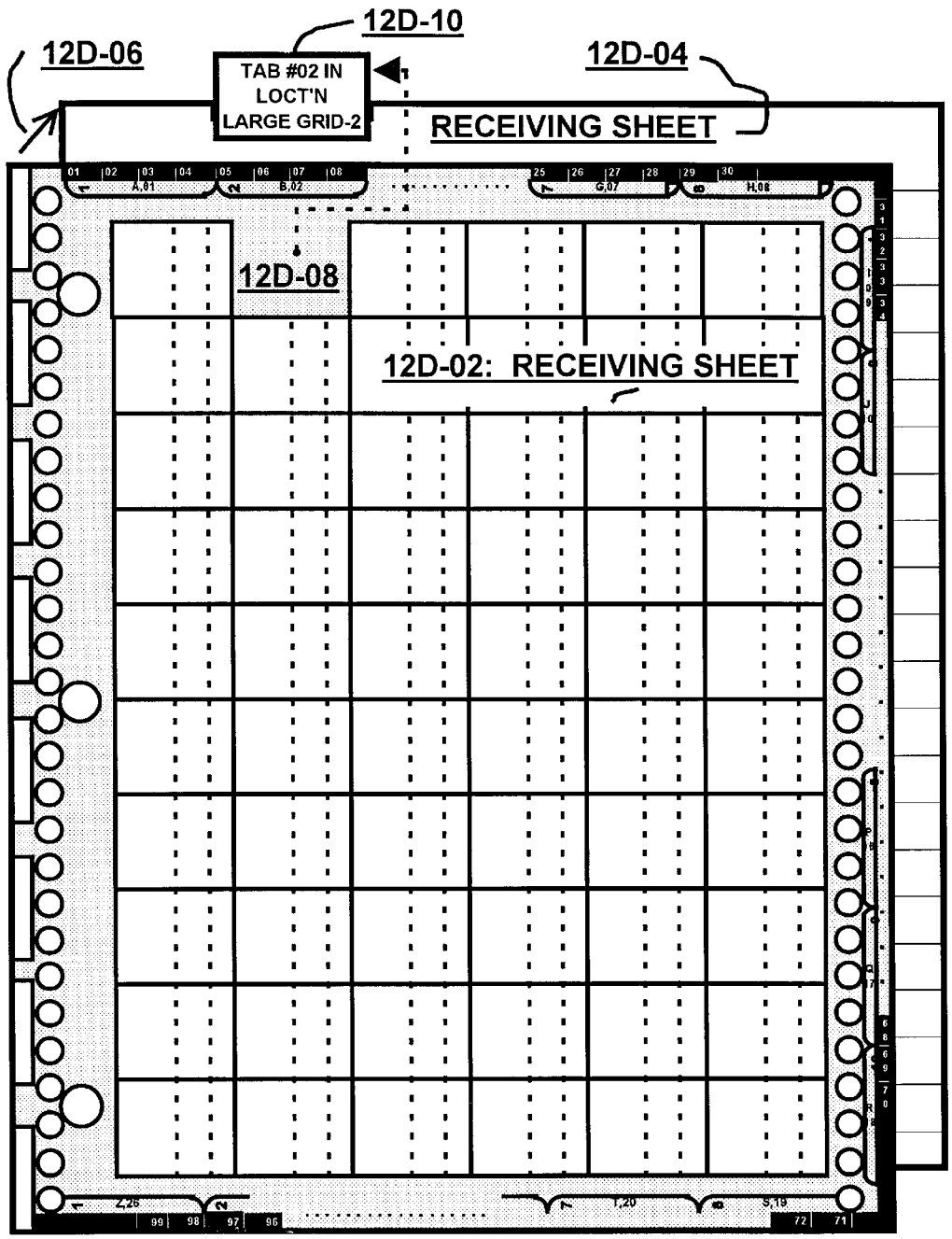

Referring now to FIG. 12D, it is presented how the Tab-Label Sheet (drawing-element/12D-02) is used to apply one of its Tabs to a standard sheet of paper referred to as a "Receiving Sheet" (drawing-element/12D-04). Let's say that we want to apply Tab #2 to large Grid location #2 on the Receiving Sheet. The first step is to establish the Tab's final location on the Receiving Sheet. This is accomplished by laying the Tab-Label Sheet on top of the Receiving Sheet and marking the location tick marks (drawing-element/12D-06). Next, remove a Tab from the Tab-Label Sheet (drawing-element/12D-08) and fold it into a Tab according to the discussion in FIG. 12C. Finally, apply the Tab to the Receiving Sheet in the tick-marked location of Large Grid #2. The same procedure would hold for any desired Tab being placed into any desired location of a Receiving Sheet.

Figure 12E:
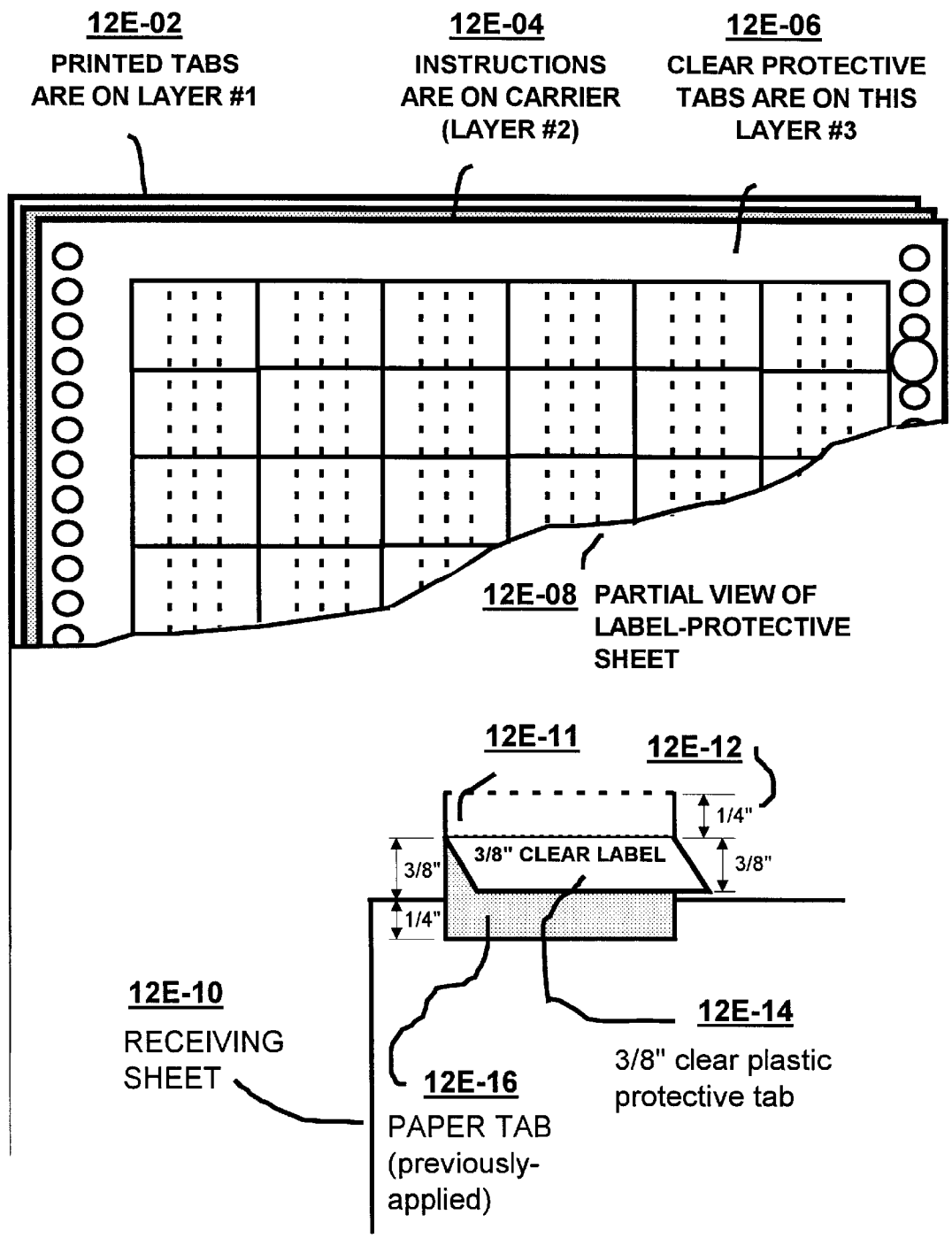

Referring now to FIG. 12E, it is presented how the printing on an already-applied Tab-Label may be covered (protected) by a secondary clear plastic label. Revisiting the original 3-layer construct of Tab-Labels, Carrier & Protective Covering Labels as discussed in FIG. 12A, as shown in drawing-elements/12E-02, 12E-04 & 12E-06. In drawing-element/12E-08 is illustrated a partial view of the Protective Covering Labels Sheet. Drawing-element/12D-10 illustrates a Receiving Sheet with an already-applied Tab (drawing-element/12E-16). A Protective Covering Label (drawing-element/12E-14) is peeled off and shown as about to be applied on top of the already-applied printed Tab (⅜" in height) in order to provide a protection for the printed Tab. Drawing-element/12E-12 illustrates a ¼" segment of the Protective-covering Label that protrudes above the installed label. Such segment is used as an alignment segment and then peeled away along the perforation marks.

Note that this clear protective Tab has 3 vertical perforations. The reason is that the top ¼" is torn away after the clear protective Tab has been properly aligned on top of the printed paper Tab.

Referring now to FIG. 13, the concept of 'Topic Labels' is introduced. The adage of a 'picture is worth a thousand words' has long applied to learning environments. In an academic context, although certainly not limited to this arena, such pictures or graphics are usually limited to those preexisting in textbooks or provided on teacher handouts. However, another powerful methodology is the concept of what we call "Topic Labels". Starting with a piece of pressure-sensitive material in drawing-element/13-02, a die-cutting process produces the rectangular (although any shape is possible) segments. Then for a particular course, the predetermined topics for the course are identified and for each a symbolic graphic is generated, as illustrated in drawing-element/13-06. Then, in practice, as a student is introduced by the teacher to a new topic (one of the predetermined topics), the student identifies the topic among the set of pre-defined and pre-printed topics (drawing-element/13-06). Such a "Topic Label" is removed from the sheet of Topic Labels and affixed to the student's note paper. The student then adds value to the graphic with his or her pertinent class notes.

When a student has need to review the course material, as in preparation for a test, the class notes and related materials come alive with the included graphics. One might suggest that the same objective can be accomplished by simply pre-printing note paper with the graphics on there already. This presumed competitive solution is problematic for two reasons; one is that topics are not always presented in a pre-determined order and second, students take varying sized notes for topics, which limits the flexibility of pre-printed topic note paper. A possible alternative is to pre-print one topic per sheet. However, this has the problem of creating additional volume of paper when short topics will only use a small amount of note space (therefore allowing for multiple topic labels on one sheet—front and back) and another problem of putting a teacher or school in the printing and inventory control business, which is impractical.

In fact, operationally, a publisher may even include such Topic Labels with a textbook's publication, because it may mean that a school will choose such a textbook over another because of the inclusion of this learning enhancement. The concept of Topic Labels may be extended widely to many venues including, but certainly not limited to, training environments—even in a corporate venue.

In FIGS. 14A, 14B, 14C and 14D, the concept of an "enhanced binder" will be developed with features heretofore unavailable in single standard currently-available binder.

Referring now to FIG. 14A, 4 groups of components are shown that comprise the "enhanced" binder (drawing-elements/14A-01a through 14A-01d) that include respectively the "raw" binder itself, plastic clips to affix the ring metal, the ring metal itself and Velcro "coins" that are affixed to allow for the temporary attachment of another binder (back cover-to-back cover). In detail, drawing-element 14A-02 is the binder "flat" (as the binder is called when it lays flat after production and before a ring metal is installed) made of durable polyethylene material of varying gauge depending on its application. Of course, any number of binder materials may be selected. In this case, polyethylene is chosen because of its light weight and extreme durability. In drawing-element/14A-04, there is illustrated a plastic sleeve on the inside of the back cover (there is also one shown on the inside front cover). Such plastic sleeves are advantageous for the protective insertion of pertinent documents. In drawing-element/14A-06 is illustrated one of the die-cut locator positions for one of the six VELCRO coins that may be affixed to the polyethylene binder material in order to allow for the temporary attachment of another binder. Of course, such VELCRO coins or other shapes may be applied in any desired number or location to the back (and front) cover—depending on need. There is a notch in the middle top of the cover (drawing-element/14A-08) to allow for easy removal when the binder is sitting on a bookshelf or in the Slipcase discussed in FIGS. 11A & 11B. In addition to the plastic sleeves on the inside covers, there is a single plastic sleeve that is fastened around the front cover, the spine and the back cover (drawing-element/14A-10). Having the sleeve attached in this manner is of great advantage due to the fact that a single sheet of paper (in this case 8½"×11") may be inserted to allow for an infinite binder customization. In may standard binder, it is very difficult to install a spine insert—due to its narrow width. Also, this style introduces an interesting aesthetic quality. In drawing-element/14A-12 is illustrated the fact that the front cover of the binder is slightly narrower than the back cover so that any right-edge dividers are displayed (and accessible) even when the binder is closed.

In drawing-element/14A-14 are illustrated commonly-available plastic "arrow clips". Such clips are used to hold the ring metal permanently in place when installed in the binder. By the use of clips, the standard "riveting" process is eliminated. This is advantageous for two reasons. One is that the so-called binder "flat" may be stored very efficiently for inventory purposes, as opposed to storing finished binders, which contain "air". Secondly, the use of clips allows for the elimination and cost of expensive riveting machines—allowing for greater production because many employees (or the end-user) may be working on assembling many binders without the need for each having access to a riveting machine. The actual ring metal itself is shown in drawing-element/14A-16. Note that a wide range of ring metals is possible. In this Figure, the ring metal is installed on the spine. In other values, the ring metal may be stored on the back cover (so-called "D" rings which allow for a larger capacity and easier page turning). Finally, the last separate component—VELCRO coins—is illustrated in drawing-element/14A-18.

Referring now to FIG. 14B, the steps are outlined necessary to install the ring metal with the two plastic arrow clips. In drawing-element/14B-02, the two plastic clips are shown about to be inserted after the proper orientation. Drawing-element/14B-04 shows the plastic clips installed in the polyethylene binder. Finally, drawing-element/14B-06 illustrates the procedure for installing the ring metal "onto" the two plastic clips.

Figure 14C:
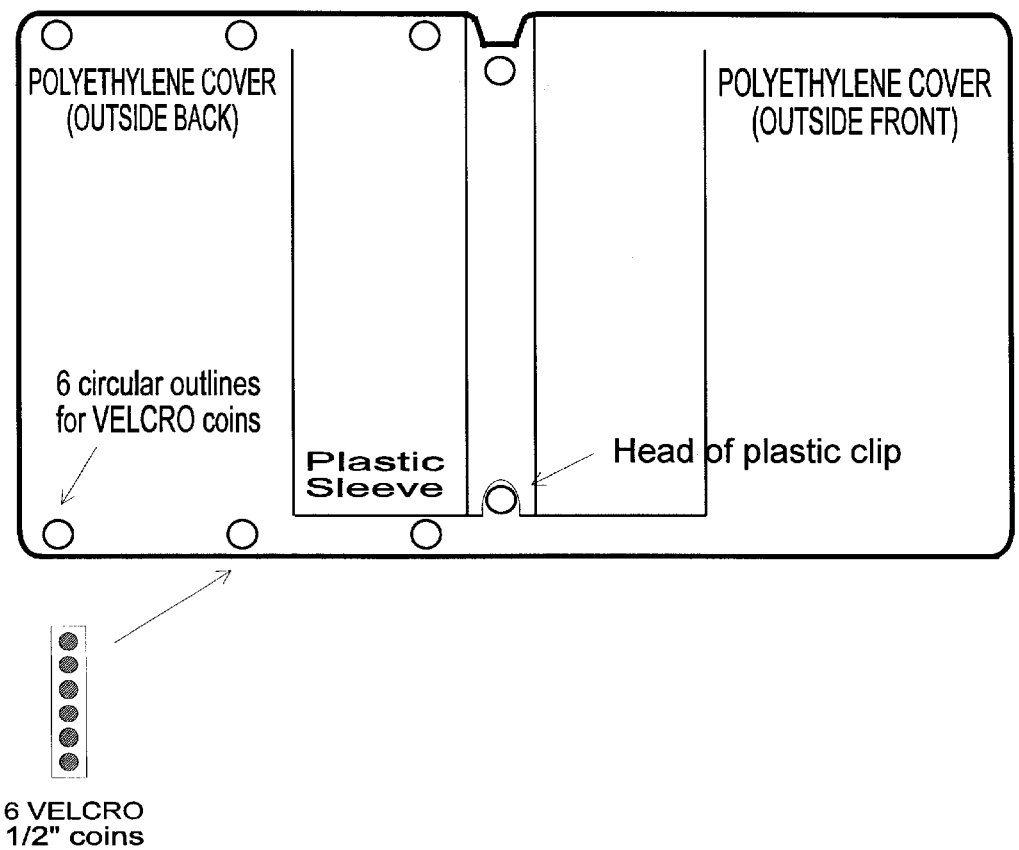

Referring now to FIG. 14C, it is illustrated how the VELCRO coins are affixed to the back cover of the polyethylene binder in order to allow for the optional temporary attachment of another binder (with the "opposite" VELCRO coin composition—a "hook" or a "loop"). In this case, such binders are temporarily attached "back cover-to-back cover.

Referring now to FIG. 14D, an overview of the "enhanced binder" is illustrated. Drawing-element/14D-02 illustrates in the binder front with the wrap around Plastic Sleeve (drawing-element/14D-04), the finger notch (drawing-element/14D-06) and the cutback front cover to expose any internal right-edge tabbed dividers (drawing-element/14D-08). Drawing-element/14D-12 illustrates in the binder back with the VELCRO coins to allow for the attachment of a companion binder and the wrap around Plastic Sleeve (drawing-element/14D-16).

Figure 15A:
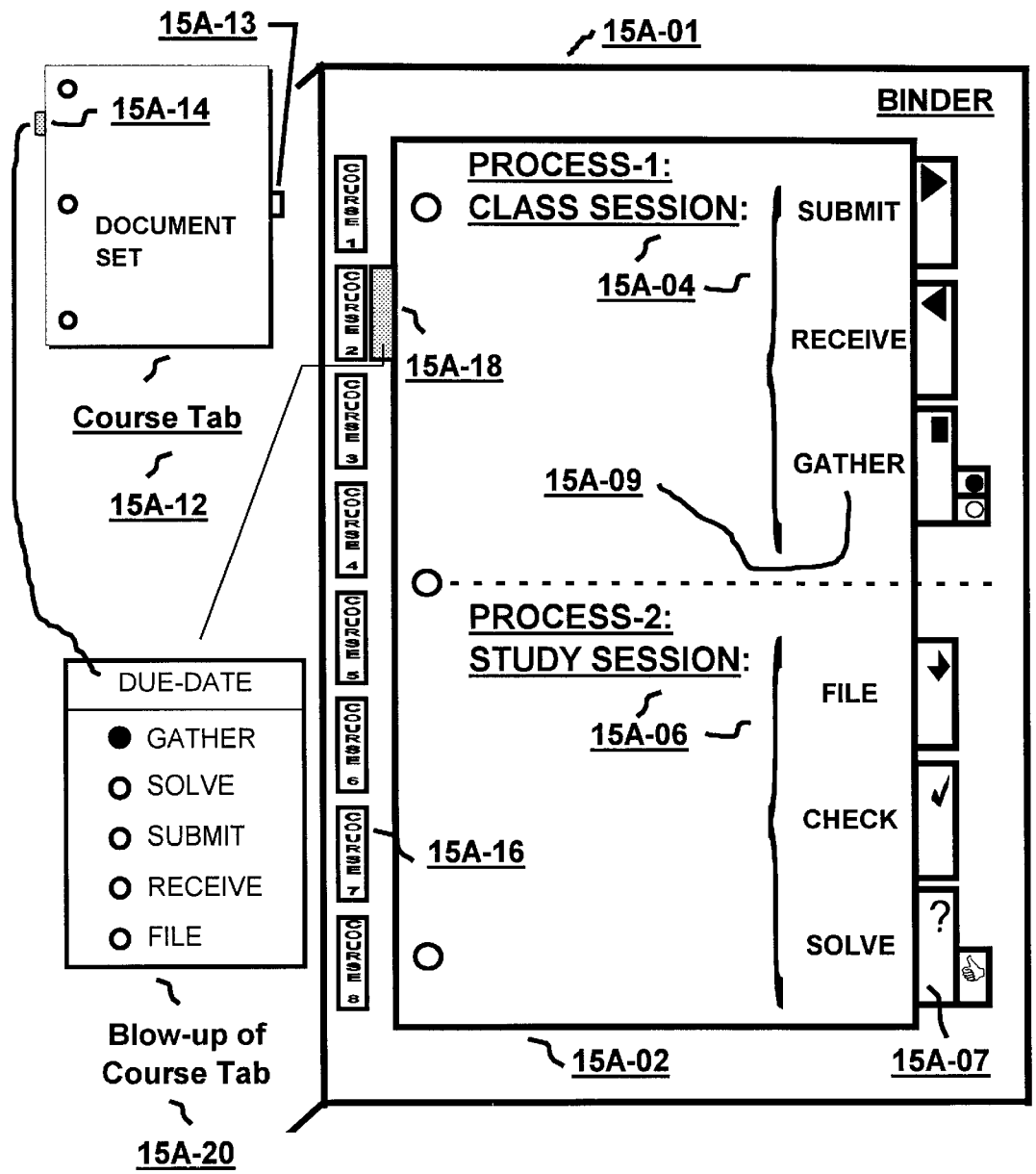
FIG. 15A illustrates that by a method of the left-edge tabbing of a document in a binder, one may advantageously reflect the status of such a document that is independent of the step in which the document physically resides.

Referring now to FIG. 15A, it is illustrated that by a method of the left-edge tabbing of a document in a binder, one may advantageously reflect the status of such a document that is independent of the step in which the document physically resides because of the document's tab protrusion from the common and visible left edge. In drawing-element/15A-01 is depicted a binder. Residing within the binder is a set of four multiply-tabbed dividers (drawing-element/15A-02), first illustrated in FIG. 2A. The dividers represent two processes, Process1:Class-session (drawing-element/15A-04) and Process2:Study-session (drawing-element/15A-06), with the tabs being the steps of the processes.

In drawing-element/15A-12 is a document belonging to course number 2 that was born in during a class in one of the process steps—specifically in the Gather step (drawing-element/15A-09). Along the top, bottom and right edges of the document, On the document, Lesson numbers are pre-printed in order to establish locator positions for the placement of a tab that corresponds to the Lesson number of the class. Similarly, course positions one through eight corresponding to courses one through eight are pre-printed along the left edge.

The document (drawing-element/15A-12) is tabbed using the tabbing concept discussed in FIGS. 12A through 12E. A Lesson tab is applied to the right edge (drawing-element/15A-13) and identifies the class itself, with its physical position corresponding to the class' Lesson number. A second or "course" tab is applied to the left edge of the document (drawing-element/15A-14) and is applied to the document in the course #2 position. Drawing-element/15A-20 is an enlargement of a Course tab (drawing-element/15A-14. There is an area where the assignment's due-date may be entered. Also, the five steps (with preceding circles) which involve document movement are pre-printed. By the use of the Step and circle concept, when a step is completed for a document, the circle on the course tab corresponding to the completed step is darkened-in. Therefore, by looking at any course tab, one is able to discern which steps have been completed for the document and which (the un-darkened ones) are remaining to be executed.

Contained within the dividers of the binder (drawing-element/15A-01) are documents that look like the one in drawing-element/15A-12. These documents are playing out their life-cycles in their movements through the process steps. The order of the documents at any point in time is the physical order of the dividers in which they reside at that point in time. Yet, it advantageous to want to know the number and status of documents within each step of the binder without having to select a particular step to see whether it contains a document.

Left-edge tabs on the documents make this possible, because the left-edge delineator is common to the dividers and the documents because they both contain hole punches in the same location as necessitated by their presence in the binder. For example, the document in FIG. 12A resides in the '?' tab (drawing-element/15A-07), where the "?" tab represents those documents having an assignment in need of solution. That reality is visible from the front of the binder because the document set's left-edge tab protrudes from the set of dividers, and the first un-darkened circle is the 'SOLVE' step—indicating that it is the next one to be executed and therefore residing in the 'SOLVE' ("?") tab. In total, from page one of the binder, we're able to obtain a lot of information about the document—namely that it belongs to course number 2, that it is open and in need of solving and that there is a specific due-date to the assignment. All of this information is possible because of the left-edge tabbing of the document. It remains hidden in the "?" divider, yet it transmits its status via its left-edge tab.

Picture that there are many documents in the binder, as is the reality in a student's academic universe. From page one of the binder, we get a snapshot, summary view of all the documents and their statuses. This ability is very advantageous, especially in the case of documents awaiting assignment-solution. If there is more than one document for the same course, the protruding tabs will be stacked one upon the other—while residing in possibly varying steps. Looking at it in a different way, left-edge tabbing allows documents to be accessible by course within action as well as action within course. The left-edge document tabbing in this illustration, in effect, establishes a database for the documents, as well as a processing sequence, because the definition of a database is multiple views to the same data.

Of course, depending on the implementation of the Process Management System, left-edge tabs will have their own nomenclature—either pre-printed or dynamically hand-entered or a combination of both, as in this illustration. It should be pointed out that the dividers in this illustration (and in fact in any divider-related illustration in this preferred embodiment), the dividers have been chosen to be larger than most of the documents contained in them for the reason of perimeter tabbing. In other words, top, right and bottom-edge tabs may be placed on a document. If the dividers were the same size as the documents, as is often the case with standard uses of dividers and documents, such protruding tabs would compete with the dividers' right-edge process tabs. However, taking the leading from FIG. 10, one may in fact isolate any edges and have the associated divider edges of an accommodating size so that one desires to have document tab protrusion for the purpose of obtaining an additional view or views from page 1 of the binder-resident documents.

Figure 15B:
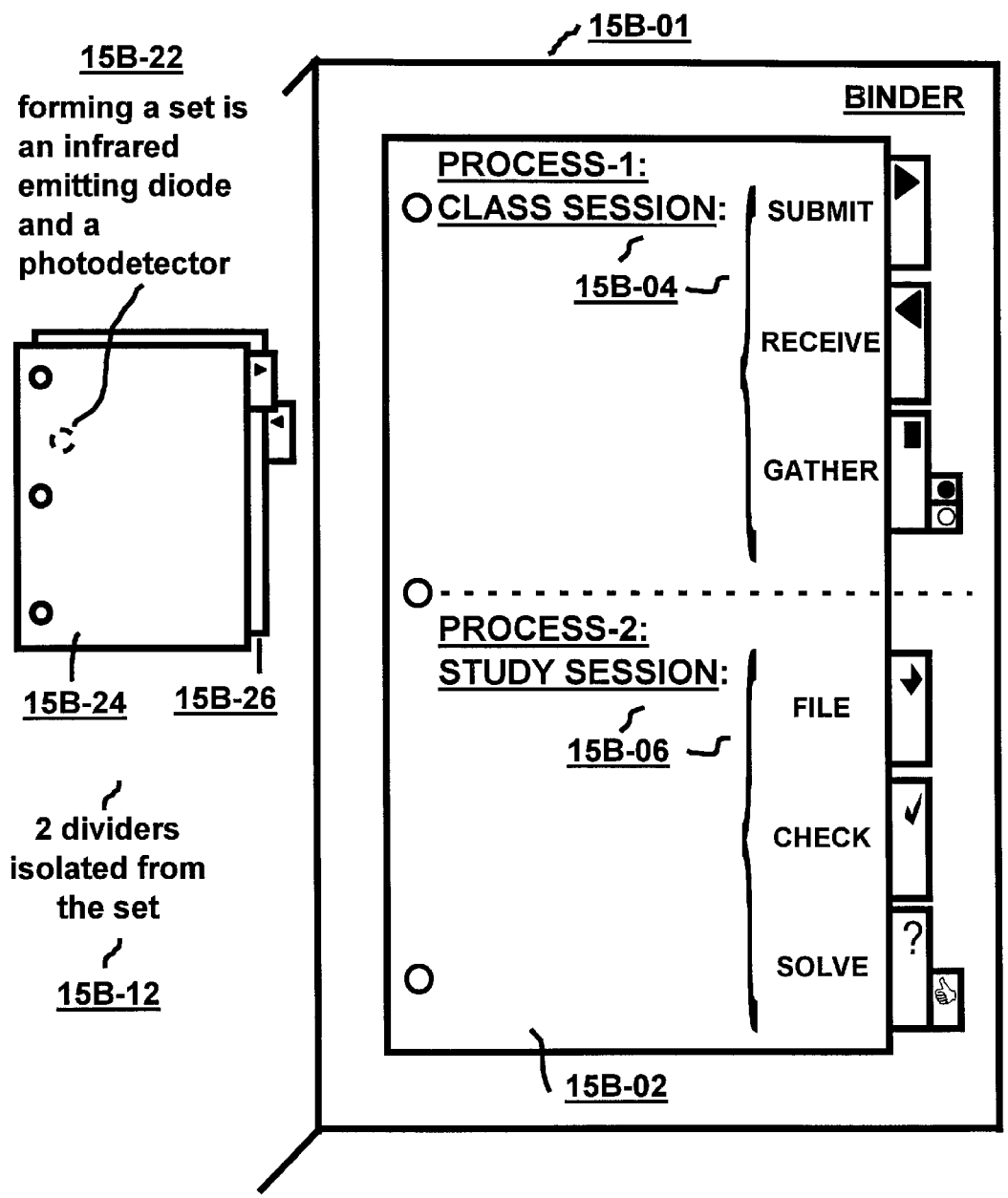
FIG. 15B illustrates that by the use of the well-established devices of infrared emitting diodes, photo detectors and liquid crystal displays (LCDs) and accompanying logic circuitry, one may construct a predetermined system such that the existence or non-existence of the contents of one or more dividers may be reported in a number of ways to include, among many others, 'by visual display' and by 'remote transmission' as a part of a document status information system.

Referring now to FIG. 15B, it is illustrated that by the use of common document dividers and the well-established and readily-available devices of infrared emitting diodes, photo detectors and liquid crystal displays (LCDs) and accompanying logic circuitry, one may construct a predetermined system such that the existence or non-existence of the contents of one or more dividers may be reported in a number of ways to include among many others, 'by visual display' and by 'remote transmission' as a part of a document status information system.

Residing in a binder (drawing-element/15B-01) is a set of four sample multi-tabbed dividers (drawing-element/15B-02), as originally presented in FIG. 2A and reflecting two processes (drawing-elements/15B-04 & 15B-06). Two of the dividers have been isolated in drawing-element/15B-12. Each of the dividers has had one of its process tabs removed to focus on the objective of this illustration (drawing-elements/15V-24 & 15B-26). In drawing-element/15B-22, two parts operate together as a set (hidden by the right-arrowed divider)—an infrared emitting diode located on the back of the right-arrowed divider and a photo detector located in the same dimensional location on the front of the left-arrowed divider. This set of components is powered by a power source in some binder location. Two examples of power sources are a standard battery means and a solar battery means.

Operationally, the infrared emitting diode residing on the back of the right-arrowed divider, as its name says, emits a pulse of light. A photo detector, in the same positional location as the infrared emitting diode and residing on the front of the left-arrowed divider, which is located physically following the right-arrowed divider, has as its sole function in this application to record a yes or a no as to whether it received the emitted pulse of light. If there is document in the right-arrowed divider, this reality has the effect of blocking the pulse of light, so that the photo detector reports no light pulse received. Conversely, if there are no documents in the right-arrowed divider, the light pulse is able to reach the photo detector which reports a positive hit. This Yes/No detection capability may be used very advantageously and lead to broad design and operational capabilities. For example, one possible "reporting" device is a well-known Liquid Crystal Display or LCD, which is available in a wide range of sizes and colors. It may be set up so that it is off or non-visible when there is no document in the right-arrowed divider and lit (or even made blinking) when there is a document in the right-arrowed divider.

Extending this capability across all dividers in this implementation of the Process Management System, one may establish circuitry with its own reporting LCD that is unlit if ALL of the LCDs in the divider set are unlit, thereby establishing a document-free status for the binder. Or if such an LCD is lit, that means that there is at least one document in the binder (among reporting dividers of course). Depending on the application, the logic circuitry is virtually limitless. For example. It may be advantageous to report when a document exists in one divider AND in a second divider OR a second divider—implying the ANDing and ORing capabilities present in well-known mathematical logic.

Beyond that, the reporting possibilities are intriguing to say the least. For example, let's say that we have a binder with some dividers in it that have been retrofitted with this document detection capability. Further, let's say that its power source is light, as in a "solar calculator". Finally, let's assume that there are two independent and companion light power sources, one on the spine of the binder and one on the front inside cover of the binder. If the binder is sitting in a book shelf and there is a document in one of the reporting dividers, an LCD on the binder spine may be set up to flash at such an occurrence. That is very powerful stuff indeed. In fact, this capability may be used in conjunction with implementations of the Process Management System or independent of them—with any standard divider use for example. It gets even more powerful when one considers the possibility of remote reporting, such that the status of one or dividers or the combination of statuses within our binder on the bookshelf may be transmitted to a computer, for example. So what starts out as a simple light detection capability that is in the public domain may be transformed into a document detection system of any complexity across any number of binders (applications) with any number of dividers (processes).

Figure 16A:
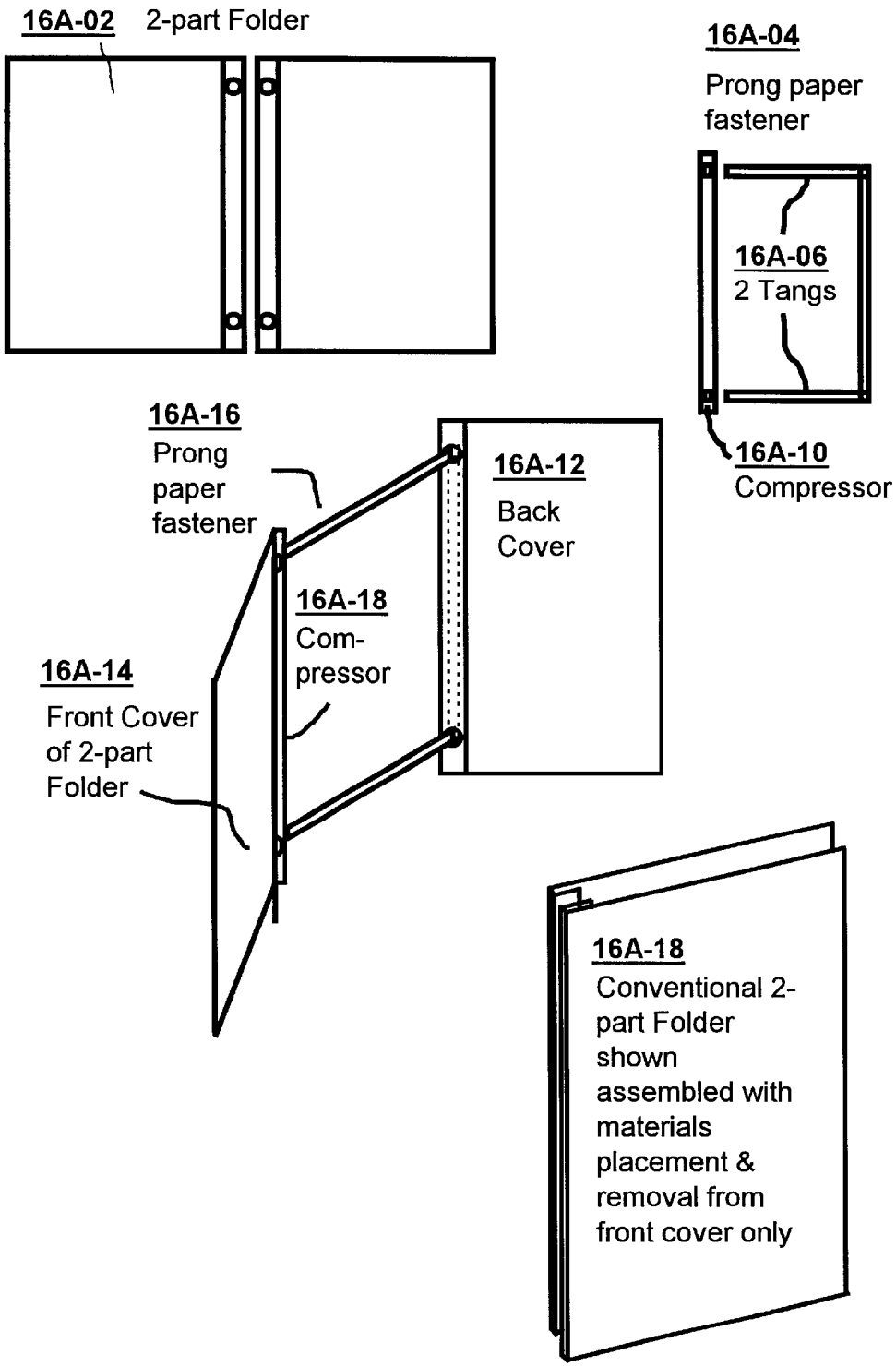

Referring now the FIG. 16A, is illustrated a 2-part folder with a single-sided usage that is well-known and in the public domain. In drawing-element/16A-02, is shown the two parts of what will become a single folder. In this style for aesthetic reasons, each cover has a flap or lip which allows the fastening means to be hidden from view. In drawing-element/16A-04 is shown a certain style fastening device, although this is only one of many that includes simple individual brass fasteners. Illustrated herein is a prong paper fastener, comprised of foldable tangs and a compressor that is place over the tangs with the tangs being folded down and held in place by a sliding piece that is part of the compressor. This fastener style allows for a variable-width folder construction as illustrated in drawing-elements/16A-12, 16A-14, 16A-16 & 16A-18. Drawing-element 16A-18 illustrates the convention 2-part folder fully-assembled and closed.

In the context of this preferred embodiment, the 2-part folder may be used to house the process dividers and accompanying documents and/or it may be used for an expandable portfolio to house documents after they've traveled through the discussed processes and are in need of archiving. This background discussion now leads us to an enhancement of this basic concept.

Referring now to FIG. 16B, it is illustrated that a folder may be fashioned that is able to be accessed from the front of the folder or the back of the folder. This capability is advantageous both for isolating major types of documents and gaining easier access to documents by limiting the need to "take apart" the folder. In drawing-element is illustrated the same starting point with 2 covers with narrow panels for "hiding" the fastening device. In drawing-elements/16B-04, 16B-06, 16B-08 & 16B-10 are shown 2 prong fasteners and their components In drawing-element/16B-12, the sets of prong fasteners are shown "connected" by means of the pressure-sensitive tab labels discussed in FIGS. 12A through 12E. Any number of other connecting hardware may be used to achieve the same result. In drawing-element/16B-14, the two covers are inserted into the two opposing prong fasteners, and drawing-element/16B-16 shows the 2-part folder fully-assembled and closed. Access is achievable from either side of the folder. In the context of this preferred embodiment, process dividers may be housed on one side of the folder, while the archive section or portfolio for a course may be housed on the "side" of the folder. In fact, by rotating the folder 180-degrees, either aspect of the application may be accessed.

In practical usage and in terms of the process dividers, documents flow or are moved from one step to the next, and the dividers may be viewed as if they were standard office manila folders—thereby making it unnecessary for the compressor mechanism to be removed, except to perhaps obtain blank documents which may be stored at the front and removable via compressor mechanism removal. On the flip side of the folder—the archival portion—if the documents are tabbed as is highly recommended, they may be placed directly on top of previously-placed documents on a first arrival basis. This technique makes it convenient vis-à-vis document storage, because the bulk of the documents do not have to be removed to insert new ones. Which leads us to the next step in our development.

Figure 16C:
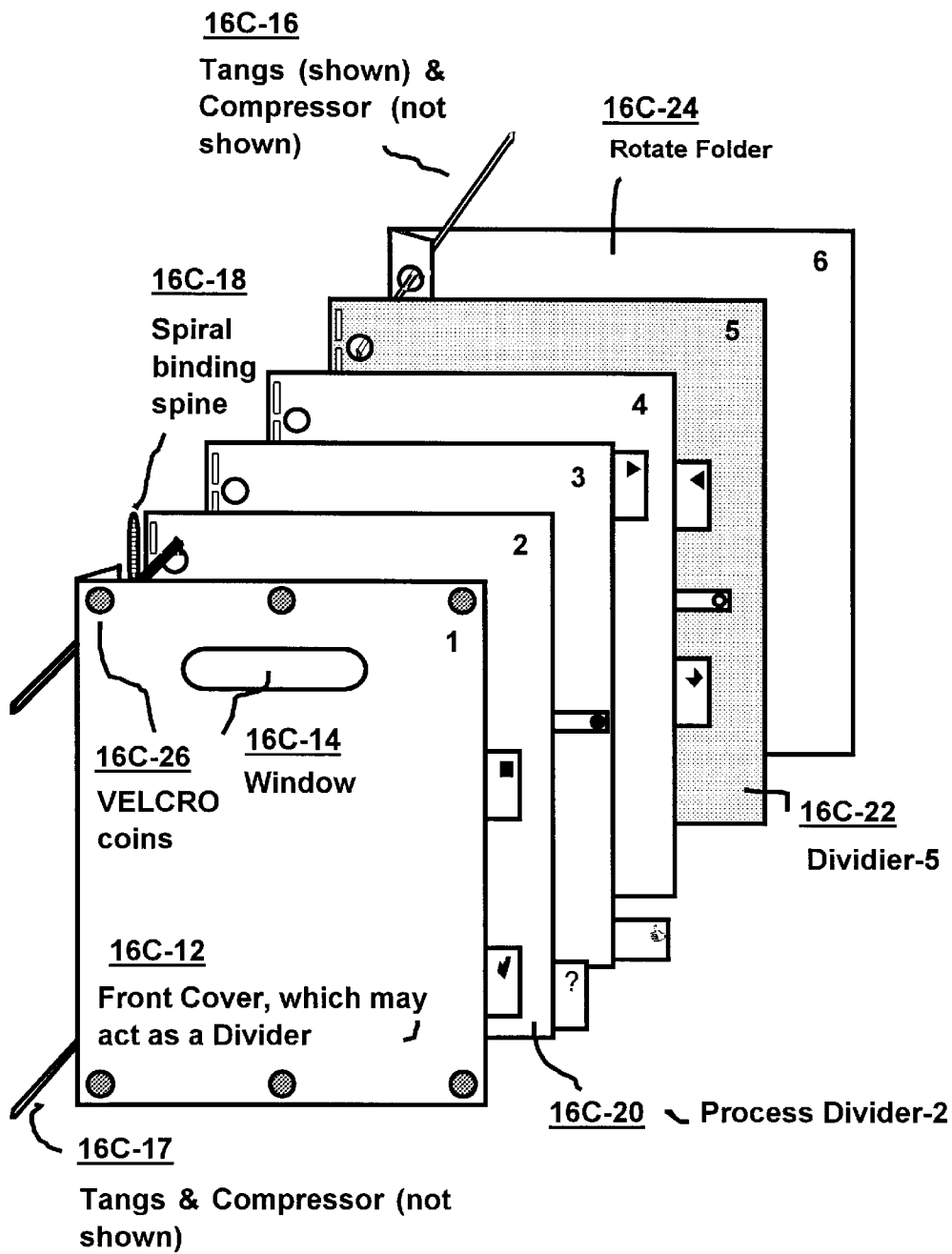

Referring now to FIG. 16C, it is illustrated a folder that uses a different assembly technique. In FIG. 16B, it was illustrated that by the use of two attached prong connectors, a user may gain independent access to both sides of a folder. While advantageous in its capability, such a folder assembly is not optimum for this preferred embodiment of the Process Management System. Referring back to FIG. 2A, even though the 'Gather' step of Process1:Class-session is the third logical step in the process (drawing-element/2A-3a). it is chosen as the first physical divider of the process divider set. Because it is first, a window that is cut into it reveals the documents underlying it. That is important because the 'Gather' step (divider) may contain class-overview documents (usually blank to which value is added during class) which is to be fill-in during class and becomes a summary of the class activities—including among other items class-identification, topics, assignment, cross-reference textbook pages. When such a class-overview document is combined with any class notes and handouts and tabbed according to the scheme outlined in FIGS. 12A through 12E, a class packet is formed which begins a travel through the subsequent steps of the Class and Study processes. When using any folder method for processing documents in this preferred embodiment, it is contemplated that if a process divider has no convenient prong fastener access, then residing documents are merely slipped in and out as with a standard office manila folder.

When the folder assembly method of FIG. 16B is used, all process dividers are connected by the common tangs of the front cover's prong fastener, and the flexibility of movement for subsequent process dividers beyond the first is impeded, especially when the number of documents in the first divider grows. For example, as a document travels through the processes, it can only de inserted into a divider up to the horizontal point where the prong fastener enters the process divider's three hole punch. If the document is tabbed on the right edge, this insertion limitation may prove to problematic because such a tab may protrude from the right edge, thereby competing and conflicting with the process steps. This may be overcome by creating wider process dividers, but additional width makes them less attractive to users, as well as requiring wider binder to house the wider dividers.

The folder assembly in FIG. 16C addresses the concerns of process divider flexibility and horizontal width impedance by introducing a novel fastening combination of a prong fastener with a spiral GBC fastener. In drawing-element/16C-16 and 16C-17 the two sets of prong fasteners are shown. However, unlike those in FIG. 16B, they are not connected to each other. Rather the front cover (drawing-element/16C-12) is connected to the second physical process divider (drawing-element/16C-20) and the second prong fastener is connected to the fifth process divider (drawing-element/16C-22). Alternatively, process dividers two through five are connected by a GBC-style spiral spine (drawing-element/16C-18). Note that process divider five (drawing-element/16C-22) was introduced to provide a logical location for the documents of process divider four, as well as a transitional piece between the GBC-style spirally connected process dividers and the prong fastener-connected back cover. It should also be pointed out that a spiral spine may be chosen to reflect the judgmentally-expected maximum thickness of documents that will sit in any one process divider at a time, because by definition when a document moves out of one process divider, it will move into the next logical process divider (until it finally moves out of the process permanently during a 'FILE' step)—thereby freeing up space in the previous process divider. The point is that both dividers do not have to be penalized by allowing for the document space.

It should be emphasized that (rather uniquely) the front cover of the folder (drawing-element/16C-20) also serves as a process divider. This is advantageous when inserting and/or removing documents from the tangs and compressor within process divider-1 because it means only having to remove the folder cover rather than the folder and the first process divider if they weren't one and the same. Also, note the inclusion of the window (drawing-element/16C-14) in the front cover, causing a heads-up view for documents residing in process divider-1. In fact, because this is the starting point for class document assembly, there should always be blank (or pre-printed) class overview documents in the first physical process divider, a static alert message may be advantageously included as the last always-present document within process divider-1 that will show through the front window whenever process divider-1 is empty of such class overview documents.

Completing the picture is drawing-element/16C-24, where the rear cover of the folder is shown. Blank loose leaf paper is an excellent candidate to be stored in the rear cover section. Access is gained by rotating the folder 180-degrees, removing the cover and prong fastener compressor and finally removing/depositing the loose leaf paper—all without having to take-apart the folder. One might question as to why a single-sided standard couldn't accomplish the same thing by simply have another non-process divider included to hold the loose leaf paper. The answer has to do with capacity. The thickness of a supply of loose leaf paper usually exceeds the total thickness of documents in any single step (process divider). With the variability of this style folder, one need not predict in advance what the capacity requirements might be.

Drawing-element/16C-26 symbolizes VELCRO material which may be affixed, such that another folder may be temporarily "attached" to it for convenience of transportability. For example, in the case of this folder being used as the "manager" of documents for all of a student's courses, another individual single or doubly-accessible course portfolio may be Velcro to this manager folder, so that the entire history in a course's portfolio be available for reference during a class session.

Referring now to FIG. 16D, a fully-assembled, doubly-accessible, fully-flexible folder is shown in a closed position (drawing-element/16D-02). In drawing-element/16D-04 is shown the folder when rotated 180-degrees to reveal the rear cover accessibility. Additionally. Drawing-element/16D-06 symbolizes VELCRO material which may be affixed, such that another folder may be temporarily "attached" to it for convenience of transportability. For example, in the case of the folder being used as the "manager" of documents for all of a student's courses, another individual single or doubly-accessible course portfolio may be VELCROed to the first manager folder, so that the entire history in a course's portfolio be available for reference during a class session.

In summary, the double-sided folder with the combination of prong fastener and GBC-style spiral fastener allows for multiple, variable-size access and physical flexibility of folder movement when accessing dividers residing between covers.

Referring now to FIG. 17, it is illustrated that a sheet of pressure sensitive label stock may be die cut into small rectangles along with printed instructions on the reverse side of the plastic carrier. Such a construct is known as a Label Paper-fastening System. In drawing-element/17-02, is shown the System's 2-layer construct. In drawing-element/17-04, is shown a single label paper-fastener, as it sits on the Label Paper-fastener Sheet. In drawing-element/17-06 is shown how a number of standard sheets of paper, each having at least one aligned hole punch (this example has three aligned hole punches). A single label paper-fastener is peeled off the Label Paper-fastener Sheet. It may be installed in a number of intuitive ways, but the basic method is to place the right-edge of the fastener at the immediate left-edge of the hole, then paste it down toward the left-edge of the paper, then pasting it around the back side of the last sheet in the group, through the hole punch and finally back around onto itself. The amount of label paper-fastening material that gets pasted back onto itself is a function of the thickness of the group of papers being connected. In this case, upon connection of the three-hole punched paper, the entire group may be placed in a binder because although the paper fastener goes through one of the holes, it only fractionally reduces the clear hole diameter.

Note that although this discussion has used paper as an example, this same concept applies equally well to other materials being connected. Similarly, the fastening material is not limited to paper-based labels. Other types of "woven tape" material may be appropriate when greater strength is necessary due to the types of materials being connected.

Also note that this fastening method is non-invasive and easily reversible. Non-invasive because the first and last sheets of materials, along with the connecting material, are really creating a sandwich container for the intervening materials being connected. Easily reversible because the connecting material need merely be cut and pulled through the common connecting hole.

The Label Paper-fastening Sheet(s) are conveniently carried and not subject to some of the bulk and pitfalls of other connecting hardware, such as a stapler which is bulky, may jam, requires replacement staples to be carried separately from the stapling unit itself and is invasive in its approach because of the holes made during paper stapling.

Referring now to FIG. 18A, is illustrated a well-known Prong Fastener that has existed for many years. It is normally comprised of a 2-part metal set and is used to connect the materials and the covers in a report cover venue. In drawing-element/18A-02, we see how a the front and back covers are connected by a Prong Fastener. The details of such a Prong Fastener are illustrated in drawing-element/18A-04. Note that the tangs are placed through the holes of the report covers, a connecting 'compressor' is placed over them, the tangs are bent toward the horizontal center of the covers 90-degrees (clockwise and counter-clockwise respectively) and held down under the sliding locks which are part of the compressor.

Such a Prong Fastener has three disadvantages:

(1) The metal, of which it is most often fabricated, has a tendency to tear into the holes of the report covers with any extended usage. To overcome this, grommets are sometimes inserted into the holes at an additional expense and effort;

(2) There is a secondary step required in the usage of such a Prong Fastener—namely the step of removing and replacing the compressor during each access of the materials contained within the confines of the report covers;

(3) The metal material itself often prevents its use in certain high-rise venues such as prisons. To overcome these disadvantages, a new Prong Fastener has been developed.

Figure 18B:
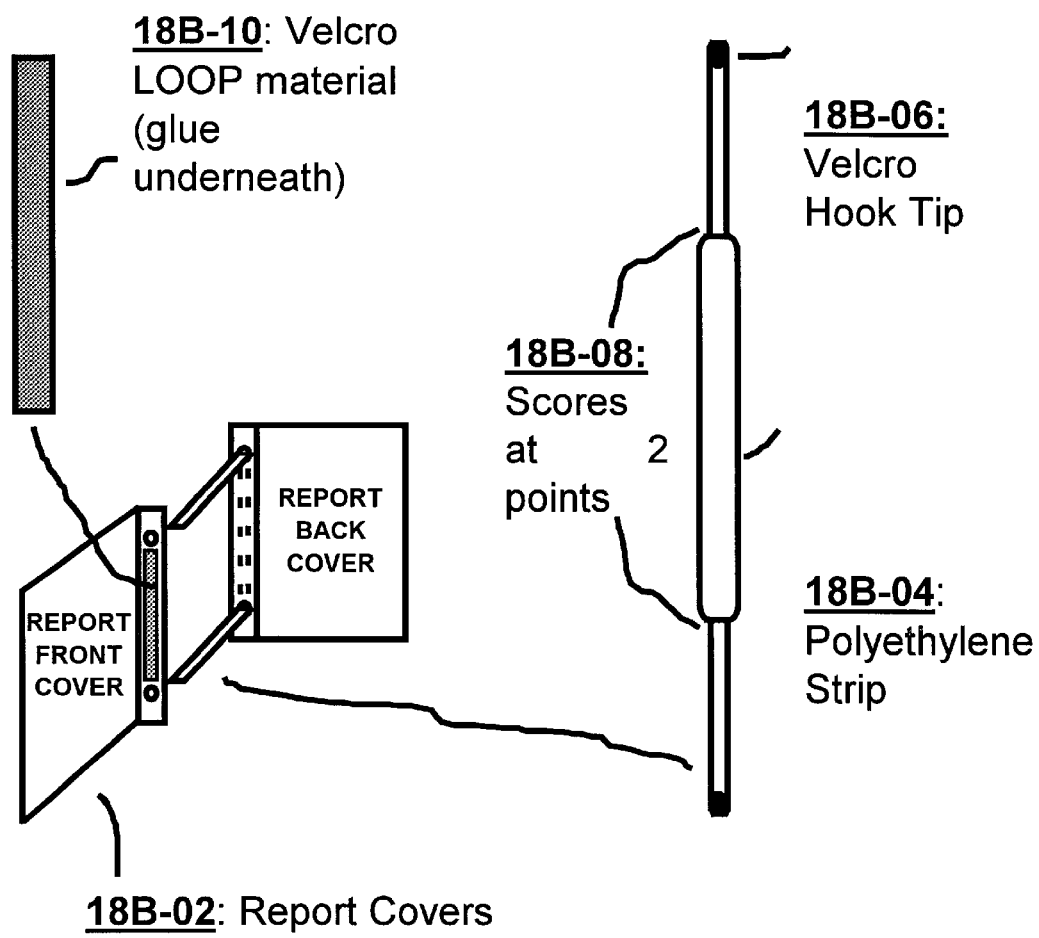

Referring now to FIG. 18B, is a Prong Fastener comprised of polyethylene and Velcro Hook & Loop. The use of Velcro involves the marriage of its two component types, the Hook (male) and the Loop (female). The two report covers to be connected is shown in drawing-element/18B-02. In the case of this implementation, a polyethylene strip allowing for a certain prong rigidity (drawing-element/18B-04) is tipped with Velcro Hook material at its extremities (drawing-element/18B-06) and is scored at the points where it must bend 90-degrees to be inserted into the hole punches of the documents to be stored within the confines of the report covers (drawing element/18B-08). Specifically, the polyethylene/Velcro Prong Fastener is placed through two holes in the lip of the back report cover, just as it is with the metal Prong Fastener (drawing-element/18A-02). Each leg of the polyethylene strip is then bent 90-degrees, with the documents placed on top. The Loop or receiving part is pressure-sensitively pre-glued to the lip of the front cover (drawing-element/18B-10). When the Velcro-tipped tangs come through the pre-drilled holes of the front cover, they are bent over 90-degrees toward the horizontal center of the cover as before and then pressed down to make contact with the aforementioned Loop materials in order make the connection.

Figure 18C:
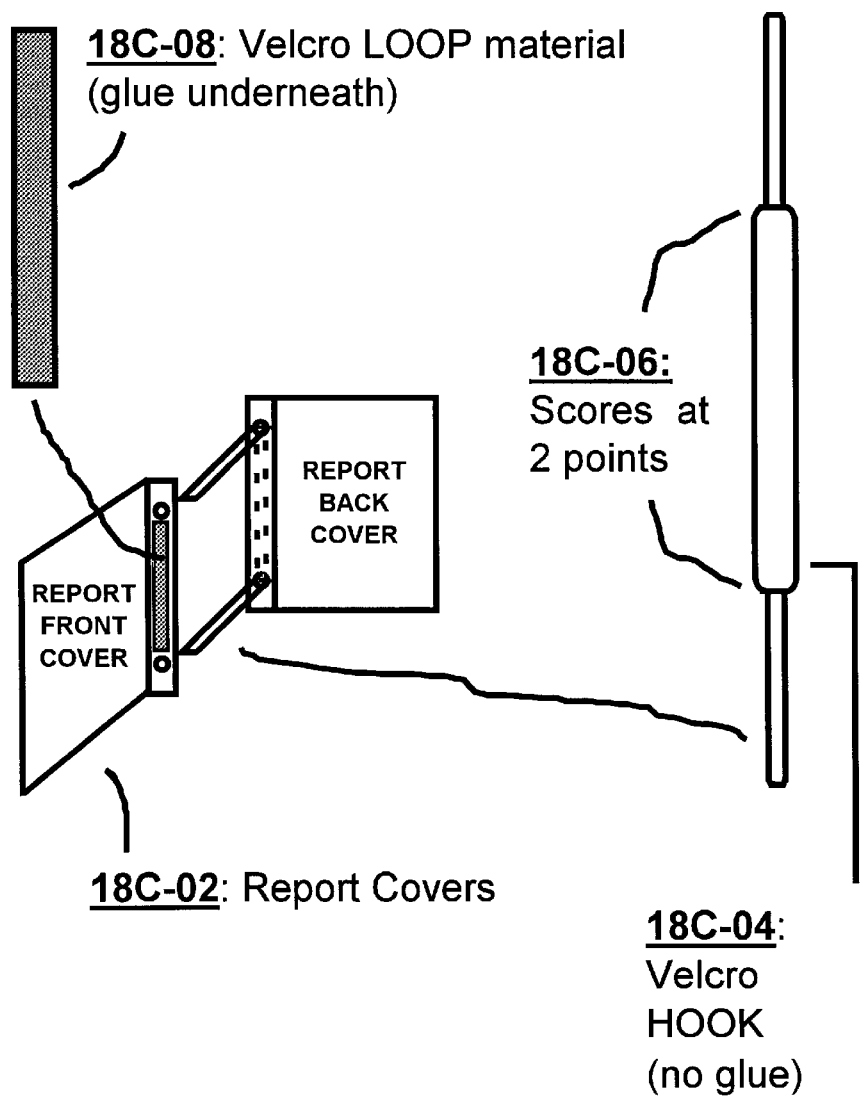

Referring now to FIG. 18C, is a Prong Fastener comprised exclusively of Velcro material (Hook & Loop combination material), instead of a combination of polyethylene and Velcro Hook tips. Functionally, it operates in exactly the same manner as that of FIG. 18B. In drawing element/18C-02 is shown the two report covers. Drawing-element/18C-08 is the Velcro Loop material that is pressure-sensitively pre-glued to the lip of the front report cover. Drawing-elements/18C-04 & 18C-06 describe the prong portion of the apparatus.

Although simpler that the rendition discussed in FIG. 18B in the sense that this style eliminates the polyethylene material, this style may be less functionally desirable because of the longer passage over the Velcro Hook material which the documents have to travel in order to be inserted and removed from the report covers. However, on the plus side, this style is representative of a class of materials that may not be Velcro per se, but may have sufficient rigidity to serve the insertion and fastening function, such as reusable tape materials.

Figure 18D:
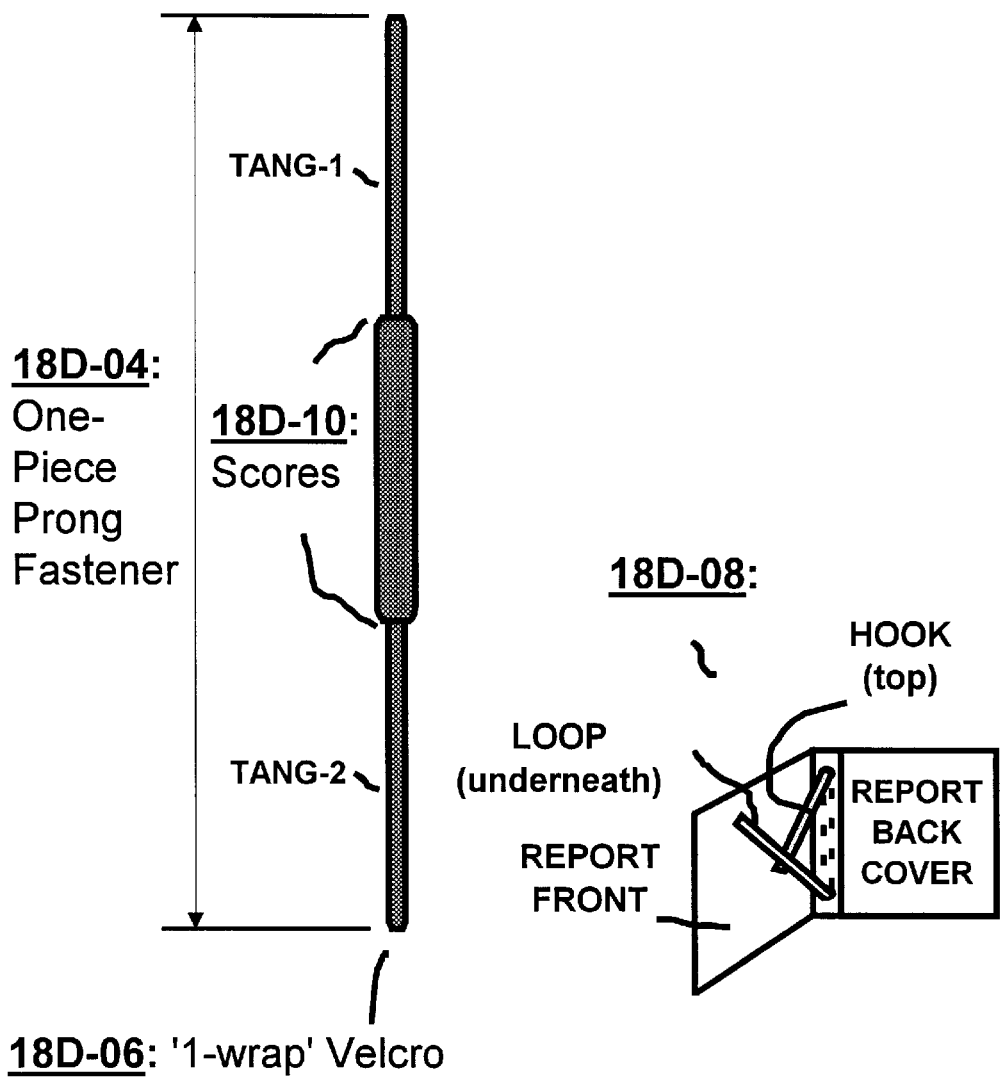

Finally, referring to FIG. 18D, it is illustrated that a Prong Fastener may in fact be fashioned from a single piece of material that has the ability to adhere to itself, in so far as one side adheres to the other side. In FIG. 18D, Velcro has been chosen as the material, but the same concept holds equally well for other materials, such as a strip that is oppositely poled on either of its sides and operates by magnetic attraction.

In drawing-element/18D-04, we see a one-piece Prong Fastener with two scores (drawing-element/18D-10). The middle section serves as the base, and one side of the strip is of the Velcro "Loop" type, which may thought of as the "female" portion of the connection, and the opposite side of the strip is of the Velcro "Hook" type, which may be thought of as the "male" portion of the connection, as described in drawing element/18D-06. The actual manufactured product is known as a 'one-wrap' Velcro strip and exists in the public domain.

According to drawing-element/18D-08, the one-piece Prong Fastener is shown in the process of being connected.

Note that because of the folding geometry, upon closure, the folded-down Loop side will adhere to the folded-down Hook side, thus forming a closed connection that is able to connect the two report covers and any intervening documents.

Referring now to FIG. 18E1, it is illustrated that a sheet (drawing-element/18E1-8) may be introduced to go between two Report Covers (drawing-elements/18E1-2 & 18E1-4). Cut from the sheet are 2 sets of Prong Fasteners. To the tip of one set is applied Velcro 'Hook' material, and it is extended forward to handle attachment of documents that will be placed into the front cover (drawing-element/18E1-10). To the tip of the other set is also applied Velcro 'Hook' material, and it is extended backward to handle the attachment of documents to be placed into the back cover (drawing-element/18E1-12). Applied to the lips of the Report Covers are Velcro 'Loop' material so that the Velcro-tipped tangs of the sheet may be affixed (drawing-element/18E1-14). To gain access to a certain side of the 2-part Report Cover, rotate the Report Cover 180-degrees (drawing-element/18E1-6), or revolve the Report Cover 180-degrees as in the case of the prong fastener placement illustrated in drawing-element/18E1-9. As a generalization, prong fasteners or other fastening methods inherent in fastening report covers together or to a common sheet in order to achieve the double-accessible folder presented in the Specification, whether built-in, welded, force-fit or free-standing, may be placed on the right side of the common sheet, even though the left side placement is mostly discussed in this Specification. Such a right-side placement causes the user to resolve the folder 180-degrees in order to access the other side of the folder, rather than to rotate the folder 180-degrees (filling top to bottom).

Referring now to FIG. 18E2, it is illustrated that a sheet (drawing-element/18E-26) may be introduced to go between two Report Covers (drawing-elements/18E2-8 & 18E2-10). Into the two receiving holes on the sheet (drawing-element/18E2-4) are inserted two tangs (drawing-element/18E2-2) that are slotted in the middle to hold them fast into the sheet's receiving holes. Affixed to the lips of the covers are affixed Velcro 'Loop' material (drawing-element/18E2-16) to receive the 'Hook' Velcro-tipped tangs (drawing-element/18E2-14).). To gain access to a certain side of the 2-part Report Cover, rotate the Report Cover 180-degrees (drawing-element/18E2-12).

Referring now to FIG. 18E3, it is illustrated that a sheet (drawing-element/18E3-6) may be introduced to go between two Report Covers (drawing-elements/18E3-8 & 18E3-10). Shown as a side-view, onto either side of the sheet (drawing-element/18E3-2) are welded two tangs (drawing-element/18E3-3. Affixed to the lips of the covers are affixed Velcro 'Loop' material (drawing-element/18E3-16) to receive the 'Hook' Velcro-tipped tangs (drawing-element/18E3-14).). To gain access to a certain side of the 2-part Report Cover, rotate the Report Cover 180-degrees (drawing-element/18E3-12). Drawing-element/18E3-18 illustrates the documents to be stored within the Report Covers.

In any of the discussions in FIGS. 18B, 18C, 18D & 18E, wherever Velcro is discussed, one may substitute "magnetic strip" material or other types of "male/female" attracting materials. On an individual-application basis, one need decide according to availability and necessary prong rigidity as to what materials to actually employ. Going back to the original metal prong fastener, one may magnetize one side of one tang that would attract itself to the metal of the other tang, while still eliminating the compressor—as in the one-piece fastening style discussed in FIG. 18D.

Addressing the disadvantages of the metal Prong Fastener:

(1) That the aforementioned Velcro material is soft and therefore does not cut into the pre-drilled holes of the report covers;

(2) There is no separate compressor, thereby eliminating the additional removal and replacement steps—as in the case of the metal Prong Fastener and (3) The materials discussed in FIGS. 18B, 18C, 18D & 18E provide no safety risk.

Referring now to FIG. 19A, it is illustrated that the Tabbing System construct first discussed in FIG. 12A may be enhanced by introducing 3 horizontal perforations into each Tab of each side, such that sub-Tabs may be created. If, for example, a user wishes to create a tab that is half of the usual width, then the user need simply fold a tab down along the mid horizontal score, tear along it and remove the freed tab material—followed by using it in the normal manner as previously discussed. In drawing-element/19A-02, the actual Tab side of the 3-layer construct is shown with the three introduced horizontal perforations. In drawing-element/19A-04, the protective Tab side of the 3-layer construct is shown with the three introduced horizontal perforations.

Figure 19B:
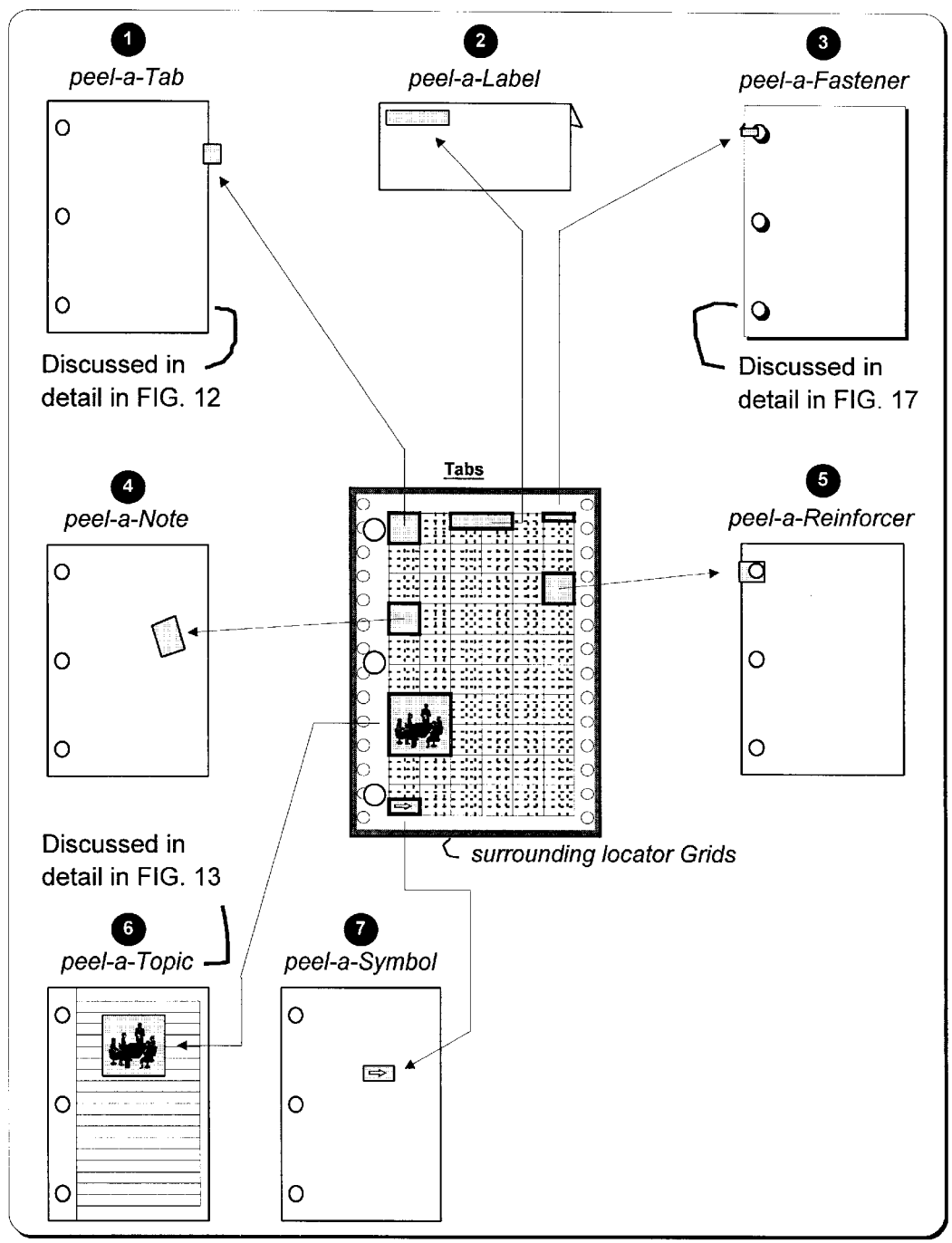

Referring now to FIG. 19B, it is illustrated that the application of the Tabbing System construct Let first discussed in FIG. 12A may be expanded to a number of additional uses. By employing the readily-memorable phraseology of "peel-a . . . ", some of the uses are suggested, although they are not meant to be the full extent of the usage. In fact, the verb "peel" is not meant to convey a limitation of the this aspect of the invention. There may be some other construct which depends on sponging a "dry" tab for example. Some of the uses are listed; creating tabs (in the sense as described in the 12-series Figures above), as a label (for example a return address label), as a fastener (as discussed in detail in FIG. 17), as a note, as a sheet reinforcer (requiring a user-installed hole-punch), as a Topic (as discussed in detail in FIG. 13) and as a symbol (for example highlighting an important passage with an arrow). No doubt, once a user is becomes conversant with this multi-usage format, the user will develop other uses for this versatile Tab Construct.

Figure 20A:
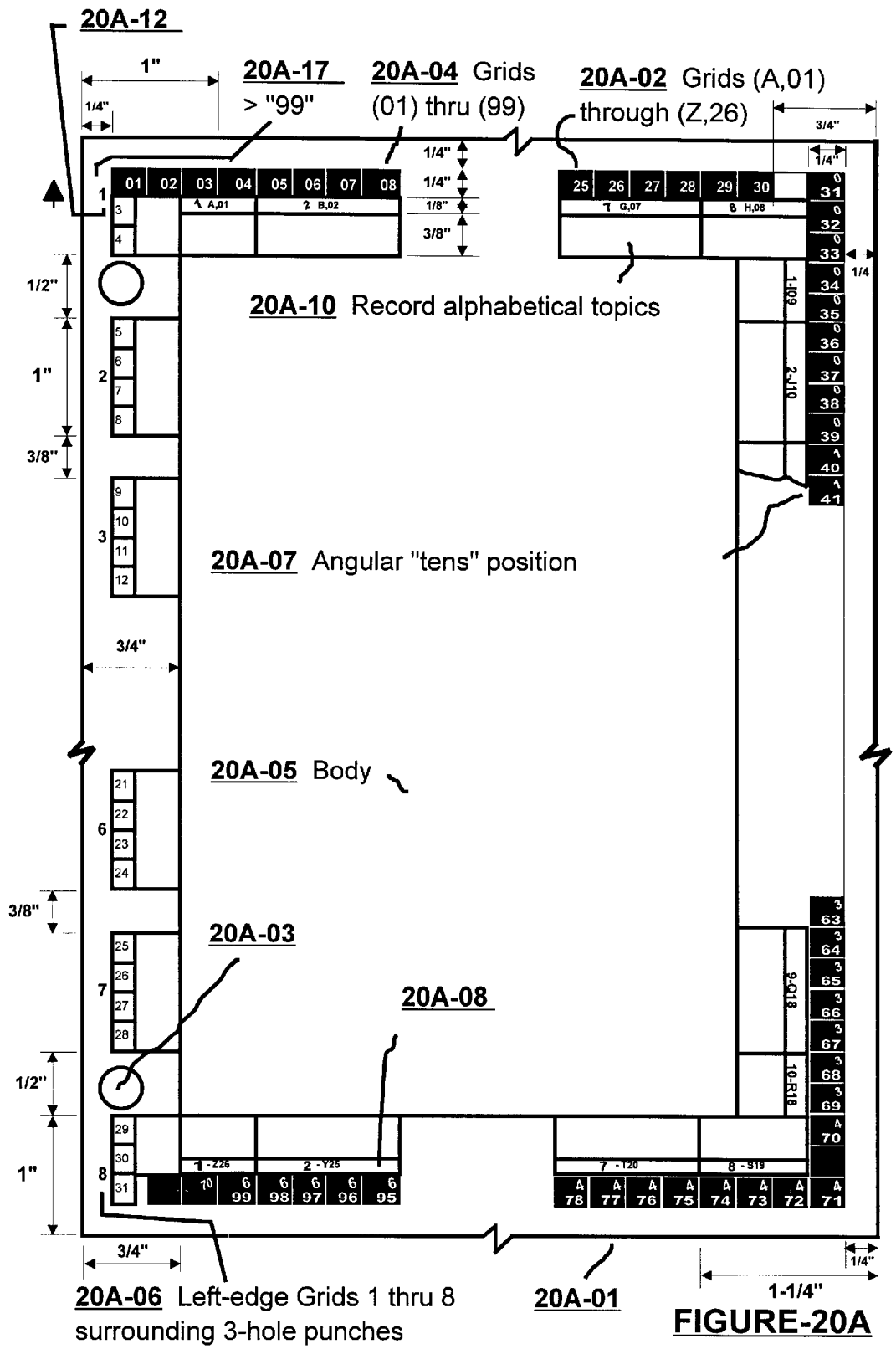
FIG. 20A illustrates a "Smart Grid" that may be used to establish an organizational system.

Referring now to FIG. 20A, is illustrated "Smart Grid". Intended to convert a document into a formidable vehicle of organization. The objectives of the grid are three-fold:

1) Provide optional-use perimeter grid locations (which in turn may be customized according to application) that may be highlighted, tabbed or otherwise identified so that organizational markers may be applied in order to further access the document when it sits among a set of documents, 2) Provide twenty-six optional-use data-entering areas to alphabetically capture any topics that relate to the detailed information entered on the document or a set of following documents and 3) Provide a resultant area or "Body" which distinguishes the nature of the leaf and is circumscribed by the "Smart Grid".

To outline the development of the "Smart Grid", we begin by selecting a leaf of some practical size and some material (drawing-element/20A-01) that allows for the entering of data. Hole punches are installed (drawing-element/20A-03. Around the four perimeter sides of the leaf are installed "Topic Areas" (drawing-element/20A-10). The middle open area formed by the perimeter Topic Areas form the "Body" (drawing-element/20A-05) of the Smart Grid, into which may be placed application-dependent data-gathering areas.

The Topic Areas themselves are intended to provide predefined alphabetically contiguous areas where the topics may be entered that correspond to the leaf's content. ). For example, if a user is making notes about the "Battle of Gettysburg", then the user may choose to enter the word "Gettysburg. For later retrieval among a set of leaves, the user may flip through the leaves along the top edge and find all those topics starting with "G"—thereby quickly retrieving the "Gettysburg" sheet. The "Topic Boxes" begin in the upper-left corner of the leaf and proceed in a clockwise direction around the leaf, with the last "Z" box in the lower-left corner. Note that some of the boxes are truncated to a smaller size in order to allow for some other grid options that will be subsequently discussed. Because these same Topic Areas carry a number as well as a letter, a user may wish to view them in a 1 through 26 context—for example, in tracking a biweekly application (26 bi-weeks per year; drawing-element/20A-02).

There are many identifying schemes possible using the perimeter Smart Grid.

1) a four-dimension scheme (w,x,y,z), where "w" represent the numbers 1 through 8 or 1 through 32 (smaller increments—drawing-element/20A-12) along the left-edge; "x" represents the angular numbers 1 through 8 or 1 through 30 along the top-edge; "y" represents the numbers 1 through 10 along the right-edge or angular numbers 1 through 40 along the right-edge; "z" represents the numbers 1 through 8 along the bottom-edge. To determine the number of possible unique sheets, we multiply the maxima of "w","x", "y" and "z" (32×30× 40×8) or 307,200! In fact, it is possible to create a many-dimensional scheme by dividing one or more of the perimeters into sub or pseudo perimeters. So the 30 numbers along the top-edge may be recast as two "fives" and 2 "tens" areas to result in a "w,x,y,z" for the top-edge only!

2) The angular numbers 1 through 8 along the top-edge are meant to be used in conjunction with the contiguous angular numbers along the right & bottom edges. For example, in a two-dimension scheme (x,y), where "x" is selected to be the numbers along the top-edge of the sheet and "y" is selected to be along the right & bottom-edges of the sheet, a user has a maximum selection of (8,70). Or a user may choose to mix the so-called straight-up numbers along the top-edge with the contiguous angular numbers along the right & bottom edges, thereby yielding a resulting maximum coordinate of (30,70) or 2100 identifiable positions (not including the identification of the left-edge locators). Certain number locator boxes can be alternatively used, depending on context. For example, when a user wishes to use the numbers 1 through 99 along the top, right & bottom-edges (drawing-element/20A-04), the numbers are printed straight-up and are 2 digits. If a user wanted to extend the numbers in a logical scheme beyond the number 99, the user may flag the implicit "0" position in the upper-left-most corner preceding the "1" (drawing-element/20A-17) to serve as the "hundredths" position (and beyond). For example to identify leaf number "203", the user would flag the upper-left-most corner of the leaf's Smart grid with a "2" to indicate the number "200" and then flag the actual "03" number—the sum of which would make the desired "203".

When a user wishes to utilize the numbers 1 through 70 along the right & bottom-edges, the numbers are not only angular but only their tens-position is explicitly shown as angular (drawing-element/20A-07)—with their units position being the straight-up number below it (which is offset by an amount of 30 more in count because of the additional 30 numbers along the top-edge). For example, in a 3-edge context, we see the number "41" along the right-edge. However, in a 2-edge context (right and bottom), that same grid locator is box number "11"—with the angular tens position of "1" utilizing the "straight-up" 1 below it for the units position taken from the 3-edge context. This technique is used for purposes of visibility.

3) A user, for ease of reference, may choose to use a number/letter/number scheme (limiting oneself to "A" through "I"). For example, "3G50" would be selecting the $3^{rd}$ box down on the left-edge, the $7^{th}$ box ("G") over along the top-edge and the $50^{th}$ angular number along the bottom-edge.

4) The numbering scheme illustrated on the leaf is only one of many possible. In a complex operation as selected by a user, one or more edges may be used to establish more than one dimension. For example, if a user may divide the top-edge into several distinct contiguous groupings to serve as the multiple dimensions of an array. (Of course, it would require a recasting of the sheet illustrated in this specification). One might have "gender" selections along the top along with "religion" along with "ethnicity". In this way, the top edge, rather than depicting only one dimension of an array, may hold three dimensions—allowing the user to establish an many-dimension array that exceeds the limitations of the four edges of the sheet.

Referring now to FIG. 20B, by starting with the "Smart Grid" (drawing-element/20B-01) and installing a student-particular "Body" (drawing-element/20B-02) within the "Smart Grid", a user may develop a leaf that is used in a student organizational, where the student selects the left-edge to identify any of courses 1 through 8 (drawing-element/20B-04) and the top, right & bottom-edges to identify the class number within a course while still independently utilizing the "Topic Boxes" as originally discussed. With such a system in place and perhaps viewing the resultant sheet as a cover sheet for all documents relating to that Course/Class, the student may, with little effort, establish a powerful information-location device.

Figure 20C:
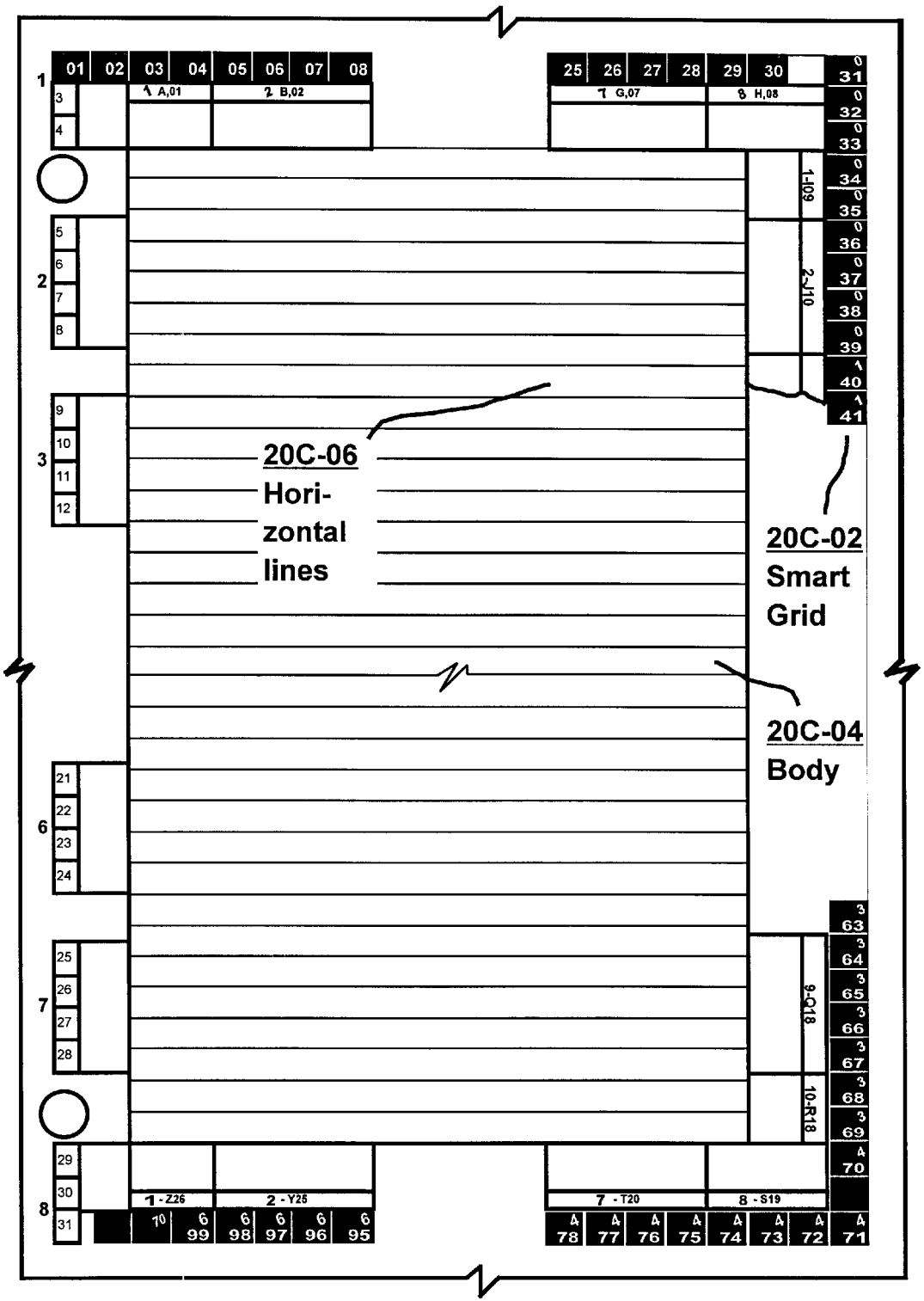
FIG. 20C illustrates the creation of a "Smart Loose-leaf Sheet" used for ease of identification and access of information residing on a loose-leaf sheet formed by installing horizontal lines in the "body" of the "Smart Grid.

Referring now to FIG. 20C, by starting with the "Smart Grid" (drawing-element/20C-01) and installing horizontal lines (drawing-element/20C-06) in the "Body" (drawing-element/20C-04) that resides within the "Smart Grid", a user may develop a leaf that is used to access the information entered on the horizontal lines. Such a leaf may be called "Smart Loose-leaf", because the ability for a user to use the perimeter "Smart Grid" to flag, define, annotate, etc. any detailed information that is entered on the horizontal lines.

In conclusion, a user may create an information-gathering leaf by installing a generic perimeter grid (as was outlined in FIG. 20A), thereby creating a center portion on the leaf, conveniently called the "Body". Depending on the application, information-gathering areas are established to receive information. In actual usage, a user may always choose to use only the information-gathering areas on a sheet, while ignoring the "Smart Grid". Or the user may choose to use some portion of the identifying capabilities inherent in the "Smart Gird", for marking, tabbing, coloring, entering snapshot topics and annotations, or other identifying techniques—all of which all the sheet to become part of an ordering and retrieval system. By installing the "Smart Grid", any information-gathering leaf becomes value-added.

It should be noted that any or all of the "Smart Grid" may be printed with non-reproducing ink (which is well-established in the printing world) such that upon reproduction, on a copy machine for example, such areas will "drop out" or not be reproduced. This may contribute to the aesthetic objectives of such a leaf. Referring now to FIG. 21A, is illustrated a 2-part "Winged Folder" of some material and some size that may stand alone or be combined with other Winged Folders or parts of other Winged Folders to form many possible configurations. Illustrated is a Winged Folder (drawing-element/21A-02). Such a Winged Folder is comprised of a front piece (drawing-element/21A-02F), a back piece (drawing-element/21A-02B)—both of which are connected by a Spine of some size (drawing-element/21A-04) thereby forming an implicit hinge. The Winged Folder-front and the Winged-Folder-back both contain "Slits", left and right (drawing-element/21A-08). Depending on the final configuration of the Winged Folder or parts of Winged Folders, such slits behave as tight holders of potential pronged fasteners (or some other similar fastening device). In addition, the Winged Folder-front and the Winged-Folder-back both contain "Small Holes", left and right (drawing-element/21A-08A). Such small holes behave as receivers of rivets, which in turn may hold ring metals—depending on the usage context.

Attached to both the front and back covers of the Winged Folder is a "wing". The wings may have a spine of some measurable size (drawing-element/21A-07). In addition, a wing, by definition, forms a so-called "hinge" (drawing-element/21A-06). Each wing contains a pair of large holes (drawing-element/21A-10), which allow for easy removal onto and off of a pronged fastener (or some other similar fastening device)—thereby establishing an implicit expandability property. Also, each wing contains a pair of small holes (drawing-element/21A-12). Such small holes in a wing behave as receivers of rivets, which in turn may hold a ring metal—depending on the usage context.

Figure 21B:
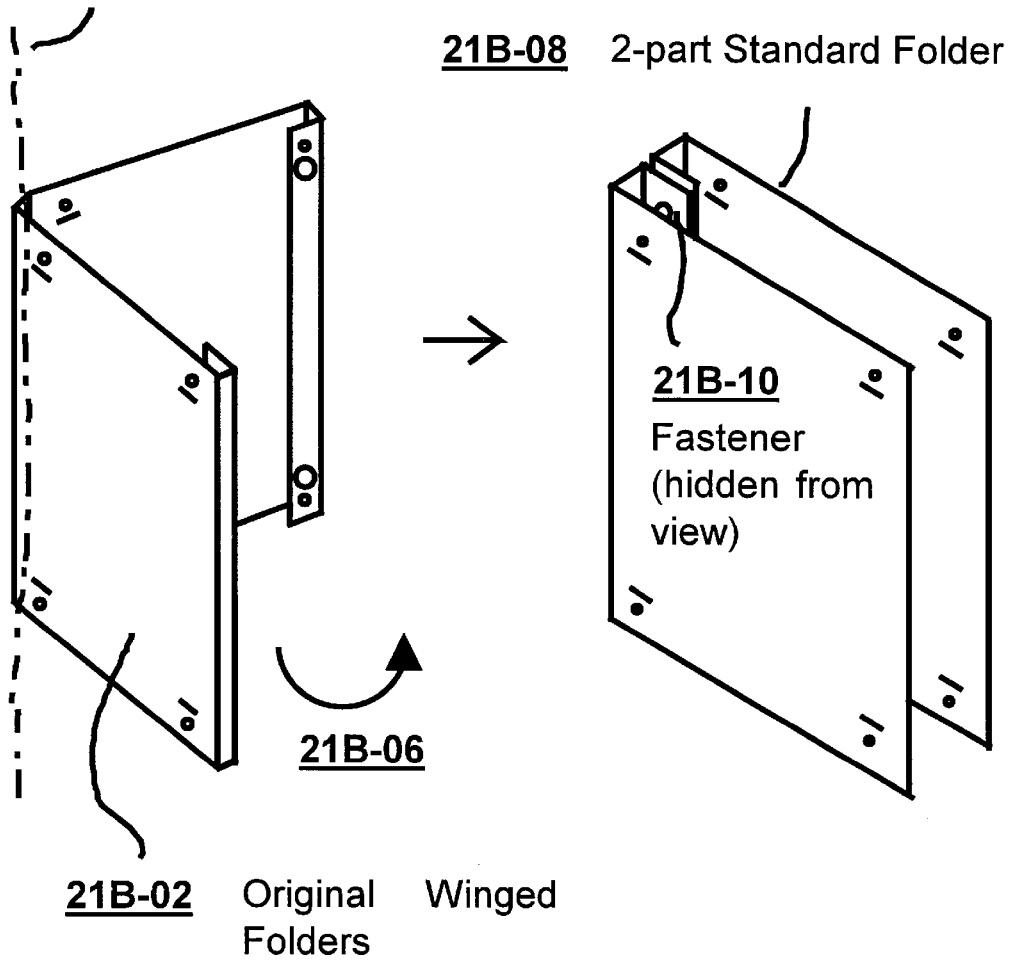

Referring now to FIG. 21B, is illustrated a 2-part "Expandable Standard Folder" that is formed by configuring the Winged Folder of some material and some size, as was illustrated in FIG. 21A. Drawing-element/21B-02 illustrates the original Winged Folder. Drawing-element/21B-04 is a dotted line indicating that Winged Folder's "Spine" is to be cut away in its entirety, forming 2 exact halves from the resulting front and back parts. Drawing-element/21B-06 is meant to illustrate that the 2 Winged Folder halves (with the Spine removed) is rotated 180-degrees to form the final Expandable Standard Folder (drawing-element/21B-08). By the insertion of a pronged fastener (or some other similar fastening device) (drawing-element/21B-10, hidden from view), the resulting halves of the Expandable Standard Folder will then ready to receive documents.

Figure 21C:
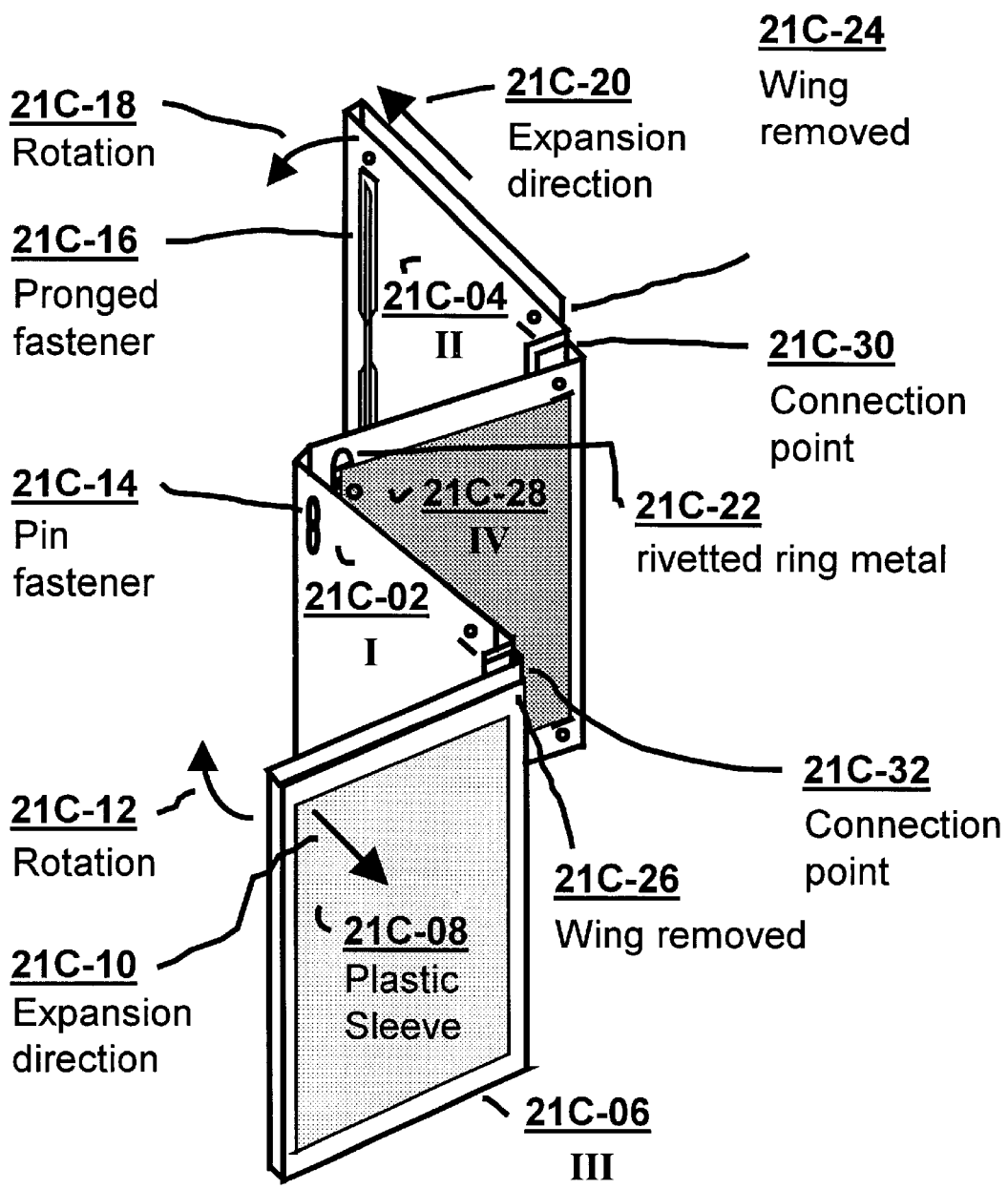

Finally, referring to FIG. 21C, is illustrated a multi-part Folder (with certain parts expandable) that is formed by configuring multiple Winged Folders of some material and some size, with the base Winged Folder having been illustrated in FIG. 21A. In the illustration of FIG. 21C, four Winged Folders (or parts of Winged Folders) are used—I, II, III and IV (drawing-elements/21C-02,04,06 & 28 respectively.

Many, many different renditions of multi-part expandable folders are possible. To build one of them for illustration, we begin with Winged Folder-I (drawing-element/21C-02), having a front cover and a back cover with each of the covers retaining its wings. Attached to the back cover of Winged Folder-I (drawing-element/21C-02) is Winged Folder-II (drawing-element/21C-04), able to rotate about the hinge created at the joining point (drawing-element/21C-30), closing in the direction of drawing-element/21C-18 and expanding in the direction of drawing-element/21C-20 as documents are added. Note that by definition of the wings of Winged Folders I and II coming together at drawing-element/21C-30, a point of expandability is created—allowing documents to be included up to the point of the fastener size selected.

Winged Folder-II has its back cover wing removed (drawing-element/21C-24) in order that its back cover becomes the finished back cover of the overall new multi-part expandable folder. Moreover, further and separate document storage is achieved by the inclusion of a pronged fastener attached to the front cover of Winged Folder-II (drawing-element/21C-16) The pronged fastener is installed by passing the prongs through the pre-formed slits if the front cover of Winged Folder-II. It should be noted that by the use of such slits, the pronged fastener is held in place by a tight fit. A compressor piece (not shown) may be placed on any installed documents, or the simple folding over of the prongs themselves is usually sufficient to "hold" any documents in place.

To illustrate the flexibility of fastening devices, Winged Folder-I (drawing-element/21C-02) has pin fasteners (only one is shown) installed through the slits of its front cover (drawing-element/21C-14) and a small ring metal riveted to the small preformed holes on the inside back cover (drawing-element/21C-22). Winged Folder-IV had had all of its component parts removed—leaving only a wingless, spineless front cover (drawing-element/21C-28). Moreover, the resultant single leaf has been retrofitted with a 3hole punch, so that it may behave as a standard divider leaf that is able to sit in the 3-hole ring metal (drawing-element/21C-22).

Attached to the front cover of Winged Folder-I (drawing-element/21C-02) is Winged Folder-II (drawing-element/21C-06), able to rotate about the hinge created at the joining point (drawing-element/21C-32), closing in the direction of drawing-element/21C-12 and expanding in the direction of drawing-element/21C-10 as documents are added. Note that by definition of the wings of Winged Folders I and III coming together at drawing element/21C-32, a point of expandability is created—allowing documents to be included up to the point of the fastener size selected. Winged Folder-III has its front cover wing removed (drawing-element/21C-26) in order that its front cover becomes the finished front cover of the overall new multi-part expandable folder. To provide a finished look and to cover the preformed slits and rivet holes, a pre-glued plastic sleeve (drawing-element/21C-08) is installed on the front cover of Winged Folder-III (drawing-element/21C-06).

It has been illustrated that, starting with four identical Winged Folders as first illustrated in FIG. 21A and employing some off-the-shelf fastening devices, a new folder has been developed with the following capabilities:

1) Double-sided. With expandability from both sides. In the context of an organizational system as used by a student, for example, one side may be used for class activities and documents, while to flip side may be used for study activities and archival document storage.
2) Additional Storage. By the use of "internal" pronged fasteners, pins, ring metals and other applicable fastening devices, a user may achieve additional organizational compartmentalization.
3) Expandability. Even after a new piece has been configured, a user has the opportunity to modify or enhance the piece by using additional Winged Folder(s) or parts of Winged Folder(s).

Thus ends the discussion of the Figures associated with this Specification. Accordingly, while only several embodiments of the present invention have been shown and described, it is obvious that many changes and modifications may be made thereunto without departing from the spirit and scope of the invention.

What is claimed is:

1. A method of systematizing processes for a user in which:
   a first process comprises a plurality of steps;
   each step has a corresponding tab;
   each tab is associated with a leaf for separating documents;
   the user sequentially performs the steps of the first process in a sequence defined by an order of the tabs;
   linking a predecessor step by said leaf to a subsequent step;
   placing said leafs are together in a holder; and
   performing the predecessor step will affect the subsequence step; which subsequent step is part of the process;
   the steps of the process are charted on a flow chart;
   viewing said flow chart, simultaneously with at least some of the tabs, guides the user to a next appropriate tab;
   a document step involves a document;
   locating the document with the tab of its step; and
   moving the document from one tab to a different tab during steps.

2. A method of systematizing processes for a user, comprising the steps of:
   tabbing a first part of said process by first set of tabs;
   tabbing a second part of said process by second set of tabs;
   linking a step of the first part to a step of the second part, by linking one of the first tabs to one of the second tabs, by a leaf, thus creating a linked first tab and a linked second tab;
   binding the leaf and tabs in a holder;
   associating a document with the step of the first part by associating it with the linked first tab;
   finding the document in the second part by going the second linked tab.

3. A slipcase comprising:
   a semi-rigid sheet;
   a pattern of lines defining cuts and folds;
   said cuts and folds defining a method of forming said semi-rigid sheet into the slipcase;
   said slipcase being open on one side for receiving a holder;
   said slipcase being enclosed on five sides for retaining a holder;
   a single side of said sheet being finished; and
   said finished side being the side exposed on five outside surfaces and four inside surfaces of the slipcase.

4. A slipcase, according to claim 3, having no exposed raw edges.

5. A slipcase, according to claim 3, in which the sheet has cuts and folds defining a detachable divider that may be mounted in the slipcase to support the holder.

6. A slipcase, according to claim 3, having five inside finished surfaces.

7. A slipcase, according to claim 3, having a sliding drawer for storing tools for paper manipulation in a field situation.

8. A tab system, comprising:
   a plurality of peel-off labels, on a printable sheet;
   each of said peel-off labels comprising:
      a first fold, sticky side in, dividing the label into a front side and a back side;
      a second fold, dividing the back side into a protrusion part, and an
      attachment part, said attachment part folded sticky side out;
      said protrusion for folding sticky side to stick to each other to define said protrusion; and
      a remaining of the front side forming a front attachment part.

9. A tab system according to claim 8 in which the printable sheet has a perimeter, and each printable sheet is provided with a printed perimeter locating grid, for measuring against a leaf, and applying the tab in a desired location on the leaf, applying the sticky side of the front attachment part to the desired location on the leaf, and then by folding the back attachment part onto a back of the leaf.

10. A tab system comprising a holder, leaves, and asociated tabs, each tab associated with a part of a process, in which:
    the leaves have photo sources aligned to cooperate with photo-detectors on adjacent leaves, for sensing a presence or absence of documents between said leaves, and
    the holder has indicators, in communication with the photo-detectors, for reporting said presence or absence of said documents.

11. A method according to claim 2 in which each of the plurality of steps of the second process corresponds to a step of the first process, and a tab of a step of the second process is physically linked by an associated leaf to the respective tab of the corresponding step of the first process.

12. A method according to claim 2 in which, in addition to the plurality of steps of the second process, the second process comprises an additional step, which additional step is not physically linked by leaf to a tab of the first process.

13. A method according to claim 1 comprising masking the steps of a process with shaped sheet means, while performing the step of another process 14. A method according to claim 13 comprising masking the steps of the second process with a shaped sheet means while performing the steps of the first process.

15. A method according to claim 14 comprising masking the tabs of the first process with a shaped sheet means while performing the steps of the second process.

16. A method of systematizing processes for a user, in which:
    a first process comprises a plurality of steps;
    giving each step a corresponding tab,
    associating each tab with a leaf for separating documents, said leaf having a perimeter;
    binding said leaf together in a holder;
    the user sequentially performs the steps of the first process in a sequence defined by an order of the tabs;
    linking a predecessor step by said leaf to a subsequent step in which performing the predecessor step will affect the subsequent step;
    the subsequence step is part of the process,
    charting the steps of the process on a flow chart,
    viewing said flow-chart, simultaneously with at least some of the tabs;
    locating the document with the tab of its step;

moving the document from one tab to a different tab during steps;

tabbing a first part of said process by first set of tabs;

tabbing a second part of said process by second set of tabs;

linking a step of the first part to a step of the second part, by linking one of the first tabs to one of the second tabs, by a leaf, thus creating a linked first tab and a linked second tab;

binding the leaf and tabs in a holder;

associating a document with the step of the first part by associating it with the linked first tab;

finding the document in the second part by going to the linked tab;

in which the holder is slipped into a slipcase, said slipcase comprises:
  a semi-rigid sheet;
  a pattern of lines defining cuts and folds;
  said cuts and folds defining a method of forming said semi-rigid sheet into the slipcase;
  said slipcase being open on one side for receiving a holder; and
  said slipcase being enclosed on five sides for retaining a holder;

said slipcase, according having a sliding drawer for storing tools for paper manipulation in a field situation;

printing a plurality peel-off labels, on a printable sheet;

folding a first fold, sticky side in, dividing the label into a front side and a back side;

folding a second fold, dividing the back side into a protrusion part and attachment part, said attachment part folded sticky side out;

folding sticky side to stick to each other to define said protrusion; and forming a remaining part of the front side into a front attachment part;

providing each leaf with a printer perimeter locating grid;

applying the tabs in a desired sequence by sticking the sticky side of the front attachment part to an appropriately marked printed location on the leaf, and then folding the back attachment part onto a back of the leaf;

separating documents involved in steps of a process, by a plurality of said leaves;

identifying said leaves to said steps, by said tabs, at least one leaf is identified to more than one step in the process by more than one tab;

each of different parts of the process is associated with a different sector of leaf the perimeter;

different sectors are on the edges of the leaves;

aligning the leaves to have photo sources cooperate with photo-detectors on adjacent leaves, thereby sensing a presence or absence of documents between said leaves; and indicating external to a holder to report said presence or absence of said documents, associated with steps of the process.

17. A method system for guiding processes for a user, in which:

each step of the process has a corresponding tab defining a sequence of events in the process;

each tab is associated with a leaf for separating documents;

a predecessor step is linked by said leaf to a subsequent step;

said leafs are bound together in a holder, and performing the predecessor step will affect the subsequent step;

the subsequence step is part of the process, the step of the process are charted on a flow chart, said flow chart is located where said flow chart may be viewed simultaneously with at least some of the tabs;

a document step involves a document;

a slipcase, said slipcase comprising:
  a semi-rigid sheet;
  a pattern of line defining cuts and folds;
  said cuts and folds defining a method of forming said semi-rigid sheet into the slipcase;

said slipcase being open on one side for receiving a holder; and said slipcase being enclosed on five sides for retaining a holder;

the slipcase having a sliding drawer for storing tools for paper manipulation in a field situation;

a tab system, comprising:
  a plurality peel-off labels, on a printable sheet;
  each of said peel-off label comprising:
    a central fold, sticky side in, bisecting the label into a front side and a back side;
    a part fold, dividing the back side into a protrusion part and an attachment part, said attachment part folded sticky side out;
    said protrusion for folding sticky sides to stick to each other to define said protrusion; and
    a remaining part of the front side forming a front attachment part;
    in which a leaf has a perimeter, and each leaf is provided with a printed perimeter locating grid, for applying the tabs in a desired sequence by sticking the sticky side of the front attachment part to an appropriately marked printed location on the leaf, and then by folding the back attachment part onto a back of the leaf;

documents involved in steps of a process are separated by a plurality of said leaves, said tabs identify said leaves to said steps, and at least one leaf is identified to more than one step in the process by more than one tab;

in which each of different parts of the process is associated with a different sector of the leaf perimeter;

in which different sectors are on different edges of the leaves;

the leaves have photo sources aligned to cooperate with photo-detectors on adjacent leaves, for sensing a presence or absence of documents between said leaves, and the holder has indicators to report said presence or absence of said documents.

18. A tab system according to claim 8 having a precut self-adhesive sheet of tabs which the sheet also includes:

perforation on the tabs for subdivision into smaller tabs; said perforation rendering each tab multiply suitable for:
  paper fastener tabs;
  document label tabs;
  note tabs;
  hole reinforcing tabs;
  preprinted topic tabs; and
  symbol tabs.

19. A tab according to claim 1 in which the tab is part of said flow chart;

the tab is associated with a decision step;

one decision directs to another tab; and another decision directs to the same tab.

20. A system according to claim 1 in which the flow chart directs to a second holder.

21. A system according to claim 1 in a first flow chart is replaced by a second the flow chart.

22. A system according to claim 1 having a removable cover tab shaped to mask inactive tabs and to reveal active tabs and having instruction to flow control the active tabs.

23. A divider set comprising:

a divider sheet having a first set of set of mounting holes;

a set of said sheets having staggered tabs;

said staggered tabs occupying no more than half an edge of said divider sheets;

a second set of mounted holes at an opposing side from said first set of set of mounting holes;

whereby said tabs can be inverted or reversed to provide four different orientations and thereby quadruple a number of non-overlapped location for said tabs on said sheets.

24. A divider set according to claim 23 further comprising a second set of set of said sheets having staggered tabs on a third edge;

said staggered tabs occupying no more than half the third edge of said sheets;

a second set of mounting holes at an opposing side from said first set of set of mounting holes;

whereby said tabs can be inverted or reversed to provide eight different orientations and thereby multiply times eight the number of non-overlapped locations for said tabs on said sheets.

25. A divider set according to claim 23 in which the sheets are square and there are holes at four sides to provide eight different orientations and thereby multiply times eight a number of non-overlapped locations for said tabs on said sheets.

26. A method according to claim 2 in which the linking of the step of the first part to the step of the second part, by linking one of the first tabs to one of the second tabs, is so linked that:

pushing the first tab into the sheet extends the second tab from the sheet; and pushing the second tab into the sheet extends the first tab from the sheet.

27. A method according to claim 2 in which:

the document comprises an operative part and a symbolic representation of the operative part;

the symbolic representation is moved, while the operative part remains at its location; and the symbolic representation includes information pointing to the location of the operative part.

28. A system according to claim 2 in which perforated clear labels are supplied for laminating over the tabs to protect various size tabs.

29. A tab system, according to claim 8, in which peal-able clear labels covers are shaped and sized for placing in protective positions over the peel-off labels.

30. A tab system, according to claim 29, in which peel-off labels are mounted on a mounting substrate, and said mounting substrate includes the peal-able clear label covers.

31. A tab system, according to claim 30, in which peal-able clear label covers are co-located with said peel-off labels.

32. A tab system, according to claim 8, further comprising: a preprinted leaf for use in a document, said preprinted leaf comprising:

a plurality of perimeter grid locations that may be highlighted, tabbed or otherwise identified so that organizational markers may be applied in order to further access the document when it sits among a set of documents, a plurality of data-entering areas, contiguous to the perimeter grid locations, to relationally identify any topics that relate to the detailed information entered on the document and on any set of following documents; and a body, for entry of information, in which distinguishes the nature of the leaf and is circumscribed by the grid locations and by the data-entering areas.

33. A tab system, according to claim 32, in which the preprinted leaf further comprises:

mounting holes;

the data-entering areas are topic areas located around the four perimeter sides of the leaf;

the body is a middle open area, formed by the perimeter Topic Areas into which may be placed application-dependent data-gathering areas;

the topic areas provide pre-defined sequentially contiguous areas where the topics may be entered that correspond to the leaf's content.

34. A tab system, according to claim 32, in which the in which each of the plurality of edges of the sheet may be associated with a means of dividing topics, to which topics the leaf may be related.

35. A winged folder of sufficiently rigid material to stand alone and be combined with other winged folders or parts of other winged folders to form many possible configurations, said winged folder is including:

a front piece;

a back piece to the front piece connected by a spine of some size thereby forming a hinge;

the front piece and back piece both contain openings for mounting of document fasteners;

on each front and back piece a wing at an edge distal the spine;

each said wing hinged mounted to its piece;

each wing having a pair of joining holes for mounting of a fastener thereby for additional documents or covers;

each wing contains a pair of small holes for receiving of rivets for holding a ring metal.

* * * * *